(12) United States Patent
Tanaka et al.

(10) Patent No.: US 12,063,436 B2
(45) Date of Patent: Aug. 13, 2024

(54) IMAGE CAPTURING APPARATUS, ACCESSORY APPARATUS, AND CONTROL METHOD THEREFOR

(71) Applicant: CANON KABUSHIKI KAISHA, Tokyo (JP)

(72) Inventors: Tomoki Tanaka, Kanagawa (JP); Hideya Takanashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/748,914

(22) Filed: May 19, 2022

(65) Prior Publication Data

US 2022/0286597 A1 Sep. 8, 2022

Related U.S. Application Data

(63) Continuation of application No. 17/123,742, filed on Dec. 16, 2020, now Pat. No. 11,477,361, which is a continuation of application No. PCT/JP2019/024466, filed on Jun. 20, 2019.

(30) Foreign Application Priority Data

Jun. 21, 2018 (JP) ................................ 2018-118125
Sep. 4, 2018 (JP) ................................ 2018-165392

(51) Int. Cl.
*H04N 23/66* (2023.01)
*G03B 17/14* (2021.01)
*H04N 23/54* (2023.01)
*H04N 23/55* (2023.01)
*H04N 23/663* (2023.01)

(52) U.S. Cl.
CPC .......... *H04N 23/663* (2023.01); *G03B 17/14* (2013.01); *H04N 23/54* (2023.01); *H04N 23/55* (2023.01)

(58) Field of Classification Search
None
See application file for complete search history.

(56) References Cited

U.S. PATENT DOCUMENTS 9,509,943 B2* 11/2016 Uchiyama ............ H04N 23/663
11,477,361 B2* 10/2022 Tanaka ................ H04N 23/673
2005/0140816 A1 6/2005 Tschida
(Continued)

FOREIGN PATENT DOCUMENTS

JP 2004294932 A 10/2004
JP 2007017746 A 1/2007
(Continued)

*Primary Examiner* — Twyler L Haskins
*Assistant Examiner* — Fayez A Bhuiyan
(74) *Attorney, Agent, or Firm* — Canon U.S.A., Inc. IP Division

(57) ABSTRACT

A camera microcomputer receives first accessory attribute information of the accessory attribute information through the third communication channel by using a first communication method and then switches from the first communication method to a second communication method different from the first communication method, and controls communication so as to receive second accessory attribute information of the accessory attribute information through the third communication channel by using the second communication method.

18 Claims, 41 Drawing Sheets

(56) References Cited

U.S. PATENT DOCUMENTS

| | | | | |
|---|---|---|---|---|
| 2013/0051780 A1* | 2/2013 | Takahata | ............... | G03B 17/18 |
| | | | | 396/85 |
| 2013/0077952 A1* | 3/2013 | Sugiyama | .......... | H04N 5/23241 |
| | | | | 396/530 |
| 2013/0077954 A1* | 3/2013 | Oikawa | ............... | G03B 17/565 |
| | | | | 396/530 |
| 2014/0300770 A1* | 10/2014 | Izukawa | .............. | H04N 5/3572 |
| | | | | 348/222.1 |
| 2017/0237902 A1* | 8/2017 | Watanabe | ........ | H04N 5/232411 |
| | | | | 348/372 |
| 2018/0224720 A1* | 8/2018 | Pan | ...................... | H04N 5/2254 |
| 2018/0348475 A1* | 12/2018 | Sugiyama | ................ | G02B 7/14 |
| 2018/0348599 A1* | 12/2018 | Kamiya | ............. | H04N 5/23209 |
| 2018/0352139 A1* | 12/2018 | Sugita | .................... | G03B 17/14 |
| 2019/0037127 A1* | 1/2019 | Kawada | ............. | H04N 5/23209 |

FOREIGN PATENT DOCUMENTS

| | | | | |
|---|---|---|---|---|
| JP | 2010002823 | A | 1/2010 | |
| JP | 2012177929 | A | 9/2012 | |
| JP | 2014153625 | A | 8/2014 | |
| JP | 2017-181980 | A | 10/2017 | |
| JP | 2017219591 | A | 12/2017 | |
| WO | 2015137458 | A | 9/2015 | |
| WO | WO-2017170386 A1 * | | 10/2017 | ............. G03B 17/14 |

\* cited by examiner

COMMUNICATION CMD1

COMMUNICATION CMD2

FIG. 6

| LENS ATTRIBUTE INFORMATION | bit | MEANING | |
|---|---|---|---|
| 1 | b0-b7 | LENS MODEL NAME | ⎫ |
| 2-4 | | SERIAL NUMBER | ⎪ |
| 5 | b0 | WHETHER COMMUNICATION FOR FUNCTION FUNC1 IS SUPPORTED | ⎬ FIRST LENS ATTRIBUTE INFORMATION |
| | b1 | WHETHER MEMBER ITEM1 IS PROVIDED | ⎪ |
| | b2 | WHETHER IN SAFE MODE | ⎪ |
| | b3 | AVAILABLE COMMUNICATION BIT RATE | ⎪ |
| | : | | ⎪ |
| 6-8 | | LENS FIRMWARE VERSION | ⎪ |
| | : | | ⎪ |
| 20 | b0 | WHETHER COMMUNICATION MODE M3 IS SUPPORTED | ⎭ |
| 21 | b0 | WHETHER COMMUNICATION OF MASS CORRECTION DATA IS SUPPORTED | ⎫ SECOND LENS ATTRIBUTE INFORMATION |
| | b1 | WHETHER NEW LENS DRIVE IS SUPPORTED | ⎬ |
| | : | | ⎭ |

FIG. 7

| CAMERA ATTRIBUTE INFORMATION | bit | MEANING |
|---|---|---|
| 1 | b0-b7 | CAMERA MODEL NAME |
| 2 | b0 | WHETHER COMMUNICATION FOR FUNCTION FUNC1 IS SUPPORTED |
| | b1 | WHETHER COMMUNICATION MODE M3 IS SUPPORTED |
| | : | |

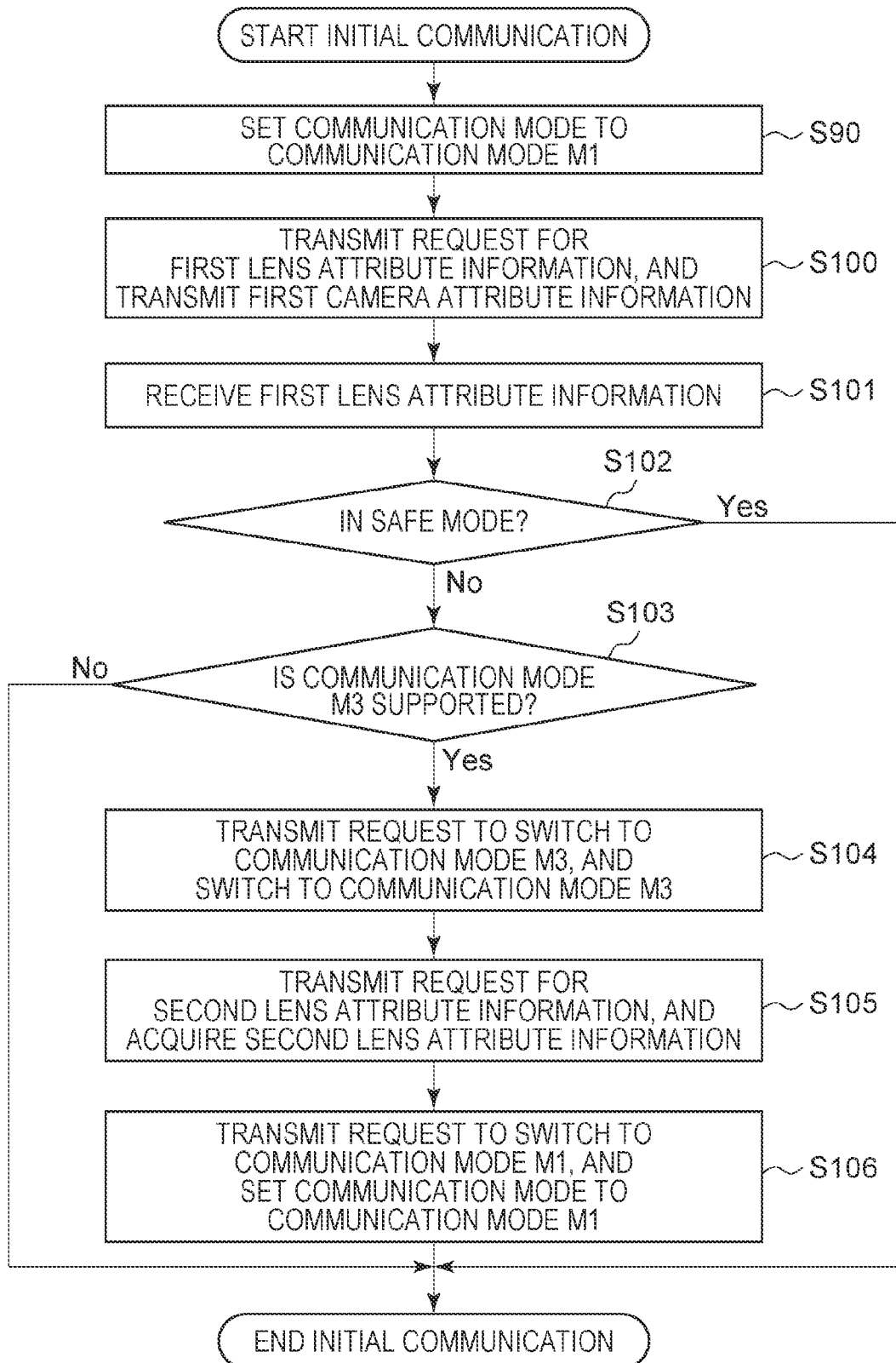

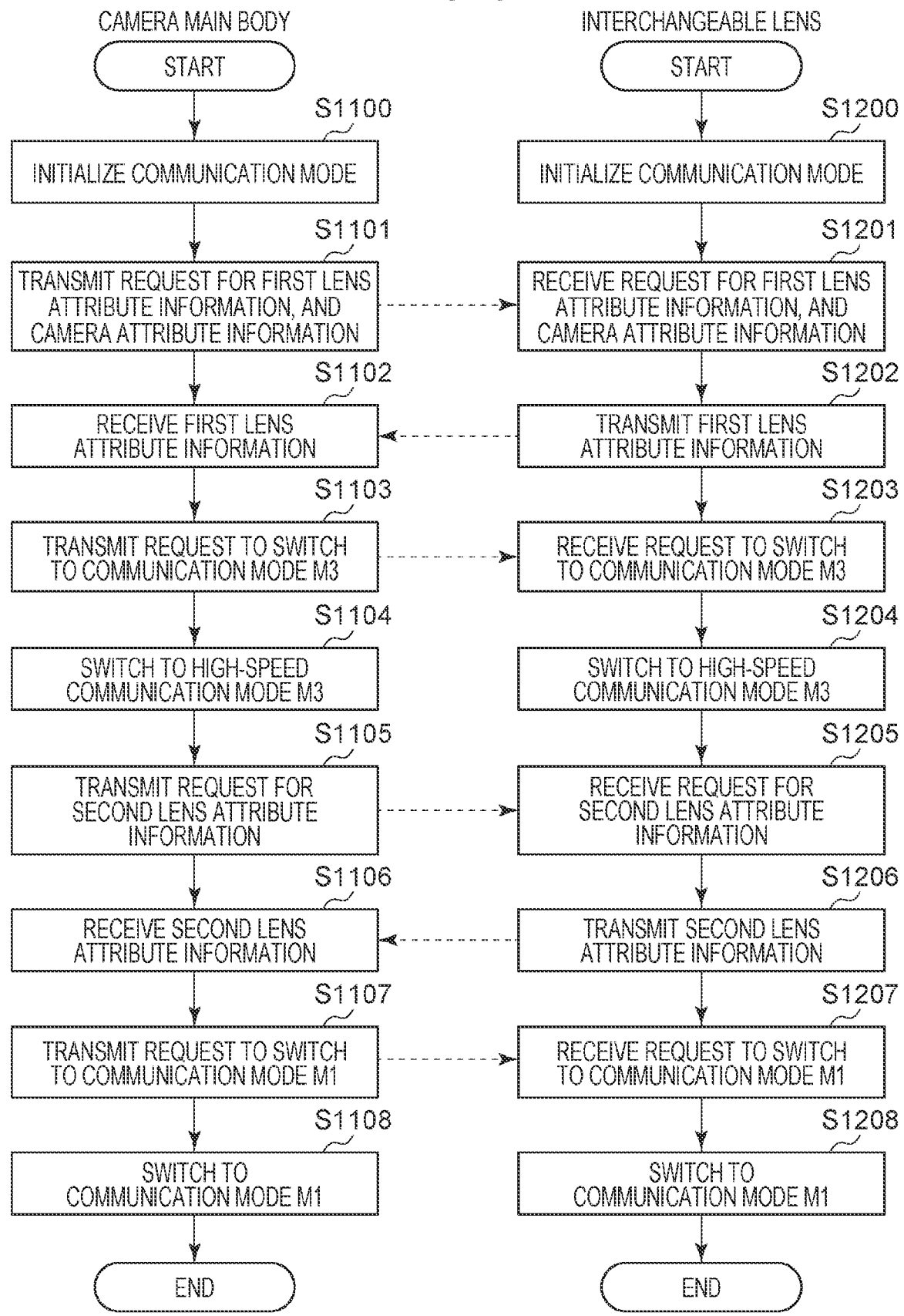

FIG. 10

| LENS ATTRIBUTE INFORMATION | bit | MEANING |
|---|---|---|
| 1 | b0-b7 | LENS MODEL NAME |
| 2-4 | | SERIAL NUMBER |
| 5 | b0 | WHETHER COMMUNICATION FOR FUNCTION FUNC1 IS SUPPORTED |
| | b1 | WHETHER MEMBER ITEM1 IS PROVIDED |
| | b2 | WHETHER IN SAFE MODE |
| | b3 | AVAILABLE COMMUNICATION BIT RATE |
| | : | : |
| 6-8 | | LENS FIRMWARE VERSION |
| | : | : |
| 10 | b0 | WHETHER INITIAL COMMUNICATION WITHOUT BUSY IS SUPPORTED |
| | : | : |
| 20 | b0 | WHETHER COMMUNICATION MODE M3 IS SUPPORTED |
| | : | : |
| 21 | b0 | WHETHER COMMUNICATION OF MASS CORRECTION DATA IS SUPPORTED |
| | b1 | WHETHER NEW LENS DRIVE IS SUPPORTED |
| | : | : |

Rows 1 through 20: FIRST LENS ATTRIBUTE INFORMATION
Row 21: SECOND LENS ATTRIBUTE INFORMATION

FIG. 11

| CAMERA ATTRIBUTE INFORMATION | bit | MEANING |
|---|---|---|
| 1 | b0-b7 | CAMERA MODEL NAME |
| 2 | b0 | WHETHER COMMUNICATION FOR FUNCTION FUNC1 IS SUPPORTED |
| | b1 | WHETHER COMMUNICATION MODE M3 IS SUPPORTED |
| ⋮ | | |
| 5 | b0 | WHETHER INITIAL COMMUNICATION WITHOUT BUSY IS SUPPORTED |
| ⋮ | | |

FIG. 14

| LENS ATTRIBUTE INFORMATION | bit | MEANING |
|---|---|---|
| 1 | b0-b7 | LENS MODEL NAME |
| 2-4 | | SERIAL NUMBER |
| 5 | b0 | WHETHER COMMUNICATION FOR FUNCTION FUNC1 IS SUPPORTED |
| | b1 | WHETHER MEMBER ITEM1 IS PROVIDED |
| | b2 | WHETHER IN SAFE MODE |
| | b3 | AVAILABLE COMMUNICATION BIT RATE |
| | : | : |
| 6-18 | | LENS FIRMWARE VERSION |
| 20 | b0 | WHETHER ASYNCHRONOUS COMMUNICATION IS SUPPORTED |
| | b1 | WHETHER COMMUNICATION OF SECOND LENS ATTRIBUTE INFORMATION IS SUPPORTED |
| | : | : |
| 21 | b0 | WHETHER COMMUNICATION OF MASS CORRECTION DATA IS SUPPORTED |
| | b1 | WHETHER NEW LENS DRIVE IS SUPPORTED |
| | : | : |

Rows 1–20: FIRST LENS ATTRIBUTE INFORMATION
Row 21: SECOND LENS ATTRIBUTE INFORMATION

FIG. 15

| CAMERA ATTRIBUTE INFORMATION | bit | MEANING |
|---|---|---|
| 1 | b0-b7 | CAMERA MODEL NAME |
| 2 | b0 | WHETHER COMMUNICATION FOR FUNCTION FUNC1 IS SUPPORTED |
| | b1 | WHETHER ASYNCHRONOUS COMMUNICATION IS SUPPORTED |
| | b2 | WHETHER COMMUNICATION OF SECOND LENS ATTRIBUTE INFORMATION IS SUPPORTED |
| | : | |

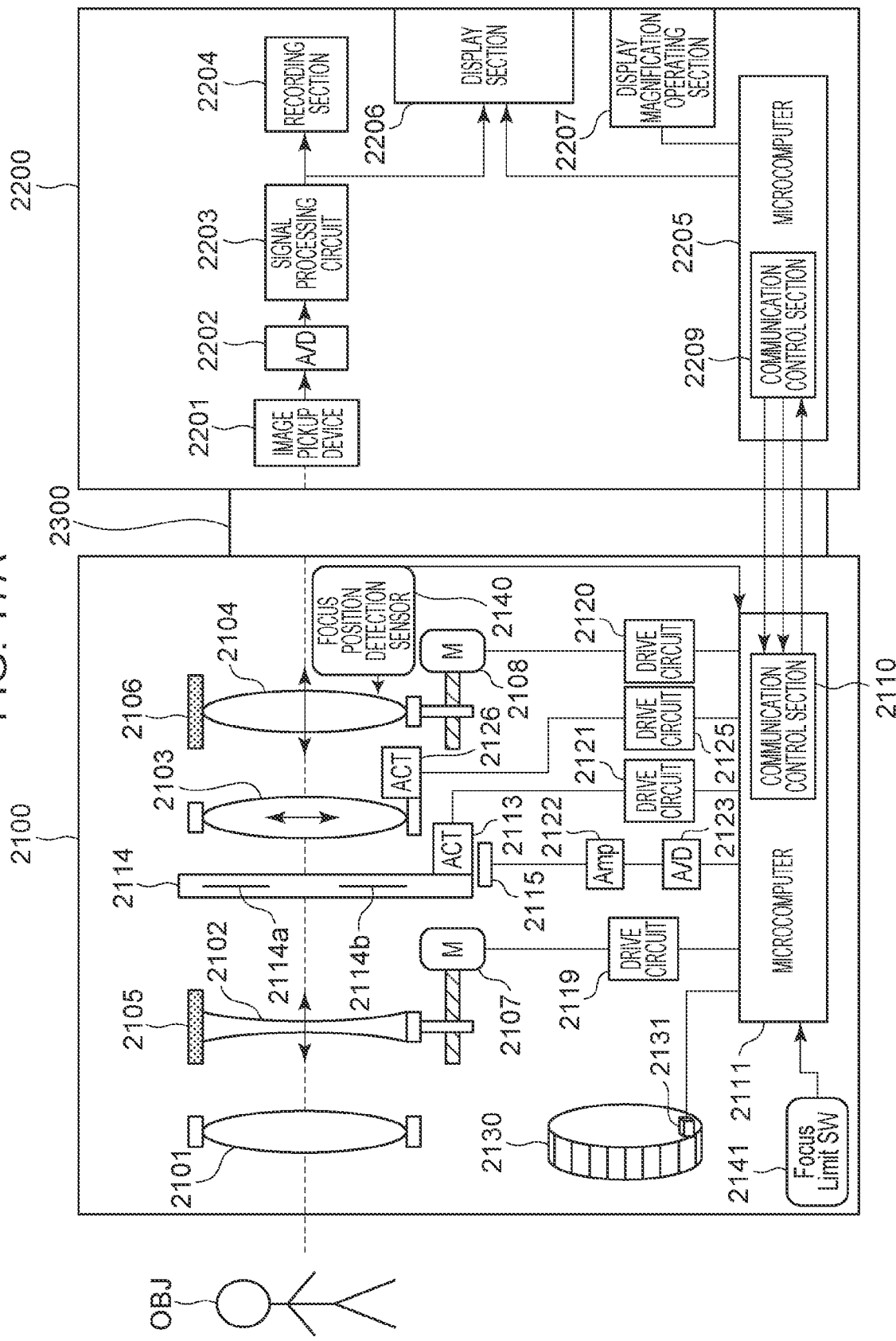

COMMUNICATION CMD1

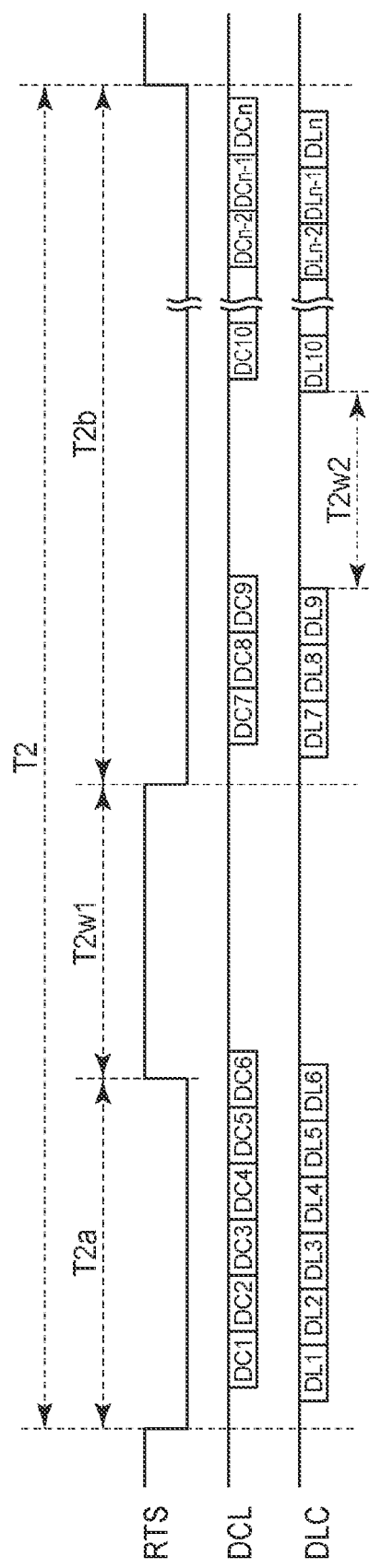

FIG. 25
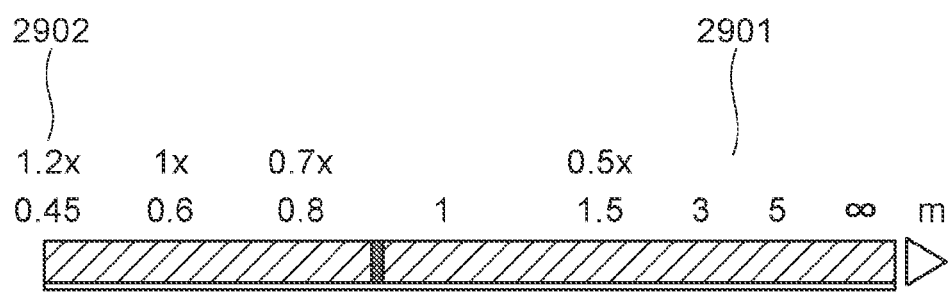
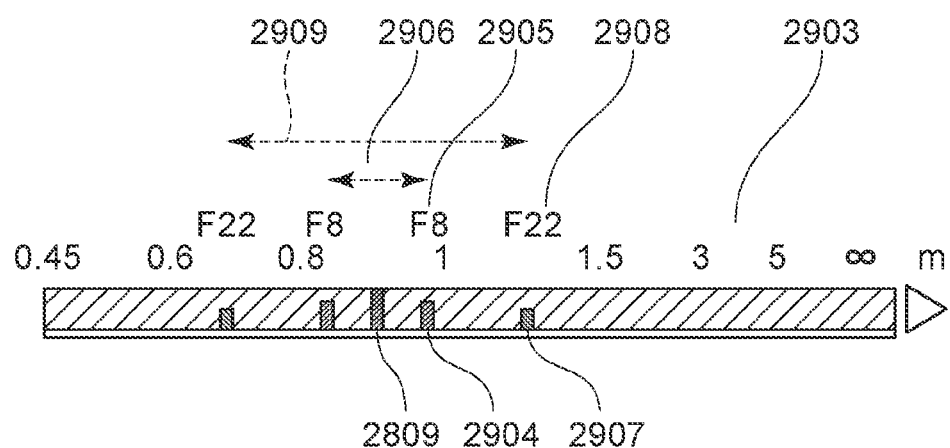

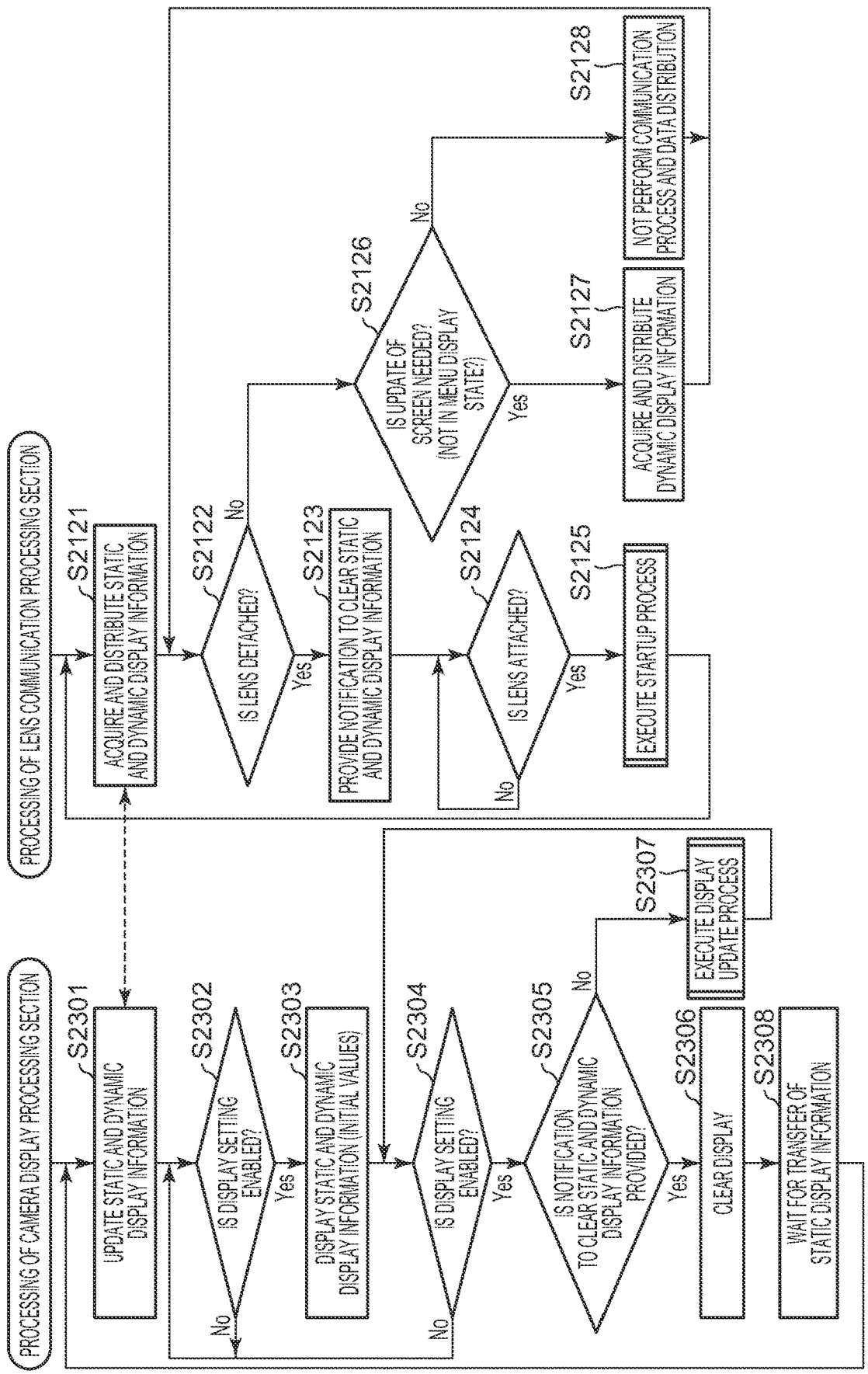

IMAGE CAPTURING APPARATUS, ACCESSORY APPARATUS, AND CONTROL METHOD THEREFOR

CROSS-REFERENCE TO RELATED APPLICATIONS

The present application is a continuation of U.S. patent application Ser. No. 17/123,742, filed on Dec. 16, 2020, which is a continuation of Continuation of International Patent Application No. PCT/JP2019/024466, filed Jun. 20, 2019, which claims the benefit of Japanese Patent Application No. 2018-118125, filed Jun. 21, 2018 and Japanese Patent Application No. 2018-165392, filed Sep. 4, 2018, which are hereby incorporated by reference herein in their entirety.

BACKGROUND OF THE INVENTION

Field of the Invention

The present invention relates to communication between an image capturing apparatus and an accessory apparatus.

Background Art

In an accessory interchangeable camera system including a camera main body from which an accessory apparatus (for example, a lens apparatus) is detachable, communication for the camera main body to control the accessory apparatus and for the accessory apparatus to transmit data used in the control or imaging to the camera main body is performed. A technology for initial communication to exchange information needed in performing the above communication between the camera main body and the accessory apparatus in response to mounting of the accessory apparatus on the camera main body is known.

Japanese Patent Laid-Open No. 2017-187811 describes that, in initial communication, a communication format is set in accordance with information on a communication bit rate, exchanged between the camera main body and the accessory apparatus.

CITATION LIST

Patent Literature

PTL 1: Japanese Patent Laid-Open No. 2017-187811

According to Japanese Patent Laid-Open No. 2017-187811, the camera main body and the accessory apparatus are capable of performing communication at a further appropriate communication bit rate.

However, in Japanese Patent Laid-Open No. 2017-187811, there is nothing about by what communication format, communication method, or communication the initial communication is specifically implemented.

SUMMARY OF THE INVENTION

It is an object of the present invention to provide an image capturing apparatus, an accessory apparatus, and a control method therefor, which further speed up initial communication.

A first aspect of the present invention provides an image capturing apparatus to which an accessory apparatus is attachable, the image capturing apparatus comprising: a communication control section that controls transmission of a signal to the accessory apparatus through a first communication channel, transmission of data to the accessory apparatus through a third communication channel, and reception of data from the accessory apparatus through a second communication channel, and controls reception of accessory attribute information of the accessory apparatus through the second communication channel, wherein the communication control section controls communication so as to receive first accessory attribute information of the accessory attribute information through the second communication channel by using a first communication method, then switches from the first communication method to a second communication method different from the first communication method, and receives second accessory attribute information of the accessory attribute information through the second communication channel by using the second communication method, the first communication method is a communication method in which, at a timing corresponding to transmission, through the first communication channel, of a clock signal of which a signal level switches alternately between a first signal level and a second level different from the first signal level, transmission of data through the third communication channel and reception of data through the second communication channel are performed, the second communication method is a communication method in which, in response to reception, through the second communication channel, of data transmitted in response to switching of the signal level of the first communication channel from the first signal level to the second signal level, transmission of data is performed through the third communication channel, and the communication control section is implemented by at least one processor or circuitry, or combination thereof.

A second aspect of the present invention provides an accessory apparatus to which an image capturing apparatus is attachable, the accessory apparatus comprising: a communication control section configured to control reception of a signal from the image capturing apparatus through the first communication channel, reception of data from the image capturing apparatus through the third communication channel, and transmission of data to the image capturing apparatus through the second communication channel, and control transmission of accessory attribute information of the accessory apparatus through the second communication channel, wherein the communication control section is configured to transmit first accessory attribute information of the accessory attribute information through the second communication channel by using a first communication method and then switch from the first communication method to a second communication method different from the first communication method, and control communication so as to transmit second accessory attribute information of the accessory attribute information through the second communication channel by using the second communication method, the first communication method is a communication method in which, at a timing corresponding to reception, through the first communication channel, of a clock signal of which a signal level switches alternately between a first signal level and a second level different from the first signal level, reception of data through the third communication channel and transmission of data through the second communication channel are performed, the second communication method is a communication method in which, in response to transmission of data through the second communication channel in response to switching of the signal level of the first communication channel from the first signal level to the second signal level, data is received through the third communication channel, and the communication control section is implemented by at least one processor or circuitry, or combination thereof.

Further features of the present invention will become apparent from the following description of exemplary embodiments with reference to the attached drawings.

BRIEF DESCRIPTION OF THE DRAWINGS

FIG. 6 is a table showing lens attribute information of an interchangeable lens in the first embodiment.

FIG. 7 is a table showing camera attribute information of the camera main body in the first embodiment.

FIG. 8 is a flowchart showing an initial communication sequence (camera) in the first embodiment.

FIG. 9 illustrates flowcharts showing an initial communication sequence (cooperation between camera and lens) in the first embodiment.

FIG. 10 is a table showing lens attribute information of an interchangeable lens in a second embodiment.

FIG. 11 is a table showing camera attribute information of a camera main body in the second embodiment.

FIG. 14 is a table showing lens attribute information of an interchangeable lens in a third embodiment.

FIG. 15 is a table showing camera attribute information of a camera main body in the third embodiment.

FIG. 17A is a diagram illustrating the configuration of a camera system including an image capturing apparatus and an accessory apparatus according to an embodiment of the present invention.

FIG. 21C is a schematic view showing signal waveforms in the communication mode M3.

FIG. 25 is a schematic screen view showing magnification information and depth-of-field information in the shooting distance bar information displayed on the image capturing apparatus.

FIG. 27A illustrates flowcharts for explaining a steady operation of the image capturing apparatus and the accessory apparatus.

DESCRIPTION OF THE EMBODIMENTS

Hereinafter, embodiments of the present invention will be described with reference to the attached drawings. Each embodiment relates to communication control between an image capturing apparatus (hereinafter, referred to as camera main body) and an interchangeable lens serving as an accessory apparatus. Initially, the definition of terms in the embodiments will be described. The following embodiments may also be applied to cases where the accessory apparatus is other than an interchangeable lens, and the accessory apparatus may be, for example, an intermediate accessory attached between an interchangeable lens and an image capturing apparatus.

A "communication format" indicates a protocol used in the entire communication between the camera main body and the interchangeable lens. A "communication method" of the present embodiment is a clock synchronous method or an asynchronous method. A "data format" indicates whether addition of a BUSY signal is allowed. A data format that allows addition of a BUSY signal is referred to as "format F1", and a data format that prohibits addition of a BUSY signal is referred to as "format F2".

A "communication mode" means a combination of a communication method and a data format. In the embodiments, the following three communication modes will be described. A "communication mode M1" is a control communication mode in which the format F1 is applied in the clock synchronous method. "A communication mode M2" is a control communication mode in which the format F1 is applied in the asynchronous method. A communication mode M3 is a mass communication mode in which the format F2 is applied in the asynchronous method.

First Embodiment

<Configuration of Camera System>

Figure 1:
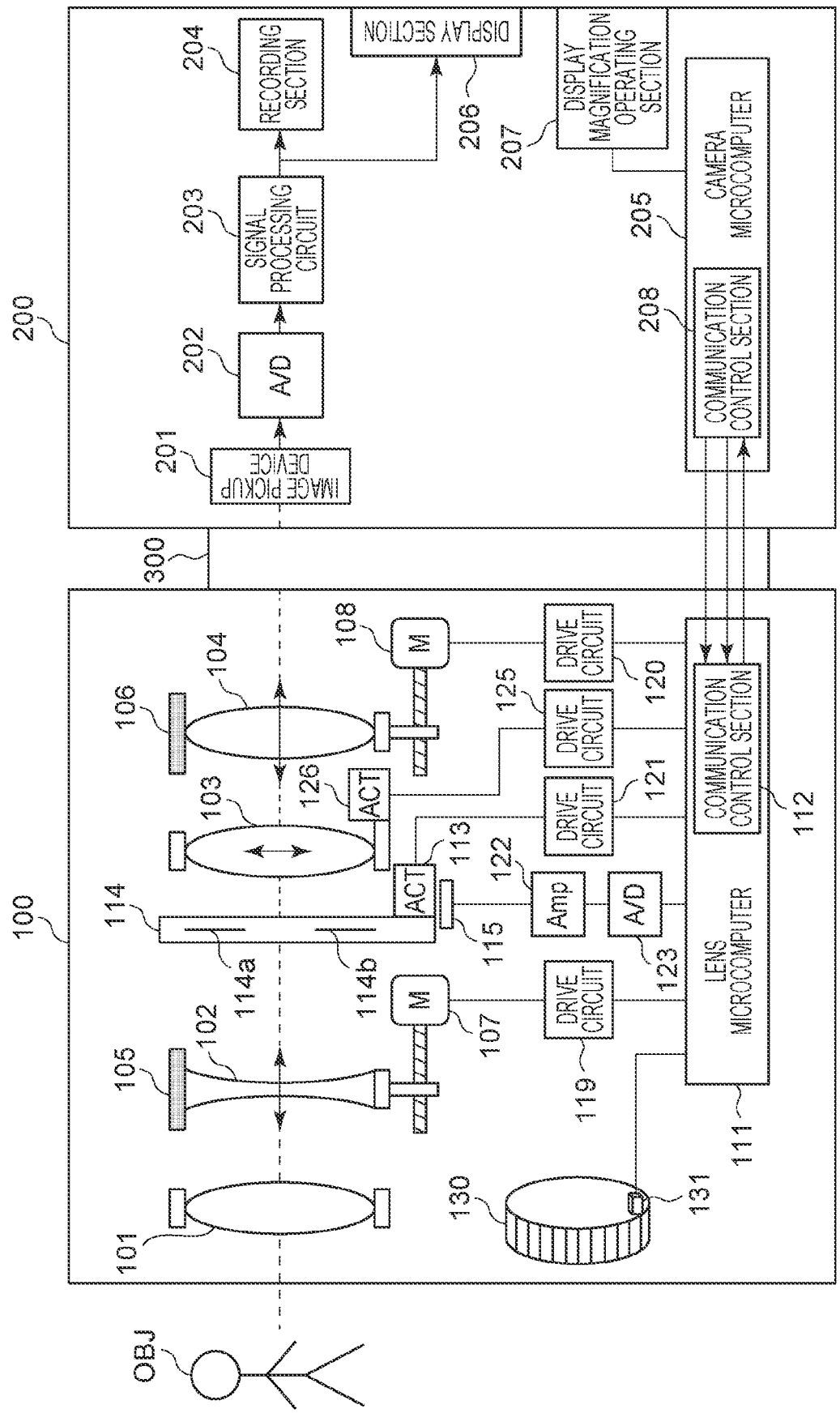
FIG. 1 is a block diagram showing the configuration of a camera system of a first embodiment.

FIG. 1 shows the configuration of an image capturing system (hereinafter, referred to as camera system) including a camera main body 200 as an image capturing apparatus of a first embodiment of the present invention and an interchangeable lens 100 as an accessory apparatus detachably attached to the camera main body 200.

Each of the camera main body 200 and the interchangeable lens 100 transmits control commands and internal information via its own communication control section. The communication control sections each supports a plurality of communication formats and is capable of selecting an optimal communication format for each of various situations by switching into the same communication format in synchronization with each other in accordance with a type of communication data and a communication purpose.

Initially, a specific configuration of the interchangeable lens 100 and the camera main body 200 will be described. The interchangeable lens 100 and the camera main body 200 are mechanically and electrically connected via a mount 300 that is a coupling mechanism. The interchangeable lens 100 receives electric power supplied from the camera main body 200 via a power supply terminal (not shown) provided at the mount 300 and controls various actuators (described later) and a lens microcomputer (hereinafter, referred to as lens microcomputer) 111. The interchangeable lens 100 and the camera main body 200 communicate with each other via communication terminals (shown in FIG. 2) provided at the mount 300.

The interchangeable lens 100 has an imaging optical system. The imaging optical system includes a field lens 101, a variable magnification lens 102 that performs variable magnification, a diaphragm unit 114 that adjusts the light quantity, an image blur correction lens 103, and a focus lens 104 that performs focusing, in order from an object OBJ side.

The variable magnification lens 102 and the focus lens 104 are respectively held by lens holding frames 105, 106. The lens holding frames 105, 106 each is guided by a guide shaft (not shown) so as to be movable in an optical axis direction indicated by the dashed line in the drawing and each is driven in the optical axis direction by a corresponding one of stepping motors 107, 108. The stepping motors 107, 108 respectively move the variable magnification lens 102 and the focus lens 104 in synchronization with a drive pulse.

The image blur correction lens 103 reduces an image blur due to camera shake or the like by moving in a direction perpendicular to the optical axis of the imaging optical system.

The lens microcomputer 111 is an accessory control section that controls the operations of the components in the interchangeable lens 100. The lens microcomputer 111 receives a control command transmitted from the camera main body 200 via a lens communication control section 112 as an accessory communication control section to receive a request to transmit lens data. The lens microcomputer 111 executes lens control corresponding to the control command and transmits lens data corresponding to the transmission request to the camera main body 200 via the lens communication control section 112.

The lens microcomputer 111 drives the stepping motor 107 and the stepping motor 108 by outputting drive signals to a zoom drive circuit 119 and a focus drive circuit 120 in response to a command related to variable magnification and a command related to focusing within the control command. With this configuration, a zoom process of controlling a variable magnification operation with the variable magnification lens 102 and an autofocus process of controlling a focusing operation with the focus lens 104 are executed.

The diaphragm unit 114 includes diaphragm blades 114a, 114b. States of the diaphragm blades 114a, 114b are detected by a Hall element 115 and are input to the lens microcomputer 111 via an amplifier circuit 122 and an A/D converter circuit 123. The lens microcomputer 111 drives a diaphragm actuator 113 by outputting a drive signal to a diaphragm drive circuit 121 in accordance with the input signal from the A/D converter circuit 123. With this configuration, a light quantity adjustment operation with the diaphragm unit 114 is controlled.

Furthermore, the lens microcomputer 111 drives a vibration control actuator 126 via a vibration control drive circuit 125 depending on a shake detected by a shake sensor (not shown), such as a vibration gyro, provided in the interchangeable lens 100. With this configuration, an image stabilization process of controlling a shift operation of the image blur correction lens 103 is executed.

The camera main body 200 includes an image pickup device 201, such as a CCD sensor and a CMOS sensor, an A/D converter circuit 202, a signal processing circuit 203, a recording section 204, a camera microcomputer (hereinafter, referred to as camera microcomputer) 205, and a display section 206.

The image pickup device 201 performs photoelectric conversion of an object image formed by the imaging optical system in the interchangeable lens 100 and outputs an electrical signal (analog signal). The A/D converter circuit 202 converts the analog signal from the image pickup device 201 to a digital signal. The signal processing circuit 203 generates a video signal by executing various image processing on the digital signal from the A/D converter circuit 202.

The signal processing circuit 203 also generates focus information that indicating the state of contrast of an object image from the video signal, that is, focus state of the imaging optical system and luminance information indicating an exposure state. The signal processing circuit 203 outputs the video signal to the display section 206. The display section 206 displays the video signal as a live view image used to check the composition, the focus, and the like.

The camera microcomputer 205 as a camera control section controls the camera main body 200 in accordance with inputs from camera operating members such as an image capturing instruction switch and various setting switches (not shown). The camera microcomputer 205 transmits a control command related to the variable magnification operation of the variable magnification lens 102 to the lens microcomputer 111 in response to operation of a zoom switch (not shown) via a camera data transmission/reception section 208b. The camera microcomputer 205 transmits a control command related to the light quantity adjustment operation by the diaphragm unit 114 based on luminance information and the focusing operation by the focus lens 104 based on focus information to the lens microcomputer 111 via the camera data transmission/reception section 208b. The camera microcomputer 205 performs an operation related to communication with the lens microcomputer 111 in accordance with a communication control program as a computer program.

<Configuration of Clock Synchronous Communication>

Figure 2:
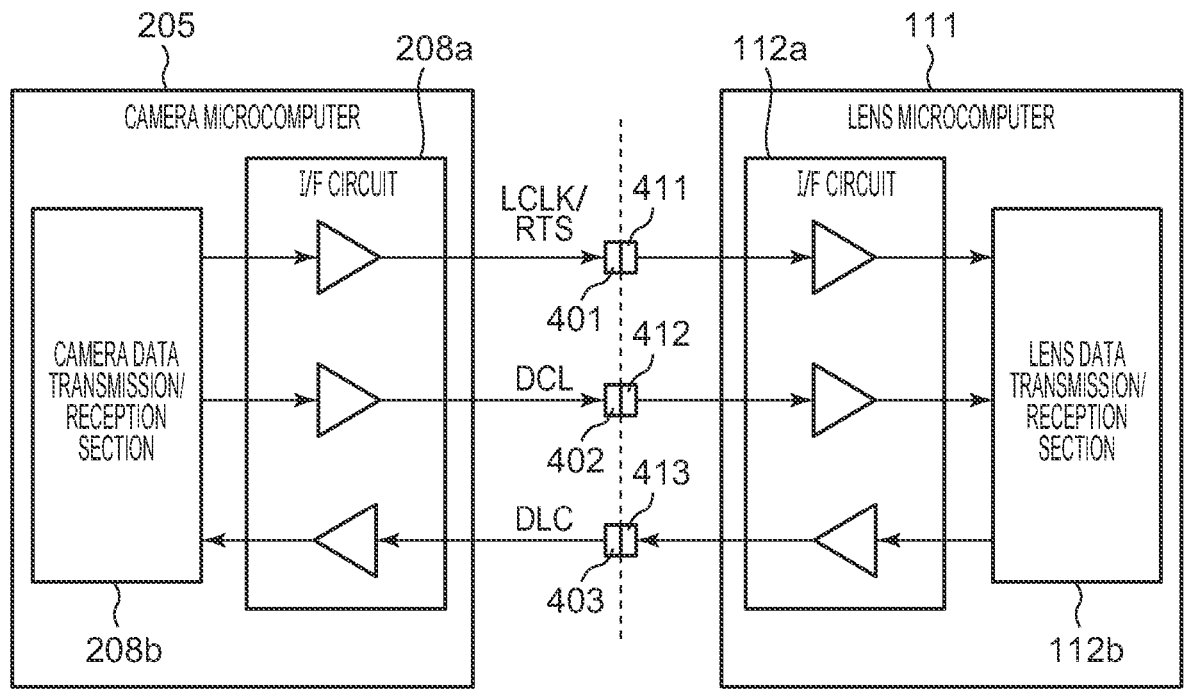
FIG. 2 is a diagram showing a communication circuit between a camera main body (camera microcomputer) and an interchangeable lens (lens microcomputer) in the first embodiment.

Next, a communication circuit arranged between the camera main body 200 (camera microcomputer 205) and the interchangeable lens 100 (lens microcomputer 111) and communication performed therebetween will be described with reference to FIG. 2. The camera microcomputer 205 has a function of managing a communication mode with the lens microcomputer 111 and a function of providing notification, such as a transmission request, to the lens microcomputer 111. The lens microcomputer 111 has a function of generating lens data and a function of transmitting the lens data.

The camera microcomputer 205 and the lens microcomputer 111 communicate with each other via communication terminal portions (represented by three rectangles in the drawing) provided in the mount 300 and communication interface circuits 208a, 112a respectively provided in the camera microcomputer 205 and the lens microcomputer 111. In the present embodiment, the camera microcomputer 205 and the lens microcomputer 111 perform serial communication through three channels with a (three-wire) clock synchronous method or asynchronous method. A camera communication control section is made up of the communication interface circuit 208a and the camera data transmission/reception section 208b. The accessory communication control section is made up of the communication interface circuit 112a and a lens data transmission/reception section 112b.

One of the three channels is a first communication channel that functions as a clock channel in the clock synchronous method and functions as a transmission request channel in the asynchronous method. One of the other two channels is a second communication channel used to transmit lens data from the lens microcomputer 111 to the camera microcomputer 205. The remaining one channel is a third communication channel used to transmit camera data from the camera microcomputer 205 to the lens microcomputer 111. Lens data (accessory data) transmitted as a signal from the lens microcomputer 111 to the camera microcomputer 205 through the second communication channel is referred to as a lens data signal DLC. Camera data transmitted as a signal from the camera microcomputer 205 to the lens microcomputer 111 through the third communication channel is referred to as a camera data signal DCL.

Each of the camera main body 200 and the interchangeable lens 100 has a mount portion (not shown). The mount portion of the camera main body 200 has a communication terminal 401, a communication terminal 402, and a communication terminal 403. The mount portion of the interchangeable lens 100 has a communication terminal 411, a communication terminal 412, and a communication terminal 413. The camera main body 200 and the interchangeable lens 100 are attached to each other via the mount portions. When attached, the communication terminal 401 and the communication terminal 411 contact with each other, and communication through the first communication channel via the communication terminal 401 and the communication terminal 411 is possible. In addition, the communication terminal 402 and the communication terminal 412 contact with each other, and communication through the third communication channel via the communication terminal 402 and the communication terminal 412 is possible. Furthermore, the communication terminal 403 and the communication terminal 413 contact with each other, and communication through the second communication channel via the communication terminal 403 and the communication terminal 413 is possible.

Initially, communication in the clock synchronous method will be described. In the clock synchronous method, a clock signal LCLK is output through the clock channel from the camera microcomputer 205 as a communication master to the lens microcomputer 111 as a communication slave. A camera data signal DCL includes a control command, a transmission request command, and the like from the camera microcomputer 205 to the lens microcomputer 111. On the other hand, a lens data signal DLC includes various data to be transmitted from the lens microcomputer 111 to the camera microcomputer 205 in synchronization with a clock signal LCLK. The camera microcomputer 205 and the lens microcomputer 111 perform communication with a full duplex communication method (full duplex method) in which the camera microcomputer 205 and the lens microcomputer 111 perform transmission and reception to and from each other at the same time in synchronization with a common clock signal LCLK.

Figure 3A:
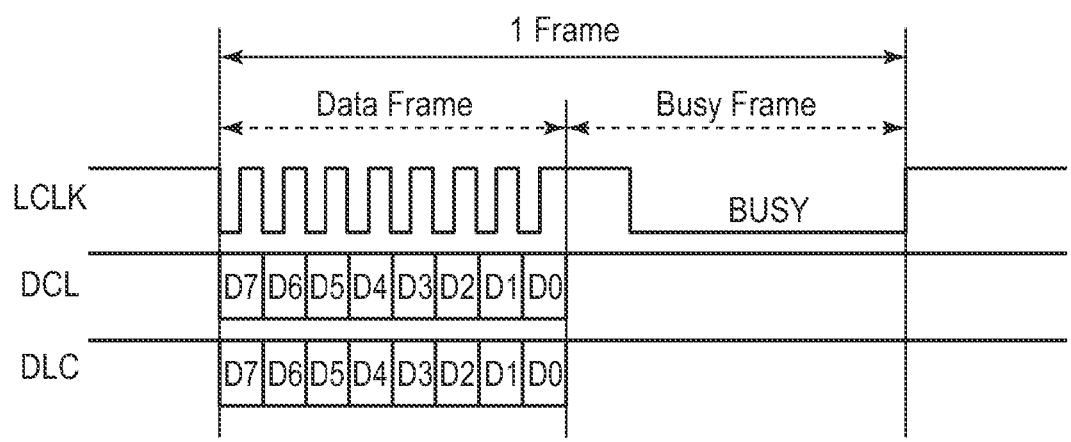
FIG. 3A is a view showing signal waveforms in a communication mode M1 in the first embodiment.
Figure 3B:
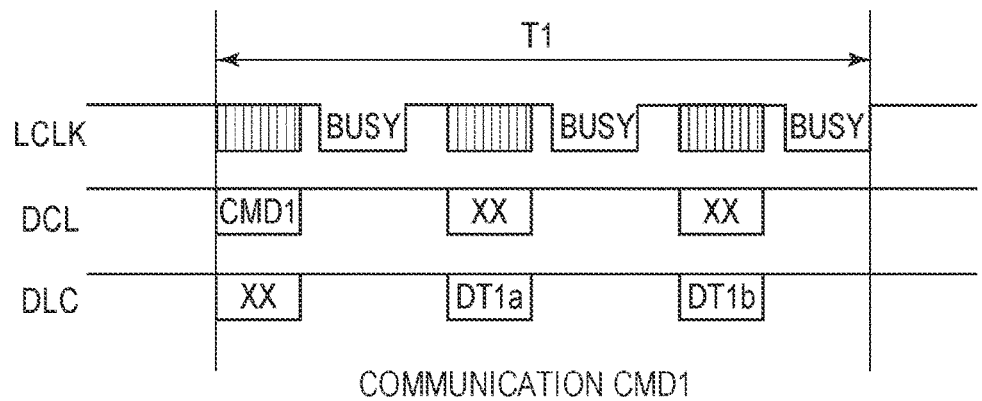
FIG. 3B is a view showing signal waveforms in the communication mode M1 in the first embodiment.
Figure 3C:
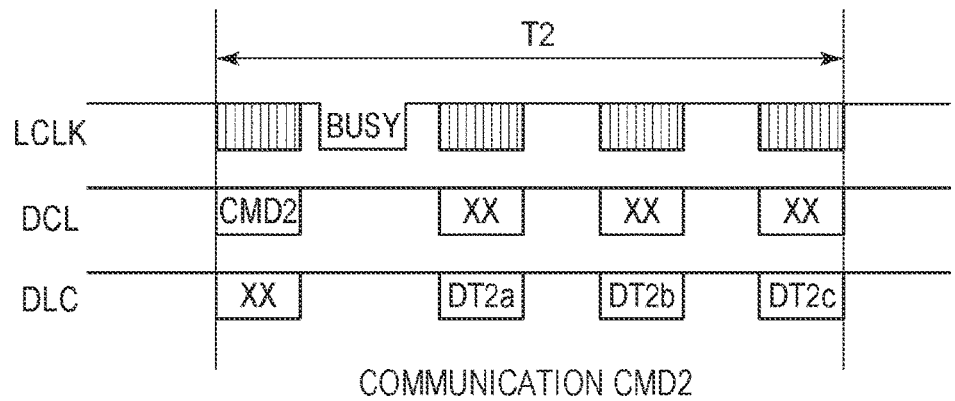
FIG. 3C is a view showing signal waveforms in the communication mode M1 in the first embodiment.

FIG. 3A to FIG. 3C show the waveforms of signals exchanged between the camera microcomputer 205 and the lens microcomputer 111. An arrangement in which a procedure of such exchange is referred to as communication protocol.

FIG. 3A shows signal waveforms of one frame that is a minimum communication unit. Initially, the camera microcomputer 205 outputs a clock signal LCLK that is a set of eight-cycle clock pulses by alternately switching the signal level (voltage level) of the clock channel between High (first signal level) and Low (second signal level). The camera microcomputer 205 also transmits a camera data signal DCL to the lens microcomputer 111 in synchronization with the clock signal LCLK. At the same time, the camera microcomputer 205 receives a lens data signal DLC output from the lens microcomputer 111 in synchronization with the clock signal LCLK. In this way, one-byte (eight-bit) data is transmitted and received in synchronization with a single-set clock signal LCLK between the lens microcomputer 111 and the camera microcomputer 205. A period of transmitting and receiving one-byte data is referred to as data frame. After transmission and reception of the data in the data frame, as will be described in detail later, the lens microcomputer 111 transmits a signal providing notification of a communication standby request BUSY (hereinafter, referred to as BUSY signal) to the camera microcomputer 205, with the result that a communication stop period is inserted. The communication stop period is referred to as BUSY frame. A communication unit including a set of a data frame period and a BUSY frame period is one frame. Note that depending on a communication condition, a BUSY frame may be not added, and, in this case, one frame is composed of only a data frame period.

FIG. 3B shows signal waveforms over three consecutive frames in "communication CMD1" in which the camera microcomputer 205 transmits a request command CMD1 to the lens microcomputer 111 and receives two-byte lens data DT1 (DT1a, DT1b) in response to the request command CMD1 from the lens microcomputer 111. Between the camera microcomputer 205 and the lens microcomputer 111, the type and byte count of lens data DT associated with each of multiple types of commands CMD are determined in advance. When the camera microcomputer 205 that is a communication master (clock master) transmits a command CMD to the lens microcomputer 111, the lens microcomputer 111 transmits a necessary clock number to the camera microcomputer 205 in accordance with information on a byte count of lens data corresponding to the command CMD. A process executed by the lens microcomputer 111 in response to the command CMD1 includes superimposing a BUSY signal on a clock signal LCLK of each frame, and the above-described BUSY frame is inserted between the frames.

In the "communication CMD1", the camera microcomputer 205 transmits a clock signal LCLK to the lens microcomputer 111 and further transmits a request command CMD1 to request for transmission of lens data DT1 to the lens microcomputer 111 as a camera data signal DCL. A lens data signal DLC in this frame is treated as invalid data.

Subsequently, the camera microcomputer 205 outputs a clock signal LCLK through the clock channel for eight cycles and then switches the clock channel in the camera microcomputer (camera main body) from output setting to input setting. When switching of the clock channel in the camera microcomputer is completed, the lens microcomputer 111 switches the clock channel in the lens microcomputer 111 (interchangeable lens) from input setting to output setting. The lens microcomputer 111 sets the signal level (voltage level) of the clock channel to Low to provide a communication standby request BUSY to the camera microcomputer 205. Thus, a BUSY signal is superimposed on the clock channel. The camera microcomputer 205 maintains input setting in the clock channel and stops communication with the lens microcomputer 111 while notification of the communication standby request BUSY is being provided.

The lens microcomputer 111 generates lens data DT1 corresponding to the transmission request command CMD1 during a period of providing the communication standby request BUSY. When the lens microcomputer 111 completes preparations for transmitting the lens data DT1 as a lens data signal DLC in the next frame, the lens microcomputer 111 switches the signal level of the clock channel in the lens microcomputer to High and cancels the communication standby request BUSY. When the camera microcomputer 205 recognizes the cancellation of the communication standby request BUSY, the camera microcomputer 205 transmits one-frame of clock signal LCLK to the lens microcomputer 111 to receive lens data DT1a from the lens microcomputer 111. When the camera microcomputer 205 outputs a clock signal LCLK for eight cycles again and the camera microcomputer 205 and the lens microcomputer 111 repeat an operation similar to the above operation in the next frame, the camera microcomputer 205 receives lens data DT1b from the lens microcomputer 111.

FIG. 3C shows the signal waveforms of communication using a communication format F2 in the clock synchronous method. Four-frame signal waveforms in "communication CMD2" in which the camera microcomputer 205 transmits a request command CMD2 to the lens microcomputer 111 and receives three-byte lens data DT2 (DT2a to DT2c) from the lens microcomputer 111 in response to the request command CMD2 are shown. A process executed by the lens microcomputer 111 with respect to the request command CMD2 in this "communication CMD2" includes superimposing a BUSY signal on a clock channel only in the first frame. In other words, the lens microcomputer 111 does not superimpose a BUSY signal on the subsequent second frame to fourth frame. Thus, no BUSY frame is inserted between the frames from the second frame to the fourth frame, so it is possible to shorten a time between the frames. However, during a period in which no BUSY frame is inserted, the lens microcomputer 111 is not able to transmit a communication standby request to the camera microcomputer 205. Therefore, it is necessary to determine in advance the number of data to be transmitted and transmission intervals with or at which no failure of communication occurs accordingly, a priority of communication in the lens microcomputer 111, and the like.

<Characteristic of Clock Synchronous Communication>

In this way, data communication through the second channel and the third channel is performed in synchronization with a clock signal LCLK transmitted from the camera microcomputer 205, so the timing of a clock signal and the timing of a data signal are less likely to be off from each other. Therefore, the communication method has a high-reliability characteristic.

On the other hand, with such a configuration that a clock signal LCLK is transmitted from the camera microcomputer 205, when the communication rate is too high, it may be not possible to appropriately perform data communication through the second channel and the third channel under the influence of noise on the clock signal LCLK. Therefore, to perform clock synchronous communication while taking advantage of the high-reliability characteristic, it is necessary to add some constraints to the communication rate in consideration of the influence of noise.

It is possible to perform one-bit communication at both the timing at which the clock signal LCLK switches from High to Low and the timing at which the clock signal LCLK switches from Low to High in principle; however, anti-noise measures, anti-distortion measures, and the like for the clock signal LCLK are needed, so an electrical circuit becomes complex. In other words, there arises such a disadvantage that cost increases.

<Configuration of Asynchronous Communication>

Figure 4A:
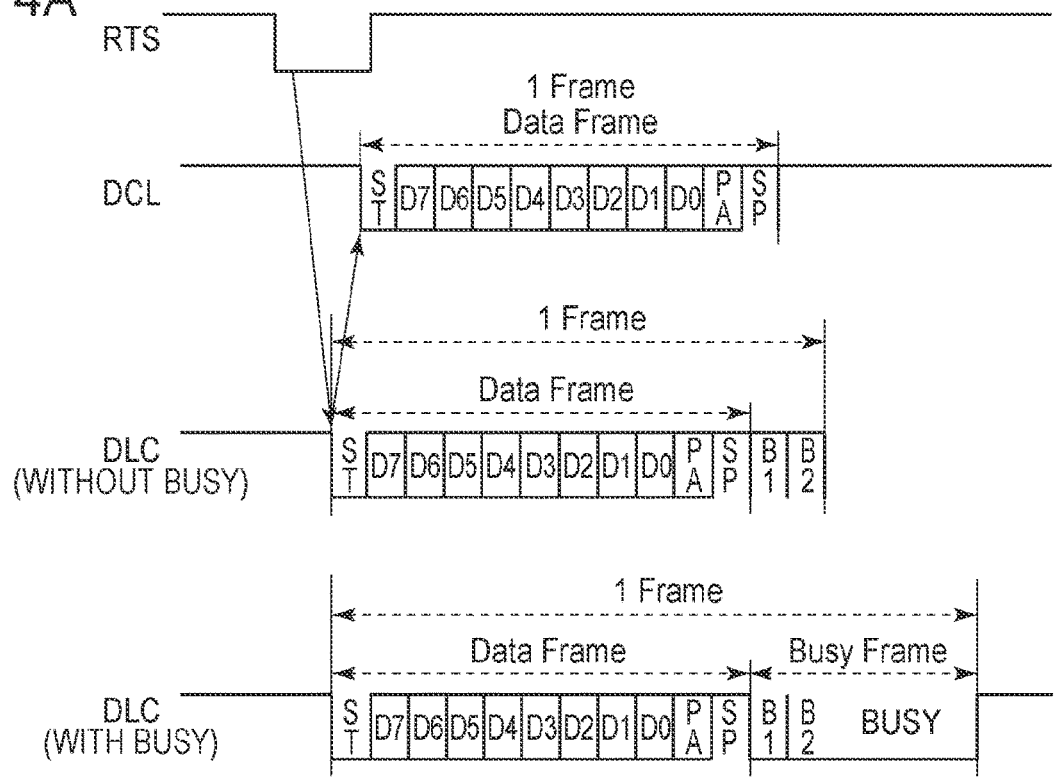
FIG. 4A is a view showing signal waveforms in a communication mode M2 in the first embodiment.
Figure 4B:
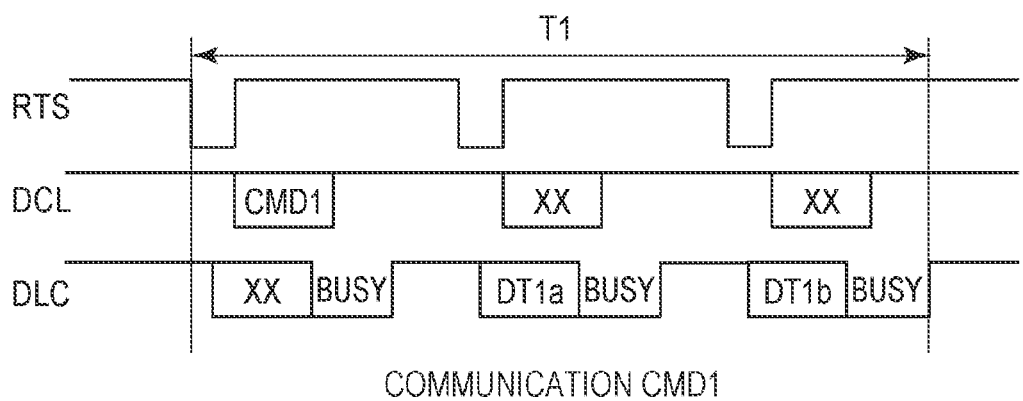
FIG. 4B is a view showing signal waveforms in the communication mode M2 in the first embodiment.
Figure 4C:
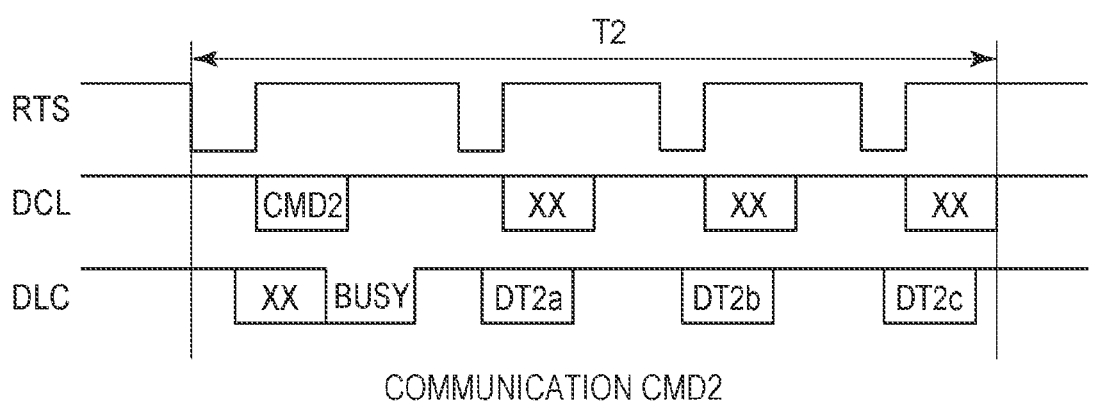
FIG. 4C is a view showing signal waveforms in the communication mode M2 in the first embodiment.

Next, asynchronous communication will be described. The communication mode M2 in which communication is performed by using the format F1 in the asynchronous method will also be described. FIG. 4 shows the waveforms of communication signals exchanged between the camera microcomputer 205 and the lens microcomputer 111 in the communication mode M2. As described above, in the format F1, addition of a BUSY frame to a lens data signal DLC is allowed.

In the asynchronous method, a transmission request channel (RTS) is used to provide notification of, for example, a request (transmission instruction) to transmit lens data from the camera microcomputer 205 that is a communication master to the lens microcomputer 111 as a communication slave. Notification through the transmission request channel is performed by changing the level (voltage level) of a signal in the transmission request channel from High (first signal level) to Low (second signal level). In the following description, a signal supplied through the transmission request channel is referred to as transmission request signal RTS.

The second communication channel, as well as the clock synchronous method, is used to transmit a lens data signal DLC including various data from the lens microcomputer 111 to the camera microcomputer 205. The third communication channel, as in the case of the clock synchronous method, is also used to transmit a camera data signal DCL including a control command, a transmission request command, and the like from the camera microcomputer 205 to the lens microcomputer 111.

In the asynchronous method, different from the clock synchronous method, the camera microcomputer 205 and the lens microcomputer 111 do not transmit or receive data in synchronization with a common clock signal, and set a communication speed in advance and perform transmission or reception at a communication bit rate in accordance with the setting. The communication bit rate indicates an amount of data that can be transferred in a second, and its unit is in bps (bits per second).

In the present embodiment, in the asynchronous method, as well as the clock synchronous method, the camera microcomputer 205 and the lens microcomputer 111 perform communication with a full duplex communication method (full duplex method) in which the camera microcomputer 205 and the lens microcomputer 111 transmit and receive signals to and from each other.

FIG. 4 shows the signal waveforms of one frame that is a minimum communication unit. A breakdown of one-frame data format has a portion that partially varies between a camera data signal DCL and a lens data signal DLC.

Initially, a data format of the lens data signal DLC will be described. One frame of lens data signal DLC is roughly composed of a first-half data frame and a subsequent BUSY frame. The signal level of the lens data signal DLC is maintained at High in a non-transmission state in which no data transmission is being performed.

The lens microcomputer 111 sets the signal level of the lens data signal DLC to Low for a one-bit period in order to notify the start of transmission of a frame of a lens data signal DLC to the camera microcomputer 205. The one-bit period is referred to as a start bit ST indicating the start of a frame. In other words, a data frame is started with the start bit ST. A start bit ST is provided at the leading bit of each frame of a lens data signal DLC. Subsequently, the lens microcomputer 111 transmits one-byte lens data in an eight-bit period from the next second bit to the ninth bit. A bit array of data begins with the highest-bit data D7, followed by data D6, data D5, and so forth, and ends with the lowest-bit data D0, as an MSB first format. The lens microcomputer 111 adds one-bit parity information (PA) to the tenth bit and sets the signal level of a lens data signal DLC in a period of a stop bit SP indicating the end of the frame to High. Thus, a data frame period that begins with the start bit ST ends.

Subsequently, as represented by "DLC (with BUSY)" in the drawing, the lens microcomputer 111 adds a BUSY frame after the stop bit SP. A BUSY frame, as in the case of the clock synchronous method, denotes a period of a communication standby request BUSY to be provided from the lens microcomputer 111 to the camera microcomputer 205. The lens microcomputer 111 holds the signal level of the lens data signal DLC at Low until the communication standby request BUSY is cancelled. When the signal level of the lens data signal DLC is held at Low, the camera microcomputer 205 controls such that notification via a transmission request channel (RTS) is not provided from the camera microcomputer 205. In other words, the camera microcomputer 205 executes control (this control is also referred to as first control) such that the signal level of the first communication channel is not switched from High to Low.

On the other hand, there is a case where notification of a communication standby request BUSY from the lens microcomputer 111 to the camera microcomputer 205 is not needed. For this case, as represented by "DLC (without BUSY)" in the drawing, a data format in which one frame is composed without adding a BUSY frame (hereinafter, also referred to as BUSY notification) is also provided. In other words, as a data format of a lens data signal DLC, it is possible to select the one with BUSY notification or the one without BUSY notification in accordance with a status of processing in the lens microcomputer.

A method of identifying the presence or absence of BUSY notification performed by the camera microcomputer 205 will be described. The signal waveform shown at "DLC (without BUSY)" in FIG. 4 and the signal waveform shown at "DLC (with BUSY)" in FIG. 4 include bit positions B1 and B2. The camera microcomputer 205 selects the bit position of any one of B1 and B2 as a BUSY identification position P (which corresponds to a predetermined bit) identifying the presence or absence of BUSY notification. A period during which the bit (predetermined bit) at a bit position corresponding to a BUSY identification position P is maintained at a signal level High or Low is also referred to as predetermined bit period.

The camera microcomputer 205 determines whether the signal level at the BUSY identification position P is High or Low and, when the signal level is Low, determines that BUSY notification from the lens microcomputer 111 is present. From the other way around, when the lens microcomputer 111 intends to provide BUSY notification to the camera microcomputer 205, the lens microcomputer 111 transmits a BUSY identification position P indicating Low to the camera microcomputer 205 in association with a data frame of a lens lens data signal DLC.

In this way, the present embodiment employs a data format in which a BUSY identification position P is selected from the bit positions B1 and B2 and BUSY notification is provided at the BUSY identification position P. With this configuration, it is possible to deal with such a problem that a processing time until BUSY notification (Low of DLC) is fixed after transmitting a data frame of a lens data signal DLC varies depending on the processing ability of the lens microcomputer 111.

Whether the BUSY identification position P is set at the bit position of B1 or the bit position of B2 is determined through communication between the camera microcomputer 205 and the lens microcomputer 111 before asynchronous communication is performed. Note that a BUSY identification position P does not need to be fixed to any one of the bit positions B1 and B2 and may be changed according to the processing ability of both microcomputers 205, 111.

Here, the reason why a data format in which a BUSY frame added to a clock signal LCLK in the clock synchronous method is added to a lens data signal DLC in the asynchronous method is adopted will be described.

In the clock synchronous method, a clock signal LCLK that is output by the camera microcomputer 205 that is a communication master and a BUSY signal that is output by the lens microcomputer 111 that is a communication slave need to be exchanged through the same clock channel. For this reason, a collision between the output of the camera microcomputer 205 and the output of the lens microcomputer 111 is prevented by allocating the available output periods for both microcomputers 205, 111 using a time division method. However, in the time division method, a collision between the outputs of both microcomputers 205, 111 needs to be reliably prevented. Therefore, in a period from a point in time at which the camera microcomputer 205 completes outputting an eight-pulse clock signal LCLK to a point in time at which the lens microcomputer 111 is allowed to output a BUSY signal, a certain output prohibition period during which the outputs of both microcomputers 205, 111 are prohibited is inserted. The output prohibition period is a communication disabled period during which both microcomputers 205, 111 are not able to communicate with each other, so it becomes a cause of reducing an effective communication speed.

To solve such a problem, the asynchronous method employs a data format in which a BUSY frame from the lens microcomputer 111 is added to a lens data signal DLC through a dedicated output channel for the lens microcomputer 111.

Next, a data format of a camera data signal DCL will be described. The specifications of one-frame data frame are the same as those of a lens data signal DLC. However, for a camera data signal DCL, different from a lens data signal DLC, addition of a BUSY frame is prohibited.

Next, a procedure of communication in the asynchronous method between the camera microcomputer 205 and the lens microcomputer 111 will be described. Initially, when an event to start communication with the lens microcomputer 111 occurs, the camera microcomputer 205 sets the level of the transmission request signal RTS to Low (hereinafter, referred to as asserting the transmission request signal RTS) to provide notification of a communication request to the lens microcomputer 111. When the lens microcomputer 111 detects the communication request by detecting the transmission request signal RTS being set to Low, the lens microcomputer 111 executes a process of generating a lens data signal DLC to be transmitted to the camera microcomputer 205. Then, when the lens microcomputer 111 completes preparations for transmitting the lens data signal DLC, the lens microcomputer 111 starts transmitting one frame of the lens data signal DLC through the second communication channel. Here, the lens microcomputer 111 starts transmitting the lens data signal DLC within a set time set in both the camera microcomputer 205 and the lens microcomputer 111 from a point in time at which the communication request signal RTS becomes Low. In other words, in the asynchronous method, there are no such strict constraints that lens data to be transmitted is fixed before a first clock pulse is input, like the clock synchronous method, in a period from the point in time at which the communication request signal RTS becomes Low to the start of transmission of the lens data signal DLC.

Subsequently, the camera microcomputer 205 returns the level of the transmission request signal RTS to High (hereinafter, referred to as negating the transmission request signal RTS) in response to detection of a start bit ST that is the leading bit of the data frame of the lens data signal DLC received from the lens microcomputer 111. With this configuration, a transmission request is cancelled, and transmitting a camera data signal DCL through the third communication channel is started. Any one of the negation of a transmission request signal RTS and the start of transmitting a camera data signal DCL may be made first, and both just need to be made before reception of a data frame of a lens data signal DLC completes.

After the lens microcomputer 111 transmits the data frame of the lens data signal DLC, when the lens microcomputer 111 needs to provide notification of a communication standby request BUSY to the camera microcomputer 205, the lens microcomputer 111 adds a BUSY frame to the lens data signal DLC. The camera microcomputer 205 is monitoring the presence or absence of notification of a communication standby request BUSY. While notification of the communication standby request BUSY is being provided, the camera microcomputer 205 is prohibited to assert the transmission request signal RTS for the next transmission request. The lens microcomputer 111 executes a necessary process in the period during which communication from the camera microcomputer 205 is on standby in accordance with the communication standby request BUSY, and cancels the communication standby request BUSY after completion of preparations for the next communication. On condition that the communication standby request BUSY is cancelled and transmission of the data frame of the camera data signal DCL is complete, the camera microcomputer 205 is allowed to assert the transmission request signal RTS for the next transmission request.

In this way, in the present embodiment, in response to assertion of the transmission request signal RTS, triggered by the communication start event in the camera microcomputer 205, the lens microcomputer 111 starts transmitting the data frame of the lens data signal DLC to the camera microcomputer 205. Then, the camera microcomputer 205 starts transmitting the data frame of the camera data signal DCL to the lens microcomputer 111 in response to detection of the start bit ST of the lens data signal DLC. Here, the lens microcomputer 111 adds a BUSY frame behind the data frame of the lens data signal DLC for a communication standby request BUSY as needed and then completes one-frame communication process by cancelling the communication standby request BUSY. Through the communication process, one byte of communication data is transmitted and received between the camera microcomputer 205 and the lens microcomputer 111.

<Characteristic of Asynchronous Communication>

In this way, in the asynchronous method, different from the clock synchronous method, no configuration for transmitting a clock synchronous signal LCLK from the camera microcomputer 205 to the lens microcomputer 111 is provided. The timing to fix transmission of data or reception of data is determined by a clock signal internally generated in the camera microcomputer 205 and the lens microcomputer 111. For this reason, in the case of clock synchronous communication, some constraints need to be added to a communication rate in consideration of the influence of noise; however, there are no such constraints in the asynchronous method. In other words, asynchronous communication is a communication method capable of performing communication at a higher speed as compared to clock synchronous communication.

On the other hand, in the asynchronous method, instead of transmitting a clock synchronous signal LCLK from the camera microcomputer 205 to the lens microcomputer 111, each communication timing is controlled by using a clock (not shown) of a corresponding one of the camera microcomputer 205 and the lens microcomputer 111. Therefore, when the frequency of the clock oscillator of the camera microcomputer 205 is off from the frequency of the clock oscillator of the lens microcomputer 111, data to be communicated through the second communication channel or the third communication channel is not appropriately communicated. For this reason, the communication reliability in the clock synchronous method is higher than that in the asynchronous method.

<Asynchronous Method and Format F2 (Communication Mode M3)>

Figure 5A:
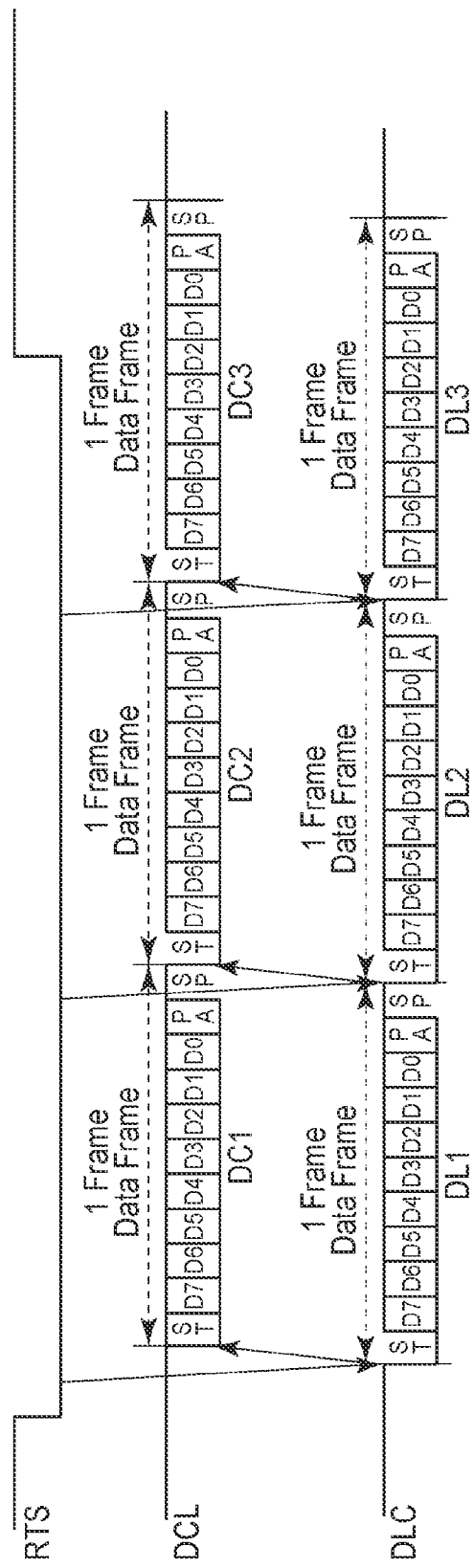
FIG. 5A is a view showing signal waveforms in a communication mode M3 in the first embodiment.

Next, the communication mode M3 in which communication is performed by using the format F2 in the asynchronous method will be described. FIG. 5A shows the waveforms of communication signals in three consecutive frames exchanged between the camera microcomputer 205 and the lens microcomputer 111 in the communication mode M3. As described above, in the format F2, adding a communication standby request BUSY to a lens data signal DLC is prohibited. Therefore, in the format F2 of the present embodiment, A BUSY identification position P is not added behind a data frame of a lens data signal DLC.

In the communication mode M3, a data format of a lens data signal DLC is composed of only a data frame in one frame, and no BUSY frame is present. Therefore, in the communication mode M3, it is not possible to provide a notification of a communication standby request BUSY from the lens microcomputer 111 to the camera microcomputer 205. Such a format F2 is used in applications to perform continuous communication with a reduced interval between frames when relatively large volume data is transferred between the camera microcomputer 205 and the lens microcomputer 111. In other words, high-speed communication of mass data is possible by using the format F2.

Figure 5B:
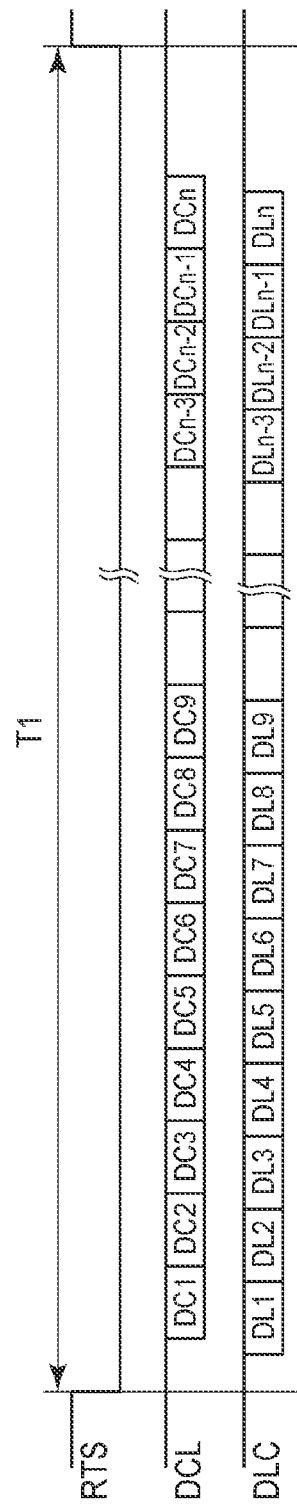
FIG. 5B is a view showing signal waveforms in the communication mode M3 in the first embodiment.

Next, a communication control process between the camera microcomputer 205 and the lens microcomputer 111 will be described. FIG. 5B shows the waveforms of communication signals in the case where the camera microcomputer 205 and the lens microcomputer 111 respectively continuously transmit and receive n frames of a camera data signal DCL and n frames of a lens data signal DLC. Initially, when an event to start communication with the lens microcomputer 111 occurs, the camera microcomputer 205 asserts a transmission request signal RTS. In the format F2, different from the format F1, the camera microcomputer 205 does not need to negate a transmission request signal RTS frame by frame and maintains the RTS in an asserted state while data transmission and reception is continuously possible.

When the lens microcomputer 111 detects a communication request due to assertion of the transmission request signal RTS, the lens microcomputer 111 executes a process of generating a lens data signal DLC to be transmitted to the camera microcomputer 205. Then, when the lens microcomputer 111 completes preparations for transmitting the lens data signal DLC, the lens microcomputer 111 starts transmitting the first frame of the lens data signal DLC (DL1) through the second communication channel.

After the lens microcomputer 111 transmits the data frame of the first frame of the lens data signal DLC, the lens microcomputer 111 checks a transmission request signal RTS again. At this time, when the transmission request signal RTS is in an asserted state, the lens microcomputer 111 transmits the next second frame of the lens data signal DLC (DL2) to the camera microcomputer 205 subsequently to the first frame of which transmission is complete. While the asserted state of the transmission request signal RTS is maintained in this way, the lens data signal DLC (DL1 to DLn) from the lens microcomputer 111 is continuously transmitted to the camera microcomputer 205. When transmission of a predetermined number n of frames completes, transmission of the lens data signal DLC is stopped.

In response to detection of a start bit ST of each frame of the lens data signal DCL from the lens microcomputer 111, transmission of n frames of the camera data signal DCL (DC1 to DCn) from the camera microcomputer 205 through the third communication channel is started.

Figure 5C:
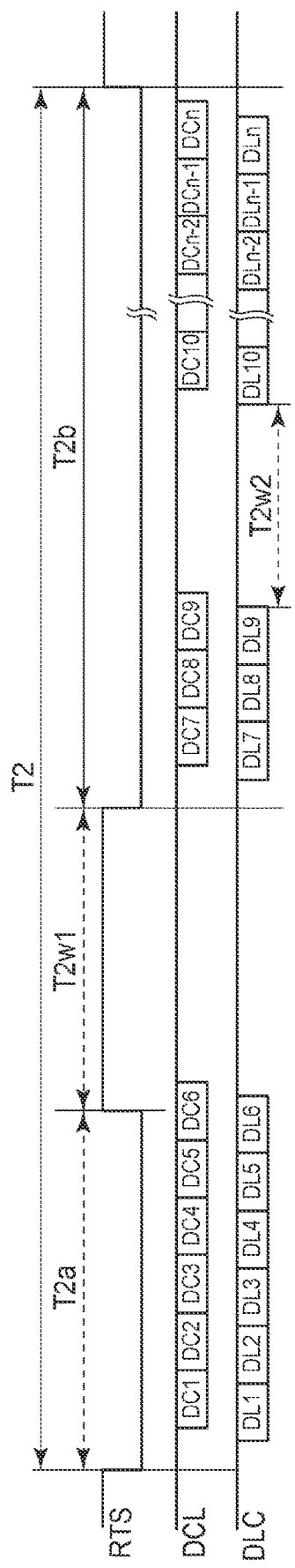
FIG. 5C is a view showing signal waveforms in the communication mode M3 in the first embodiment.

FIG. 5C shows the waveforms of communication signals in the case where an instruction for temporary stopping communication is issued from the camera microcomputer 205 or the lens microcomputer 111 during communication of continuous data transmission and reception, shown in FIG. 5B. Here, the lens microcomputer 111 also starts transmitting a lens data signal DLC when a communication request signal RTS from the camera microcomputer 205 is asserted, and the camera microcomputer 205 starts transmitting a camera data signal DCL in response to detection of a start bit ST of the lens data signal DLC.

T2$w$1 denotes a communication stop period that is a period during which an communication stop instruction is issued from the camera microcomputer 205, and the instruction is issued to the lens microcomputer 111 when the camera microcomputer 205 temporarily negates the transmission request signal RTS. When the lens microcomputer 111 detects that the transmission request signal RTS is negated, the lens microcomputer 111 stops transmission after completion of transmission of the frame of the lens data signal DLC in process of transmitting at the time of the detection (in the drawing, DL6; hereinafter, referred to as stop frame). As a result of the stop of transmission of the lens data signal DLC, the camera microcomputer 205 also stops transmission of the camera data signal DCL after transmitting a frame (DC6) corresponding to the stop frame among frames of the camera data signal DCL. Through such communication control, even when a communication stop instruction is issued during communication of continuous data transmission and reception, it is possible to manage a lens data signal DLC and a camera data signal DCL such that the number of transmitted frames of each of the lens data signal DLC and the camera data signal DCL is equal to each other.

When there is no event to request for stopping the communication, the camera microcomputer 205 is able to instruct the lens microcomputer 111 to resume communication by asserting the transmission request signal RTS again. In response to a communication resumption instruction, the lens microcomputer 111 resumes transmitting the lens data signal DLC from the next frame (DL7; hereinafter, referred to as resumption frame) subsequent to the stop frame. Then, in response to detection of the start bit ST of the resumption frame, the camera microcomputer 205 resumes transmitting the camera data signal DCL from the frame (DC7) corresponding to the resumption frame.

On the other hand, T2$w$2 denotes a communication stop period that is a period when stopping of communication is instructed by the lens microcomputer 111. In FIG. 5C, after the end of the communication stop period T2$w$1, both the camera microcomputer 205 and the lens microcomputer 111 do not instructs to stop communication, and continuously transmit and receive data in order of the above-described resumption frames DL7, DC7 and subsequent frames DL8, DC8 to DL9, DC9.

Then, when a communication stop request event occurs at the time when transmission of the frame DL9 in the lens microcomputer 111 (reception of the frame DC9 in the camera microcomputer 205) completes, the lens microcomputer 111 provides notification of a communication stop instruction to the camera microcomputer 205. The notification is provided by the lens microcomputer 111 not transmitting the lens data signal DLC even when the status of the transmission request signal RTS is an asserted state. The camera microcomputer 205 keeps constant watch on a start bit ST of each frame of the lens data signal DLC and is arranged to stop transmission of the next frame of the camera data signal DCL when no start bit ST is detected. Therefore, even when the camera microcomputer 205 asserts a transmission request signal RTS, if the camera microcomputer 205 does not receive the lens data signal DLC (in the drawing, DL10) from the lens microcomputer 111, the camera microcomputer 205 does not transmit the camera data signal DCL (DC10) to the lens microcomputer 111 and stops communication. The camera microcomputer 205 maintains the transmission request signal RTS in an asserted state during a communication stop period T2w2 resulting from an instruction from the lens microcomputer 111.

After that, the communication stop request event disappears in the lens microcomputer 111, and the lens microcomputer 111 resumes transmitting the resumption frame DL10 of the lens data signal DLC. The camera microcomputer 205 resumes transmitting the associated frame DC10 of the camera data signal DCL in response to detection of the start bit ST of the resumption frame DL10.

<Characteristic of Communication with Asynchronous Method Using Format F2 (Communication Mode M3)>

In this way, when communication is performed by using the format F2 in the asynchronous method, no communication standby request BUSY is added to a lens data signal DLC in the asynchronous method. For this reason, when communication is performed by using the format F2 in the asynchronous method, not only the characteristic based on asynchronous communication but also such a characteristic that high-speed communication is provided. Therefore, when mass data is communicated, it is possible to shorten a time needed for communication by adopting the communication mode M3. Usually, the lens microcomputer 111 adds BUSY in a case where a specific function needs to be operated by the camera microcomputer 205 via communication. When, for example, simple data transfer from the lens microcomputer 111 to the camera microcomputer 205 is intended, it is effective to adopt the communication mode M3.

However, when there occurs a difference in perception that the camera microcomputer is executing control by using a communication format of the format F1 while the lens microcomputer 111 executes control by using a communication format of the format F2, the communication rate decreases conversely or causes a communication malfunction. Therefore, to use the format F2, it is necessary to reliably execute a process of switching to the format F2. It is desirable to execute in advance a process of ensuring large-capacity communication by using the format F2, for example, notification of communication amount or the like. For this reason, when the format F2 is used to transmit small-volume data, time taken for the process of switching to the format F2 is predominant, and the case where the advantageous effect of reduced communication time is not obtained is possible. For this reason, it is desirable that the format F2 be used to communicate data of a volume greater than or equal to a certain amount.

<Lens Attribute Information>

FIG. 6 shows an example of lens attribute information (which corresponds to accessory attribute information) transmitted from the lens microcomputer 111 to the camera microcomputer 205 in an initial communication process that will be described later with reference to FIG. 8.

Here, the initial communication process is a process of, in response to the start of communication between the camera microcomputer 205 and the lens microcomputer 111, performing communication between the camera microcomputer 205 and the lens microcomputer 111 or communicating information needed for functions implemented by the camera main body 200 or the interchangeable lens 100 between the camera microcomputer 205 and the lens microcomputer 111. Here, the communication between the camera microcomputer 205 and the lens microcomputer 111 starts in the case where electric power is supplied to the camera main body in a state where the interchangeable lens 100 is attached to the camera main body 200 or in the case where the interchangeable lens 100 is mounted in a state where electric power is supplied to the camera main body.

The lens attribute information is information indicating the characteristic and property of a lens and, in the present embodiment, includes identification information and operation state information.

The identification information is information determined for each individual interchangeable lens 100, and includes unique information and function information. The unique information includes optical data information indicating optical data (for example, focal length information) unique to the interchangeable lens 100 and information in which a production number (serial number) with which an individual piece can be identified from among the same models.

The function information is information for controlling a function implemented by a combination of the camera main body 200 and the interchangeable lens 100. Specifically, the function information is information with which it is possible to identify whether the interchangeable lens 100 supports communication in the above-described communication mode M3 or information with which it is possible to identify whether the interchangeable lens 100 has a specific member.

Then, the above-described operation state information is information indicating an operation state of each individual interchangeable lens 100 regardless of model. An example of the operation state information is information indicating whether in safe mode. Information indicating whether in safe mode is information indicating whether update of firmware of the interchangeable lens 100 is suspended due to a communication malfunction and the interchangeable lens 100 is in a state supporting only a minimum operation for update of firmware (this state is referred to as safe mode). When in the state of safe mode, safe mode state information indicates "in safe mode". When not in the state of safe mode, the safe mode state information indicates "not in safe mode".

When any one of the above-described communication modes M1, M2, M3 is adopted as well, a communication process is executed in units of byte in communication implemented between the camera main body 200 and the interchangeable lens 100.

Then, an example of information exchanged between the camera main body 200 and the interchangeable lens 100, executed in this way, is in the table information of FIG. 6. As shown in FIG. 6, various pieces of information exchanged in the above-described communication process are capable of representing lens attribute information of a lens by using eight bits that compose each one of bytes. Each piece of lens attribute information may be the one represented by one bit or the one expressed by multiple bits.

For example, one byte (eight bits) of lens attribute information 1 shown in FIG. 6 represents a lens model name, and a unique number is assigned for each model of interchangeable lens.

For example, three bytes (24 bits) of lens attribute information 2 to lens attribute information 4 represent a serial number.

In lens attribute information 5, b0 (it is assumed that bn means the nth bit, and one byte can represent bits corresponding to b0 to b7) represents whether communication in function FUNC1 is supported. b1 represents whether the interchangeable lens 100 has a member ITEM1. b2 represents whether in safe mode. b3 represents available communication bit rate information.

Three bytes (24 bits) of lens attribute information 6 to lens attribute information 8 represent a version of firmware of the interchangeable lens 100. This is used to, for example, display at the time of update of firmware of the interchangeable lens 100 or execute control so as not to be updated to older firmware.

b0 of lens attribute information 20 represents whether the communication mode M3 is supported. In the present embodiment, the information corresponding to whether the communication mode M3 is supported is also used as information indicating whether communication of second lens attribute information (described later) is supported. Here, information as to whether the communication mode M3 is supported is illustrated as information indicating an available communication mode of the interchangeable lens 100, and information as to whether the communication mode M1 is supported or whether the communication mode M2 is supported may be additionally provided. Information indicating whether the asynchronous method is supported may be additionally included as information indicating an available communication method in the interchangeable lens 100.

Lens attribute information 21 and the subsequent lens attribute information include attribute information related to only lenses that assume to support the communication mode M3. For example, unique information and function information related to communication that can be implemented by only lenses that are capable of executing communication in the communication mode M3 are included (hereinafter, in the table, pieces of lens attribute information up to lens attribute information 20 are referred to as first lens attribute information, and lens attribute information 21 and the subsequent lens attribute information are referred to as second lens attribute information). Here, the second lens attribute information may include unique information and function information related to communication that can be implemented by only lenses capable of performing communication by the asynchronous method by using not only the asynchronous communication format F2 but also the asynchronous communication format F1.

For example, b0 of lens attribute information 21 represents whether mass correction data communication is supported. Communicating mass data is possible even in the communication mode M1 that is the clock synchronous method; however, when the communication is performed in the communication mode M1 of which the communication rate is low, communication takes time. As a result, this leads to a decrease in the usability for a user, for example, a delay in startup time of the camera, or the like. In this way, it is often desired that communication completes within a prescribed time to hold performance and functions of the camera as a whole. Therefore, it is desirable that communication be performed in the asynchronous method that is a communication method communicable substantially at higher speed and, in addition, using the communication format F2 communicable at higher speed.

<Camera Attribute Information>

FIG. 7 shows an example of camera attribute information transmitted from the camera microcomputer 205 to the lens microcomputer 111 in initial communication. Camera attribute information, as well as lens attribute information, is capable of representing camera attribute information of a camera by using eight bits that compose one byte. Each piece of camera attribute information may be the one represented by one bit or the one represented by multiple bits.

For example, one byte (eight bits) of camera attribute information 1 shown in FIG. 7 represents a camera model name, and a unique number is assigned for each model of camera main body. For example, in camera attribute information 2, b0 represents whether communication in function FUNC1 is supported, and b1 represents whether the camera microcomputer 205 supports the communication mode M3.

<Initial Communication Sequence Process (Camera)>

An initial communication sequence process as a process on the camera main body 200 side, which is the characteristic of the present embodiment, will be described with reference to the flowchart of FIG. 8. The camera microcomputer 205 executes the process in accordance with the communication control program as the computer program. In FIG. 8 and the following description, "S" denotes step.

In S90, the camera microcomputer 205 sets the communication mode for communicating with the lens microcomputer 111 to the communication mode M1 that is the clock synchronous method. Similarly, the lens microcomputer 111 also needs to set the communication mode to the communication mode M1, and the process of the lens microcomputer 111 will be described later with reference to FIG. 9.

In S100, the camera microcomputer 205 transmits a transmission request command for the first lens attribute information via the camera data transmission/reception section 208b. The camera microcomputer 205 transmits the first camera attribute information via the camera data transmission/reception section 208b.

In S101, the camera microcomputer 205 receives the first lens attribute information transmitted from the lens microcomputer 111 via the camera data transmission/reception section 208b. The first lens attribute information includes function information as to whether the communication mode M3 is supported.

In S102, the camera microcomputer 205 determines whether the interchangeable lens 100 operates in safe mode. For example, it is determined whether information as to whether the interchangeable lens 100 is operating in safe mode as operation state information is set in the first lens attribute information composed of the lens attribute information 1 to lens attribute information 20 of the lens attribute information. Alternatively, a determination as to safe mode may be performed via communication used to determine whether the interchangeable lens 100 is operating in safe mode.

Here, when it is determined that the interchangeable lens 100 is operating in safe mode (Yes in S102), the initial communication sequence process is ended. It is desirable that the first lens attribute information acquired in S101 include the firmware version of the interchangeable lens 100 to control display and firmware update. This is because the interchangeable lens 100 that operates in safe mode desirably shifts into a sequence for updating the firmware of the interchangeable lens 100 as early as possible. Although not shown in the drawing, when the interchangeable lens 100 operates in safe mode, a process is executed to, for example, cause the camera display section 206 to display that the update of the firmware of the currently attached interchangeable lens 100 is not normally performed and provide notification of a malfunction state to a user.

When it is determined that the lens is not operating in safe node (No in S102), the process proceeds to S103. In S103, the camera microcomputer 205 determines whether the communication mode M3 communicable at higher speed than the communication mode M1 is supported in accordance with information as to whether the communication mode M3 is supported, included in the first lens attribute information acquired in S101.

Here, when it is determined that the interchangeable lens 100 does not support the communication mode M3 (No in S103), the initial communication sequence process is ended without obtaining lens function information that assumes that the communication mode M3 is supported. With this configuration, an initial communication sequence process time is reduced. The order of S102 and S103 may be reversed.

When it is determined that the interchangeable lens 100 supports the communication mode M3 (Yes in S103), the camera microcomputer 205 transmits a request to the lens microcomputer 111 to switch to the communication mode M3 in S104.

Then, the camera microcomputer 205 switches the communication mode to the communication mode M3. Similarly, a process in which the lens microcomputer 111 sets the communication mode to the communication mode M3 will be described later with reference to FIG. 9.

After that, in S105, the camera microcomputer 205 transmits a request for the second lens attribute information to the lens microcomputer 111 via the camera data transmission/reception section 208*b*. Then, the camera microcomputer 205 acquires the second lens attribute information of the interchangeable lens 100 from the lens microcomputer 111.

In this way, in the present embodiment, whether to acquire the second lens attribute information is switched in accordance with information as to whether the communication mode M3 is supported. In terms of this point, information as to whether the communication mode M3 is supported also functions as information as to whether it is supported in communication of the second lens attribute information. Then, when the communication mode M3 is supported, initial communication is made faster by acquiring the second lens attribute information in the communication mode M3.

In S106, the camera microcomputer 205 transmits a request to the lens microcomputer 111 to switch to the communication mode M1. The camera microcomputer 205 sets the communication mode to the communication mode M1. However, the communication mode does not necessarily need to be reset to communication mode M1 here. When higher-speed communication is intended to be continued even after the end of the initial communication sequence process, the communication mode M3 may be maintained without changing to the communication mode M1. Alternatively, the communication mode M3 may be changed to the communication mode M2.

<Initial Communication Sequence Process (Cooperation Between Camera and Lens)>

The initial communication process of the camera main body 200 is described with reference to the flowchart of FIG. 8. Communication control in the initial communication process of the present embodiment by cooperation between the camera main body 200 and the interchangeable lens 100 in the case where both the camera main body 200 and the interchangeable lens 100 support the communication mode M3 will be described with reference to the flowcharts of FIG. 9. The camera microcomputer 205 and the lens microcomputer 111 execute the process in accordance with the communication control program as the computer program. Here, it is assumed that the interchangeable lens 100 is not in safe mode.

Initially, in S1100 and S1200, the camera microcomputer 205 and the lens microcomputer 111 set the communication mode to the communication mode M1 (S1100 corresponds to S90). In the present embodiment, it is assumed that the communication mode M1 is set in advance as an initial communication mode.

Subsequently, in S1101, the camera microcomputer 205 transmits a request for the first lens attribute information and the camera attribute information including the communication modes supported by the camera main body to the lens microcomputer 111 through the third communication channel. In S1201, the lens microcomputer 111 receives the camera attribute information transmitted from the camera microcomputer 205 through the third communication channel. The camera attribute information includes the identification information and function information of the camera as described with reference to FIG. 7.

In S1202, the lens microcomputer 111 transmits the first lens attribute information to the camera microcomputer 205 through the second communication channel.

In S1102, the camera microcomputer 205 receives the first lens attribute information transmitted from the lens microcomputer 111 through the second communication channel (S1102 corresponds to S101).

In this way, in the flowcharts of FIG. 9, the lens attribute information is transmitted after the camera attribute information is transmitted. Alternatively, the camera attribute information and the lens attribute information may be transmitted at the same time. Alternatively, the camera attribute information may be transmitted after the lens attribute information is transmitted.

The lens attribute information obtained in S1102 includes information indicating whether the interchangeable lens 100 supports the high-speed communication mode M3. When the information is information indicating that the communication mode M3 is supported (which corresponds to the case where a determination is affirmative in S103 of FIG. 8), the second lens attribute information is received in the high-speed communication mode M3 as described in S105 of FIG. 8.

Then, in S1103, the camera microcomputer 205 transmits a request to switch to the communication mode M3 to the lens microcomputer 111 through the third communication channel. In S1203, the lens microcomputer 111 receives a request to switch to the communication mode M3 through the third communication channel.

In S1104, the camera microcomputer 205 switches the communication mode to the communication mode M3. Similarly, in S1204, the lens microcomputer 111 switches the communication mode to the communication mode M3.

In S1105 the camera microcomputer 205 transmits a request for the second lens attribute information to the lens microcomputer 111 through the third communication channel. In S1205, the lens microcomputer 111 receives a request for the second lens attribute information through the third communication channel.

After that, in S1206, the lens microcomputer 111 transmits the second lens attribute information of the interchangeable lens 100 that supports the communication mode M3 through the second communication channel. In S1106, the camera microcomputer 205 receives the second lens attribute information through the second communication channel. In the flowchart, the camera microcomputer 205 omits transmission of camera attribute information for the interchangeable lens 100 that supports the communication mode M3. Alternatively, the camera microcomputer 205 may transmit the camera attribute information. In this case, the camera microcomputer 205 transmits camera attribute information in response to reception of the start bit ST of a data frame including the second lens attribute information through the second communication channel, transmitted by the lens microcomputer 111 in S1206, to the lens microcomputer 111 through the third communication channel.

After the end of transmission and reception of the second lens attribute information, the camera microcomputer 205 transmits a request to switch the communication mode to the communication mode M1 to the lens microcomputer 111 through the third communication channel in S1107. In S1207, the lens microcomputer 111 receives a request to switch the communication mode to the communication mode M1 through the third communication channel.

Then, in S1108 and S1208, the camera microcomputer 205 and the lens microcomputer 111 set the communication mode to the communication mode M1.

S1107, S1108, S1207, and S1208 may be omitted for the reason that, for example, the communication mode M3 is used even after the initial communication sequence.

In the present embodiment, acquiring the second lens attribute information in the communication mode M3 is illustrated. Alternatively, the second lens attribute information may be acquired in the communication mode M2 instead of the communication mode M3. Since the communication mode M2 is the asynchronous communication communicable at higher speed than the communication mode M1 that is the clock synchronous method, it is possible to speed up the initial communication similarly to the case of using the communication mode M3. In this case, as information corresponding to whether to acquire the second lens attribute information, information as to whether the communication mode M2 is supported may be included in the first lens attribute information.

<Advantageous Effects of First Embodiment>

In this way, the lens attribute information of the present embodiment includes the first lens attribute information and the second lens attribute information. In the present embodiment, the first lens attribute information is acquired in the communication mode M1 that uses the clock synchronous method, and the second lens attribute information is acquired in the communication mode M3 that uses the asynchronous method. The reason why the lens attribute information is acquired by clock synchronous communication and is then additionally acquired by asynchronous communication switched from the clock synchronous communication is to speed up initial communication while ensuring the communication reliability.

As described above, when the clock synchronous method is compared with the asynchronous method, the communication reliability is high, so it is desirable that initial communication be started in the clock synchronous method as an initial setting. On the other hand, as described above, to ensure the communication reliability in the clock synchronous method, there are constraints on communication rate. Because the lens attribute information has many items and the items may increase in the future, if all the pieces of lens attribute information to be communicated through initial communication is performed in the clock synchronous method, communication takes much time as the lens attribute information increases. Here, as time needed for communication extends, a user has to wait for a longer time until a startup of the camera completes. In contrast, the asynchronous method enables higher-speed communication than the clock synchronous method; however, the clock synchronous method has a higher communication reliability, so the communication method as an initial setting is desirably the clock synchronous method rather than the asynchronous method.

For this reason, in the present embodiment, initially, the first lens attribute information is acquired in the communication mode M1 that is the clock synchronous method. Then, in accordance with information included in the first lens attribute information, switching to the communication mode M3 that is the asynchronous method and acquiring the second lens attribute information in the communication mode M3 are performed. Thus, the speed of initial communication is increased while the communication reliability is ensured. Here, by acquiring the second lens attribute information in the communication mode M3 (the asynchronous method with communication format F2), the speed of initial communication is increased as compared to the case where the second lens attribute information is acquired by the asynchronous method with communication format F1.

In the present embodiment, function information assumed to be implemented in the asynchronous method is included in not the first lens attribute information but the second lens attribute information. Thus, for an interchangeable lens that originally does not adopt the asynchronous method, the speed of initial communication is increased by omitting communication of the second lens attribute information.

Second Embodiment

The first embodiment is the embodiment in which the first lens attribute information is received in the communication mode M1 (clock synchronous method with communication format F1) and the second lens attribute information is received in the communication mode M3 (asynchronous method with communication format F2). In contrast, the second embodiment proposes to achieve higher-speed initial communication while the communication mode M1 described in FIG. 3 of the first embodiment is set as a basic communication mode. Specifically, instead of the communication mode M3, a communication format F2 in which BUSY is not interposed in all multi-byte communication in the clock synchronous method is used. In the method of the second embodiment, the same communication method is used different from the methods of the first embodiment, so there is such an advantage that an initial communication sequence process time is reduced without consuming a time for switching the communication methods.

FIG. 10 and FIG. 11 show modifications of the tables of the lens attribute information and camera attribute information for illustrating the embodiment. The second embodiment is similar to the first embodiment in that the lens attribute information is divided into two blocks, the lens attribute information up to lens attribute information 20 indicating whether the communication method M3 is supported is defined as the first lens attribute information, and lens attribute information 21 and the subsequent lens attribute information are defined as the second lens attribute information. On the other hand, in the second embodiment, as described above, the second lens attribute information is communicated not in the communication method M3 (asynchronous and F2) but in the clock synchronous method with communication format F2. Accordingly, the second embodiment differs from the first embodiment in that, as shown in FIG. 10, the first lens attribute information includes information corresponding to "whether initial communication without BUSY is supported" (defined at b0 of the lens attribute information 10). The second embodiment also differs from the first embodiment in that, as shown in FIG. 11, the camera attribute information includes information corresponding to "whether initial communication without BUSY is supported" (defined at b0 of camera attribute information 5).

<Initial Communication Sequence Process (Camera)>

Figure 12:
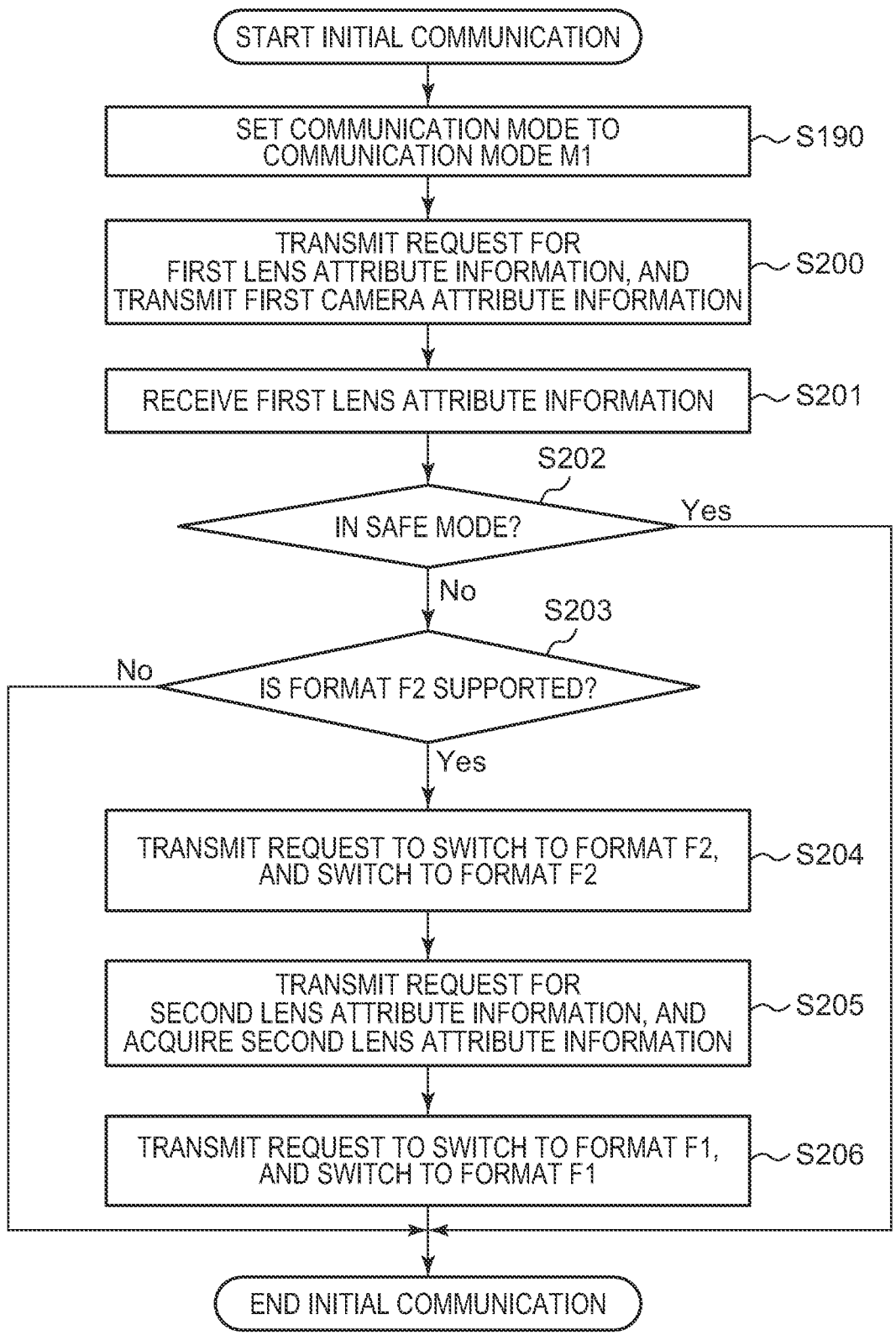
FIG. 12 is a flowchart showing an initial communication sequence (camera) in the second embodiment.

An initial communication sequence process as a process performed on the camera main body 200 side, which is the characteristic of the present embodiment, will be described with reference to FIG. 12. The description of the same steps as those of FIG. 8 of the first embodiment is omitted, and the description will be made focusing on differences.

In S201, the camera microcomputer 205 acquires the first lens attribute information, that is, lens attribute information 1 to lens attribute information 10, in the communication format F1.

In S203, the camera microcomputer 205 determines whether the interchangeable lens 100 supports initial communication in the communication format F2 in accordance with information corresponding to "whether initial communication without BUSY is supported", included in the first lens attribute information.

In S204, the camera microcomputer 205 transmits a request to the lens microcomputer 111 to switch to the communication format F2 and switches the communication format to the above-described communication format F2.

In S205, the camera microcomputer 205 transmits a request for the second lens attribute information to the lens microcomputer 111. The camera microcomputer 205 acquires the second lens attribute information, that is, lens attribute information 21 and the subsequent lens attribute information, by using the communication format F2.

In S206, the camera microcomputer 205 transmits a request to the lens microcomputer 111 to switch to the communication format F1 and returns to the communication format F1 in preparation for subsequent communication control.

<Initial Communication Sequence Process (Cooperation Between Camera and Lens)>

Figure 13:
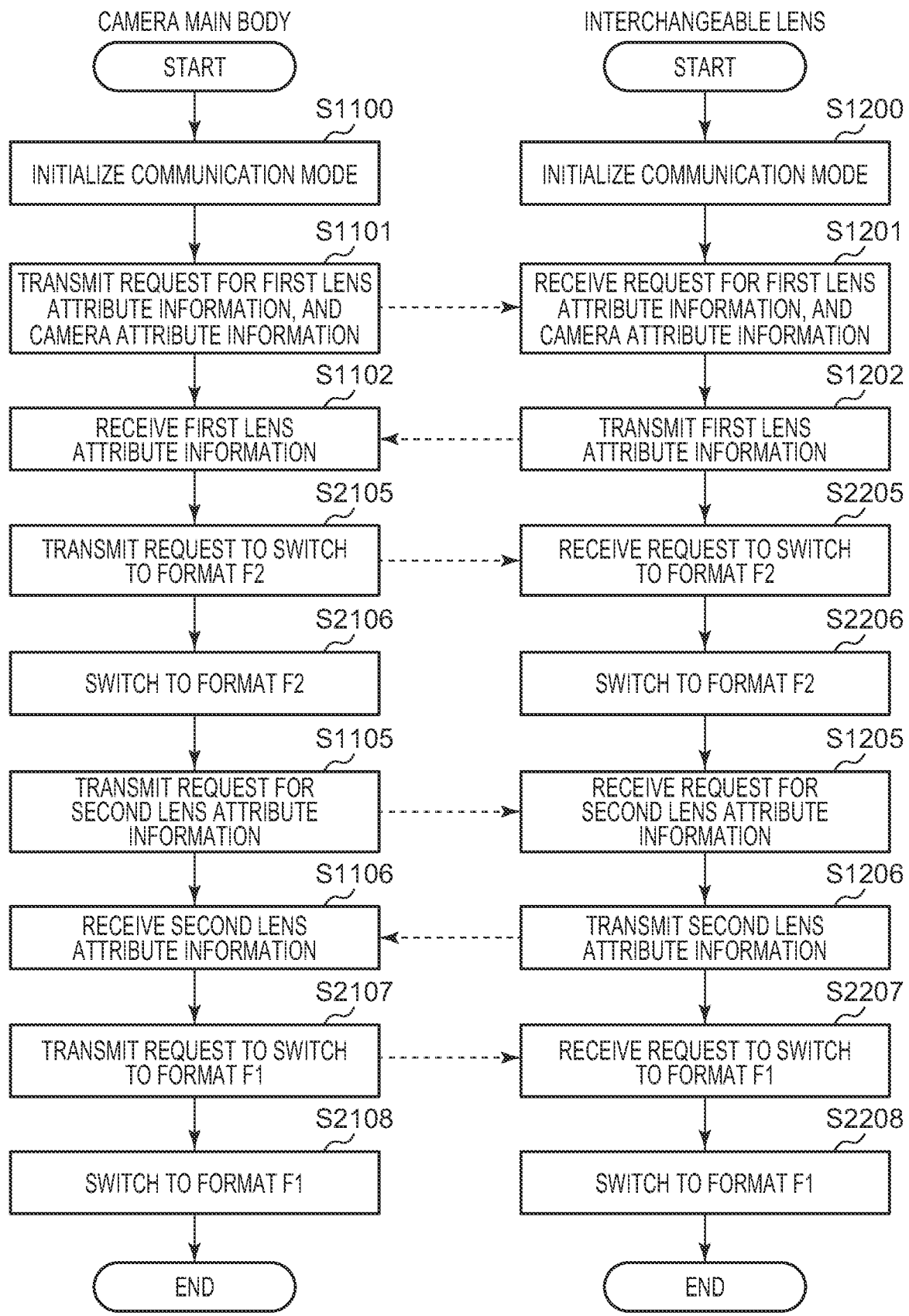
FIG. 13 illustrates flowcharts showing an initial communication sequence (cooperation between camera and lens) in the second embodiment.

Communication control in the initial communication process of the present embodiment by cooperation between the camera main body 200 and the interchangeable lens 100 in the case where both the camera main body 200 and the interchangeable lens 100 support the communication format F2 in the clock synchronous method will be described with reference to the flowcharts of FIG. 13. The description of the same steps as those of FIG. 9 of the first embodiment is omitted, and the description will be made focusing on differences.

In S2105, the camera microcomputer 205 transmits a request to the lens microcomputer 111 to switch to the communication format F2 through the third communication channel when the information corresponding to "whether initial communication without BUSY is supported", included in the first lens attribute information received in S1102, is information indicating that "initial communication without BUSY is supported". In S2205, the lens microcomputer 111 receives a request to switch to the communication format F2 through the third communication channel.

In S2106, the camera microcomputer 205 switches the communication format from the communication format F1 to the communication format F2. In S2206, the lens microcomputer 111 also similarly switches the communication format from the communication format F1 to the communication format F2.

When transmission and reception of the second lens attribute information through the second communication channel are performed in the communication format F2 in S1106 and S1206, the camera microcomputer 205 transmits a request to the lens microcomputer 111 to switch to the communication format F1 through the third communication channel in S2107. In S2207, the lens microcomputer 111 receives a request to switch to the communication format F1 through the third communication channel.

In S2108, the camera microcomputer 205 switches the communication format from the communication format F2 to the communication format F1. In S2208, the lens microcomputer 111 also similarly switches the communication format from the communication format F2 to the communication format F1.

<Advantageous Effects of Second Embodiment>

As described above, in the present embodiment, the first lens attribute information is acquired by initial communication. Then, when information included in the first lens attribute information includes information indicating that an initial communication function without BUSY is supported, the communication format is switched from the format F1 to the format F2 while remaining in the clock synchronous method. Then, the second lens attribute information is received in the clock synchronous format F2. Thus, it is possible to increase the speed of initial communication.

Third Embodiment

A third embodiment is a modification of the first embodiment. In the present embodiment, the configurations of the lens attribute information and camera attribute information differ from those of the first embodiment. There is also a difference in the initial communication sequence process, so the difference will be described later. The description of the configuration common to that of the first embodiment is omitted, and the description will be made focusing on the differences.

<Lens Attribute Information of Third Embodiment>

In the first embodiment, information as to whether the communication mode M3 is supported is used as information as to whether communication of the second lens attribute information is supported. In contrast, in the third embodiment, as shown in FIG. 14, instead of information as to whether the communication mode M3 is supported, information as to whether the asynchronous communication method is supported is provided. In addition to the information as to whether the asynchronous communication method is supported, information as to whether communication of the second lens attribute information is supported is provided.

<Camera Attribute Information of Third Embodiment>

As shown in FIG. 15, camera attribute information of the present embodiment includes information as to whether the asynchronous communication method is supported in correspondence with the lens attribute information.

<Initial Communication Sequence Process (Camera)>

An initial communication sequence process as a process performed on the camera main body 200 side, which is the characteristic of the present embodiment, will be described with reference to FIG. 16. The description of the same steps as those of FIG. 8 of the first embodiment is omitted, and the description will be made focusing on differences.

In S303, the camera microcomputer 205 determines whether the interchangeable lens 100 supports asynchronous communication. This determination is performed by using information as to whether the asynchronous communication method is supported, included in the first lens attribute information acquired in S101. When the information as to whether the asynchronous communication method is supported is information indicating that the asynchronous communication method is supported, the process proceeds to S304. When the information as to whether the asynchronous communication method is supported is information indicating that the asynchronous method is not supported, the process of this flow ends.

In S304, the camera microcomputer 205 determines whether the interchangeable lens 100 supports communication of the second lens attribute information. This determination is performed by using information as to whether communication of the second lens attribute information is supported, included in the first lens attribute information acquired in S101. When the information as to whether communication of the second lens attribute information is supported is information indicating that communication of the second lens attribute information is supported, the process proceeds to S104. When the information as to whether communication of the second lens attribute information is supported is information indicating that communication of the second lens attribute information is not supported, the process of this flow ends.

In this way, in the present embodiment, when a determination is affirmative in S303 and S304, the communication mode is switched to the third communication mode M3 in S104. This is because, when a determination is affirmative in S303 and S304, communication of the second lens attribute information performed in S105 is arranged in advance to be performed in the communication format F2.

In S307, the camera microcomputer 205 determines whether the interchangeable lens 100 supports mass correction data communication. This determination is performed by using information as to whether mass correction data communication is supported, included in the first lens attribute information acquired in S101. When the information as to whether mass correction data communication is supported is information indicating that mass correction data communication is supported, the process proceeds to S308. When the information as to whether mass correction data communication is supported is information indicating that mass correction data communication is not supported, the process of this flow ends.

In S308, the camera microcomputer 205 transmits a request for mass correction data to the lens microcomputer 111 through the third communication channel. Then, the camera microcomputer 205 receives, through the second communication channel, mass correction data transmitted by the lens microcomputer 111 in response to the request.

Figure 16:
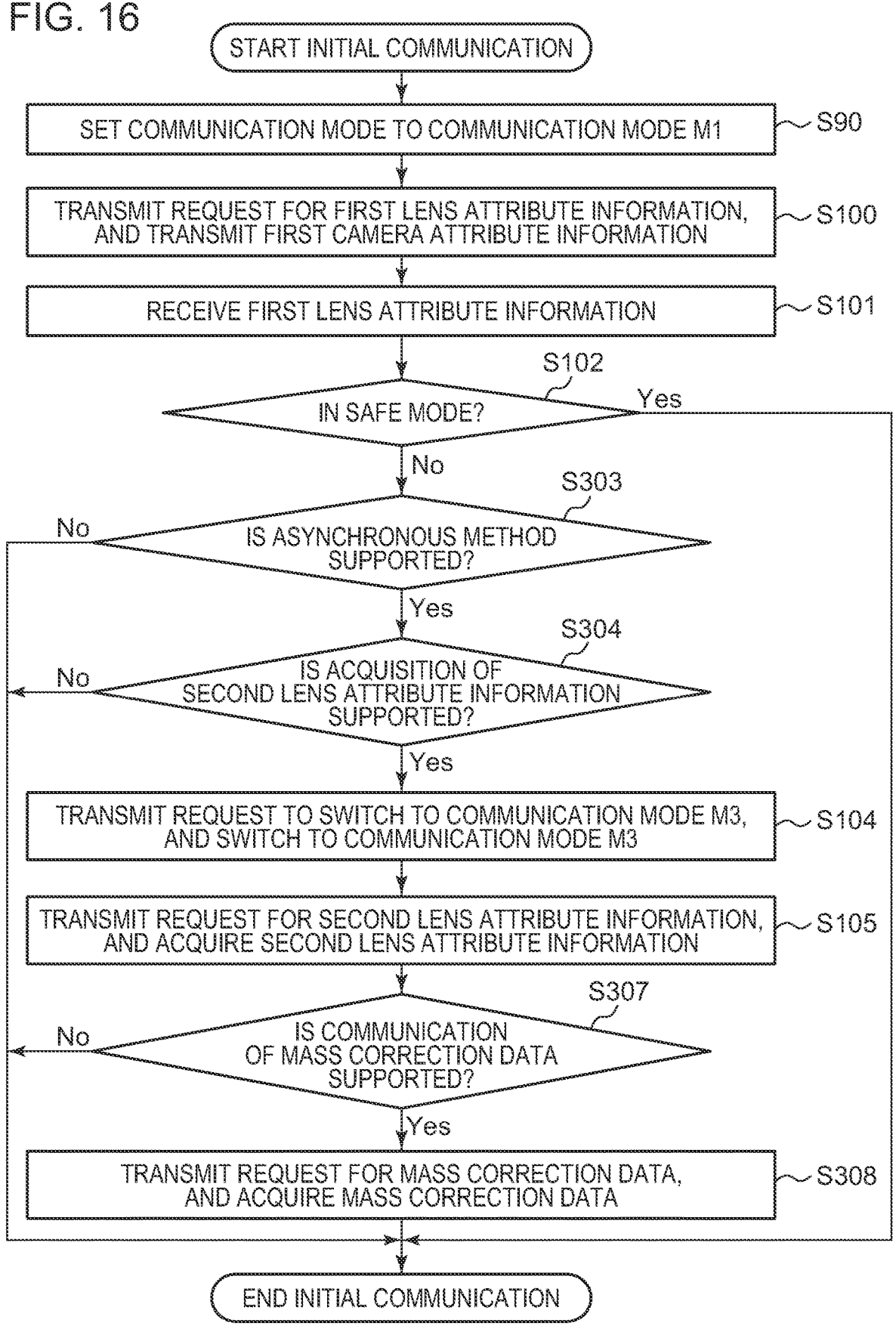
FIG. 16 is a flowchart showing an initial communication sequence (camera) in the third embodiment.

In the present embodiment, although the description of the process executed by the interchangeable lens 100 is omitted, the lens microcomputer 111 executes a process associated with the process of the camera microcomputer 205, shown in FIG. 16.

<Advantageous Effects of Third Embodiment>

Communicating mass data is possible even in the communication mode M1 that is the clock synchronous method; however, when the communication is performed in the communication mode M1 of which the communication rate is low, communication takes time. As a result, this leads to a decrease in the usability for a user, for example, a delay in startup time of the camera, or the like. It is often desired that communication completes within a prescribed time to hold performance and functions of the camera as a whole, and the performance and functions may not be held other than a substantially higher-speed communication method. Therefore, in the present embodiment, communication of the second lens attribute information is performed in the communication mode M3, and communication of mass correction data is performed in the communication mode M3 in accordance with the second lens attribute information. Thus, it is possible to increase the speed of each communication.

Other Embodiments

The lens attribute information and the camera attribute information of the above-described embodiments are illustrated. Alternatively, other information may be used as long as it is possible to achieve a similar purpose by using information associated with each piece of information.

Fourth Embodiment

Hereinafter, a communication control method for an interchangeable lens as an accessory apparatus and a camera main body as an image capturing apparatus will be described in detail with reference to the attached drawings. Initially, the definition of terms in the present embodiment will be described.

A "communication format" indicates a protocol used in the entire communication between the camera main body and the interchangeable lens. A "communication method" means a clock synchronous method and an asynchronous method. The clock synchronous method is referred to as communication method A, and the asynchronous method is referred to as communication method B. A "data format" indicates whether addition of a communication standby request signal (BUSY signal) is allowed. A data format that allows addition of a BUSY signal is referred to as "format F1", and a data format that prohibits addition of a BUSY signal is referred to as "format F2".

A "communication mode" means a combination of a communication method and a data format. In the present embodiment, the following three communication modes will be described. A "communication mode M1" is a communication mode of the communication method A with the format F1. A "communication mode M2" is a communication mode of the communication method B with the format F1. A "communication mode M3" is a communication mode of the communication method B with the format F2.

The camera main body is capable of selecting an appropriate communication mode in accordance with a combination of the camera main body and an interchangeable lens and a shooting mode by performing communication while appropriately switching among the above-described communication modes M1, M2, and M3.

When, for example, the camera main body and the interchangeable lens support the communication mode M2 and transmit and receive mass data, the communication mode of each of the camera main body and the interchangeable lens is switched to the communication mode M3, and then high-speed data communication that prohibits addition of a BUSY signal is performed. When a certain amount of time is needed for data processing in the interchangeable lens, the communication mode of each of the camera main body and the interchangeable lens is switched to the communication mode M2, and then data communication that allows addition of a BUSY signal is performed. Thus, it is possible to perform data communication that does not lead to a failure of communication between the camera main body and the interchangeable lens.

<Basic Configuration of Camera Main Body 2200 and Interchangeable Lens 2100>

FIG. 17A shows the configuration of an image capturing system (hereinafter, referred to as camera system) including a camera main body 2200 as an image capturing apparatus of the fourth embodiment of the present invention and an interchangeable lens 2100 as an accessory apparatus detachably attached to the camera main body 2200.

Each of the camera main body 2200 and the interchangeable lens 2100 transmits control commands and internal information via its own communication control section. The communication control sections each supports a plurality of communication formats and is capable of selecting a communication format for each of various situations by switching into the same communication format in synchronization with each other in accordance with a type of communication data and a communication purpose.

Initially, a specific configuration of the interchangeable lens 2100 and the camera main body 2200 will be described. The interchangeable lens 2100 and the camera main body 2200 are mechanically and electrically connected via a mount portion (not shown) that is a coupling mechanism and a communication terminal set of the mount portion. The interchangeable lens 2100 receives electric power supplied from the camera main body 2200 via a power supply terminal (not shown) provided at the mount portion and controls various actuators (described later) and a lens microcomputer (hereinafter, referred to as lens microcomputer) 2111. The interchangeable lens 2100 and the camera main body 2200 communicate with each other via the communication terminal set (shown in FIG. 18) provided at the mount portion. Here, the communication terminal set 2300 includes a communication terminal set 2300a (which is an example of a communication portion of the image capturing apparatus) provided at the mount portion of the camera main body 2200 and a communication terminal set 2300b (which is an example of a communication portion of the accessory apparatus) provided at the mount portion of the interchangeable lens 2100. The communication terminal set 2300a includes a communication terminal 2301a (which is an example of a first communication portion of the image capturing apparatus), a communication terminal 2302a (which is an example of a second communication portion of the image capturing apparatus), and a communication terminal 2303a (which is an example of a third communication portion of the image capturing apparatus). The communication terminal set 2300 includes a communication terminal 2301b (which is an example of a first communication portion of the accessory apparatus), a communication terminal 2302b (which is an example of a second communication portion of the accessory apparatus), and a communication terminal 2303b (which is an example of a third communication portion of the accessory apparatus).

The interchangeable lens 2100 has an imaging optical system. The imaging optical system includes a field lens 2101, a variable magnification lens 2102 that performs variable magnification, a diaphragm unit 2114 that adjusts the light quantity, an image blur correction lens 2103, and a focus lens 2104 that performs focusing, in order from an object OBJ side.

The variable magnification lens 2102 and the focus lens 2104 are respectively held by lens holding frames 2105, 2106. The lens holding frames 2105, 2106 each is guided so as to be movable in an optical axis direction indicated by the dashed line in the drawing by a guide shaft (not shown) and each is driven in the optical axis direction by a corresponding one of stepping motors 2107, 2108. The stepping motors 2107, 2108 respectively move the variable magnification lens 2102 and the focus lens 2104 in synchronization with a drive pulse.

The image blur correction lens 2103 reduces an image blur due to camera shake or the like by moving in a direction perpendicular to the optical axis of the imaging optical system.

The lens microcomputer 2111 is an accessory control section that controls the operations of the components in the interchangeable lens 2100. The lens microcomputer 2111 receives a control command transmitted from the camera main body 2200 via a lens communication control section 2110 as an accessory communication control section to receive a request to transmit lens data. The lens microcomputer 2111 executes lens control corresponding to the control command and transmits lens data corresponding to the transmission request to the camera main body 2200 via the lens communication control section 2110.

The lens microcomputer 2111 drives the stepping motor 2107 and the stepping motor 2108 by outputting drive signals to a zoom drive circuit 2119 and a focus drive circuit 2120 in response to a command related to variable magnification or a command related to focusing within the control command With this configuration, a zoom process of controlling a variable magnification operation with the variable magnification lens 2102 and an autofocus process of controlling a focusing operation with the focus lens 2104 are executed. A focus position detection sensor 140 is a sensor that detects a focus position when the focus lens 2104 is operated through autofocus process or a manual focus process performed by user operation. The lens microcomputer 2111 acquires the position information of the focus lens in accordance with the output of the focus position detection sensor 140.

A lens barrel has an AF/MF selector switch (described later with reference to FIG. 17B) for switching between autofocus and manual focus and a focus limit switch 141 for limiting the drive range of the focus lens. The focus limit switch 141 (also referred to as first operating member) is configured as a selectable switch like, for example, "0.8 m to ∞" or "3 m to ∞", and executes control to move the focus lens within a limited range in autofocus control. When a photograph of an animal in a cage is intended to be taken, the range to move the focus lens is, for example, limited such that focus is not achieved at a close range. For a shooting scene for which focus control is intended to be executed within a predetermined limited distance range, setting a limit in this way is effective.

The diaphragm unit 2114 includes diaphragm blades 2114a, 2114b. States of the diaphragm blades 2114a, 2114b are detected by a Hall element 2115 and are input to the lens microcomputer 2111 via an amplifier circuit 2122 and an A/D converter circuit 2123. The lens microcomputer 2111 drives a diaphragm actuator 2113 by outputting a drive signal to a diaphragm drive circuit 2121 in accordance with the input signal from the A/D converter circuit 2123. With this configuration, a light quantity adjustment operation with the diaphragm unit 2114 is controlled.

Furthermore, the lens microcomputer 2111 drives a vibration control actuator 2126 via a vibration control drive circuit 2125 depending on a shake detected by a shake sensor (not shown), such as a vibration gyro, provided in the interchangeable lens 2100. With this configuration, an image stabilization process of controlling a shift operation of the image blur correction lens 2103 is executed. Signal information as user's camera shake information is output from the shake sensor of the vibration gyro, and the lens microcomputer 2111 acquires current camera shake state information.

In the present embodiment, for example, focus position information detected by the focus position detection sensor 140, camera shake state information detected by the shake sensor of the vibration gyro, zoom position information of a zoom lens, and the like are communicated to the camera main body 2200. However, not limited to the above-described focus position, camera shake state, and zoom position, any information that the interchangeable lens 2100 has may be communicated.

The camera main body 2200 includes an image pickup device 2201, such as a CCD sensor and a CMOS sensor, an A/D converter circuit 2202, a signal processing circuit 2203, a recording section 2204, a camera microcomputer (hereinafter, referred to as camera microcomputer) 2205, and a display section 2206 (which is an example of a display means).

The image pickup device 2201 performs photoelectric conversion of an object image formed by the imaging optical system in the interchangeable lens 2100 and outputs an electrical signal (analog signal). The A/D converter circuit 2202 converts the analog signal from the image pickup device 2201 to a digital signal. The signal processing circuit 2203 generates a video signal by executing various image processing on the digital signal from the A/D converter circuit 2202.

The signal processing circuit 2203 also generates focus information that indicating the state of contrast of an object image from the video signal, that is, focus state of the imaging optical system and luminance information indicating an exposure state. The signal processing circuit 2203 outputs the video signal to the display section 2206. The display section 2206 displays the video signal as a live view image used to check the composition, the focus, and the like.

A live view image to be displayed on the display section 2206 contains various pieces of setting information including, for example, a shutter speed, an aperture setting value, and the like of the camera main body. Also, in the present embodiment, the focus position information of the lens 100, and the like, communicated from the lens microcomputer 2111 via the communication control section 123, is displayed on a live view screen in a superimposed manner. A specific example of screen displayed will be described later in FIG. 24.

The camera microcomputer 2205 as a camera control section controls the camera main body 2200 in accordance with inputs from camera operating members such as an image capturing instruction switch and various setting switches (not shown). The camera microcomputer 2205 transmits a control command related to the variable magnification operation of the variable magnification lens 2102 to the lens microcomputer 2111 in response to operation of a zoom switch (not shown) via a communication interface (also referred to as I/F) circuit 2208. The camera microcomputer 2205 transmits a control command related to the light quantity adjustment operation by the diaphragm unit 2114 based on luminance information and the focusing operation by the focus lens 2104 based on focus information to the lens microcomputer 2111 via the communication interface circuit 2208.

A menu screen for changing various settings of the camera in response to inputs from the above-described camera operating members can be displayed on the display section 2206. It is possible to select whether to display various pieces of information (such as object distance information) of the lens 2111 of the present embodiment on the display section 2206 and intended information (such as focus position, magnification information, and camera shake state) to be displayed.

Figure 17B:
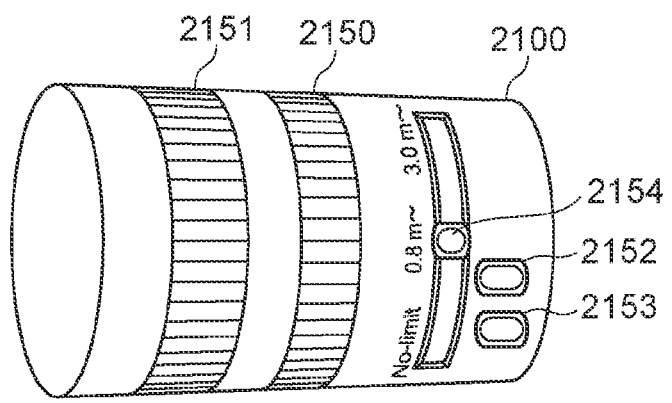
FIG. 17B is a view illustrating an appearance example of an interchangeable lens 2100 and various operating members.

FIG. 17B is a view illustrating an appearance example of the interchangeable lens 2100 and various operating members. A ring 2150 is a zoom ring and is capable of driving a zoom position from wide angle to telephoto angle in accordance with user operation or a instruction communicated from the camera.

A ring 2151 is a focus ring and allows a user to perform manual focus operation.

A switch 2152 is an operating member that allows switching of the mode between autofocus and manual focus.

A switch 2153 is an operating member that allows switching between a state where an image stabilization function is enabled and a state where the image stabilization function is disabled.

The switch 2154 corresponds to the focus limit switch 2141 in FIG. 17A. In the example illustrated here, the switch 2154 allows switching among three states, that is, no limit, "0.8 m to ∞", and "3.0 m to ∞".

<Basic Configuration for Communication>

Figure 18:
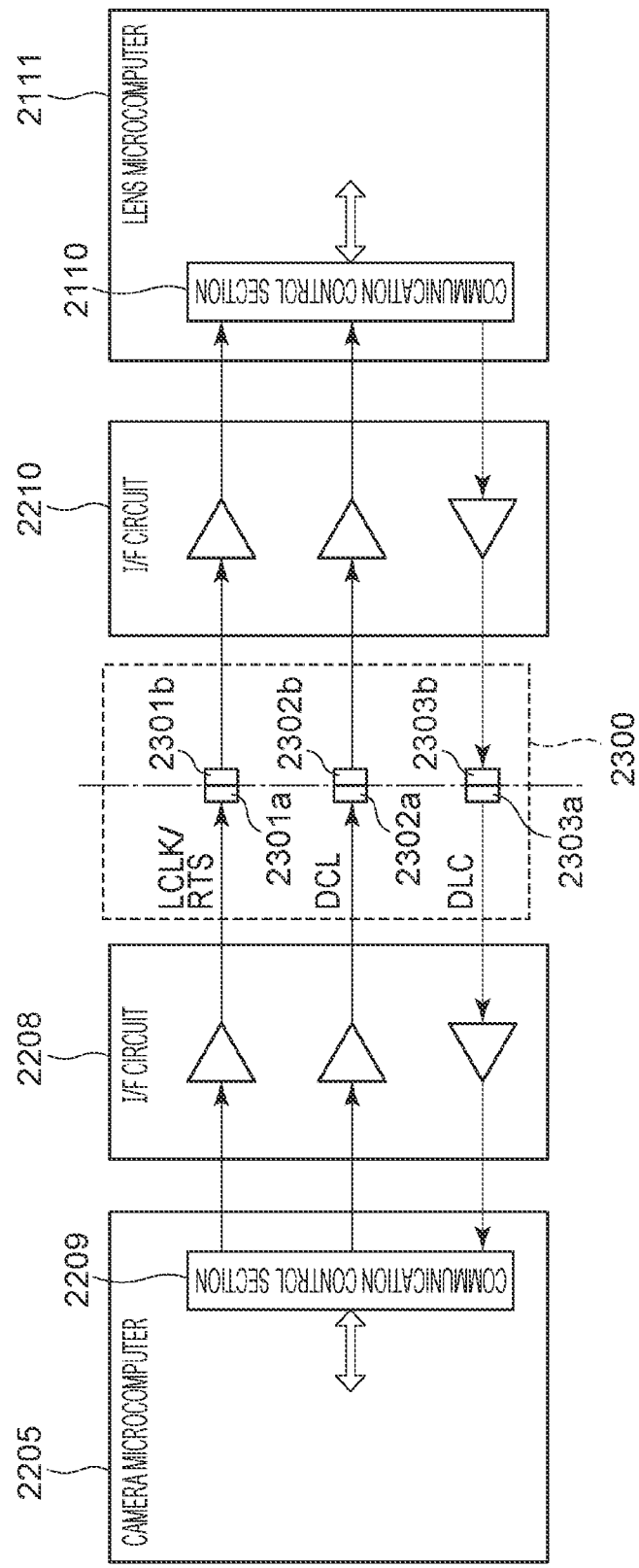
FIG. 18 is a schematic diagram showing a communication circuit between the image capturing apparatus and the accessory apparatus.

Next, a communication circuit arranged between the camera main body 2200 and the interchangeable lens 2100 and communication control executed therebetween will be described with reference to FIG. 18. The camera microcomputer 2205 has a function of managing a communication format with the lens microcomputer 2111 and a function of providing notification, such as a transmission request, to the lens microcomputer 2111. The lens microcomputer 2111 has a function of generating lens data and a function of transmitting the lens data.

The camera microcomputer 2205 and the lens microcomputer 2111 communicate with each other via a communication terminal set 2300 provided at the mount portion and communication interface circuits 2208, 2210 respectively provided in the camera microcomputer 2205 and the lens microcomputer 2111.

In the present embodiment, the camera microcomputer 2205 and the lens microcomputer 2111 perform serial communication based on three-wire communication method A and communication method B using three channels, that is, a first communication channel, a second communication channel, and a third communication channel.

Through the first communication channel, communication is performed via the communication terminal 2301a and the communication terminal 2301b.

The first communication channel is a notification channel that is a clock channel in the communication method A and a transmission request channel in the communication method B. Lens data transmitted as a signal from the lens microcomputer 2111 to the camera microcomputer 2205 through the first communication channel is referred to as a lens data signal DLC.

Through the second communication channel, communication is performed via the communication terminal 2302a and the communication terminal 2302b.

The second communication channel is used to transmit camera data from the camera microcomputer 2205 to the lens microcomputer 2111. Camera data transmitted as a signal from the camera microcomputer 2205 to the lens microcomputer 2111 through the second communication channel is referred to as a camera data signal DCL.

Through the third communication channel, communication is performed via the communication terminal 2303a and the communication terminal 2303b. The third communication channel is used to send lens data from the lens microcomputer 2111 to the camera microcomputer 2205. Lens data transmitted as a signal from the lens microcomputer 2111 to the camera microcomputer 2205 through the third communication channel is referred to as lens data the signal DLC.

<Communication Method A>

Initially, communication in the communication method A will be described. In the communication method A, a clock signal LCLK is output through a clock channel from the camera microcomputer 2205 as a communication master to the lens microcomputer 2111 as a communication slave. A camera data signal DCL includes a control command, a transmission request command, and the like from the camera microcomputer 2205 to the lens microcomputer 2111. On the other hand, a lens data signal DLC includes various data to be transmitted from the lens microcomputer 2111 to the camera microcomputer 2205 in synchronization with a clock signal LCLK. The camera microcomputer 2205 and the lens microcomputer 2111 are capable of performing communication with a full duplex communication method (full duplex method) in which the camera microcomputer 2205 and the lens microcomputer 2111 perform transmission and reception to and from each other at the same time in synchronization with a common clock signal LCLK.

Figure 19A:
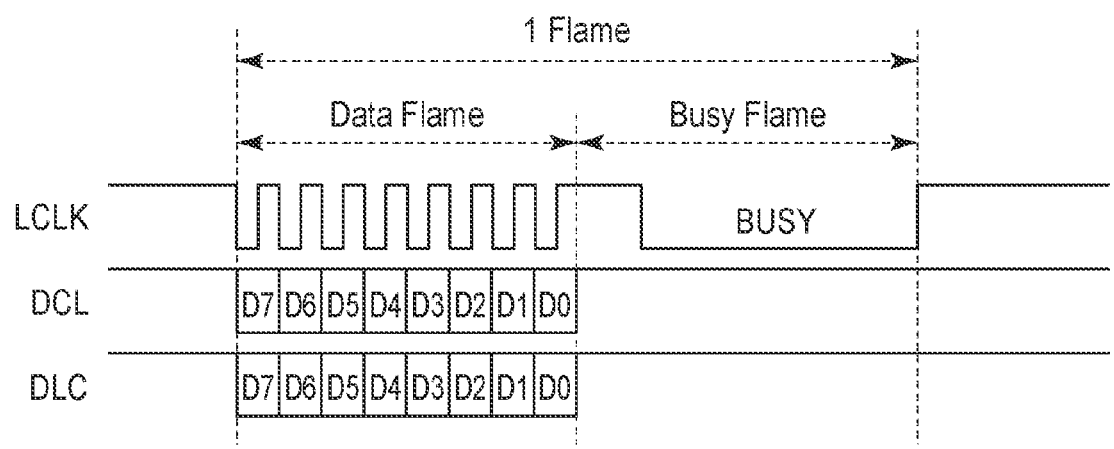
FIG. 19A is a schematic view showing signal waveforms in the communication mode M1.
Figure 19B:
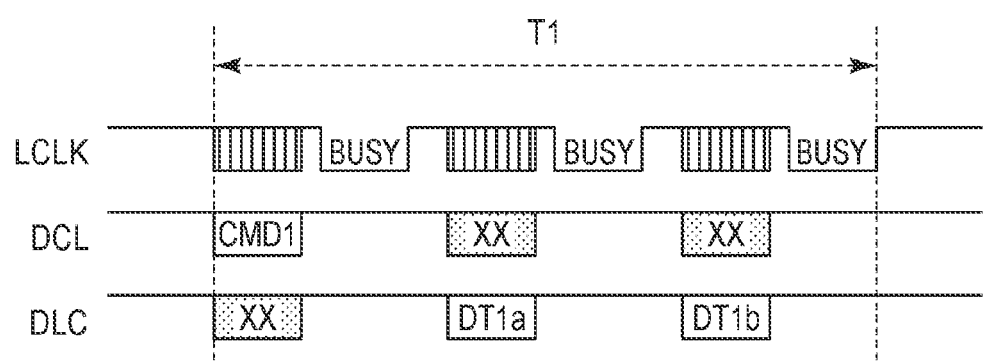
FIG. 19B is a schematic view showing signal waveforms in the communication mode M1.

FIG. 19A and FIG. 19B show the waveforms of signals exchanged between the camera microcomputer 2205 and the lens microcomputer 2111. An arrangement in which a procedure of such exchange is referred to as communication protocol.

FIG. 19A shows a signal waveform of one frame that is a minimum communication unit. Initially, the camera microcomputer 2205 outputs a clock signal LCLK that is a set of eight-cycle clock pulses, and transmits a camera data signal DCL to the lens microcomputer 2111 in synchronization with the clock signal LCLK. At the same time, the camera microcomputer 2205 receives a lens data signal DLC output from the lens microcomputer 2111 in synchronization with the clock signal LCLK.

In this way, one-byte (eight-bit) data is transmitted and received in synchronization with one-set clock signal LCLK between the lens microcomputer 2111 and the camera microcomputer 2205. A period of transmitting and receiving one-byte data is referred to as data frame. After transmission and reception of the one-byte data, the lens microcomputer 2111 transmits a signal providing notification of a communication standby request BUSY (hereinafter, referred to as BUSY signal) to the camera microcomputer 2205, with the result that a communication standby period is inserted. The communication standby period is referred to as BUSY frame, and the camera microcomputer 2205 is in a communication standby state while the camera microcomputer 2205 is receiving a BUSY frame. A communication unit including a set of a data frame period and a BUSY frame period is one frame. Note that depending on a communication condition, a BUSY frame may be not added, and, in this case, one frame is composed of only a data frame period.

FIG. 19B shows signal waveforms when the camera microcomputer 2205 transmits a request command CMD1 to the lens microcomputer 2111 and receives, from the lens microcomputer 2111, two-byte lens data DT1 (DT1*a*, DT1*b*) in response to the request command CMD1. FIG. 19B shows an example in which data communication is performed in accordance with the communication CMD1.

Between the camera microcomputer 2205 and the lens microcomputer 2111, the type of lens data DT and a byte count associated with each of multiple types of commands CMD are determined in advance. When the camera microcomputer 2205 that is a communication master transmits a specific command CMD to the lens microcomputer 2111, the lens microcomputer 2111 transmits a necessary clock number to the camera microcomputer 2205 in accordance with information on a lens data byte count corresponding to the command CMD. A process executed by the lens microcomputer 2111 for the command CMD1 includes superimposing a BUSY signal on a clock signal LCLK of each frame, and the above-described BUSY frame is inserted between the data frames.

In the communication CMD1, the camera microcomputer 2205 transmits a clock signal LCLK to the lens microcomputer 2111 and further transmits a request command CMD1 to request for transmission of lens data DT1 to the lens microcomputer 2111 as a camera data signal DCL. A lens data signal DLC in this frame is treated as invalid data.

Subsequently, the camera microcomputer 2205 outputs a clock signal LCLK through the clock channel for eight cycles and then switches the clock channel on the camera microcomputer side (camera main body-side) from output setting to input setting. When switching of the clock channel on the camera microcomputer side is complete, the lens microcomputer 2111 switches the clock channel on the lens microcomputer 2111 side (interchangeable lens-side) from input setting to output setting. The lens microcomputer 2111 sets the voltage level of the clock channel to Low to provide notification of a communication standby request BUSY to the camera microcomputer 2205. Thus, a BUSY signal is superimposed on the clock channel. The camera microcomputer 2205 maintains input setting of the clock channel and stops communication with the lens microcomputer 2111 while notification of a communication standby request BUSY is being provided.

The lens microcomputer 2111 generates lens data DT1 corresponding to a transmission request command CMD1 during a period of providing notification of the communication standby request BUSY. When the lens microcomputer 2111 completes preparations for transmitting the lens data DT1 as a lens data signal DLC of the next frame, the lens microcomputer 2111 switches the signal level of the clock channel on the lens microcomputer side to High and cancels the communication standby request BUSY.

When the camera microcomputer 2205 recognizes the cancellation of the communication standby request BUSY, the camera microcomputer 2205 transmits a one-frame clock signal LCLK to the lens microcomputer 2111 to receive lens data DT1*a* from the lens microcomputer 2111. When the camera microcomputer 2205 having output a clock signal LCLK for eight cycles again and the lens microcomputer 2111 repeat an operation similar to the above operation in the next frame, the camera microcomputer 2205 receives lens data DT1*b* from the lens microcomputer 2111.

<Communication Method B>

Figure 20:
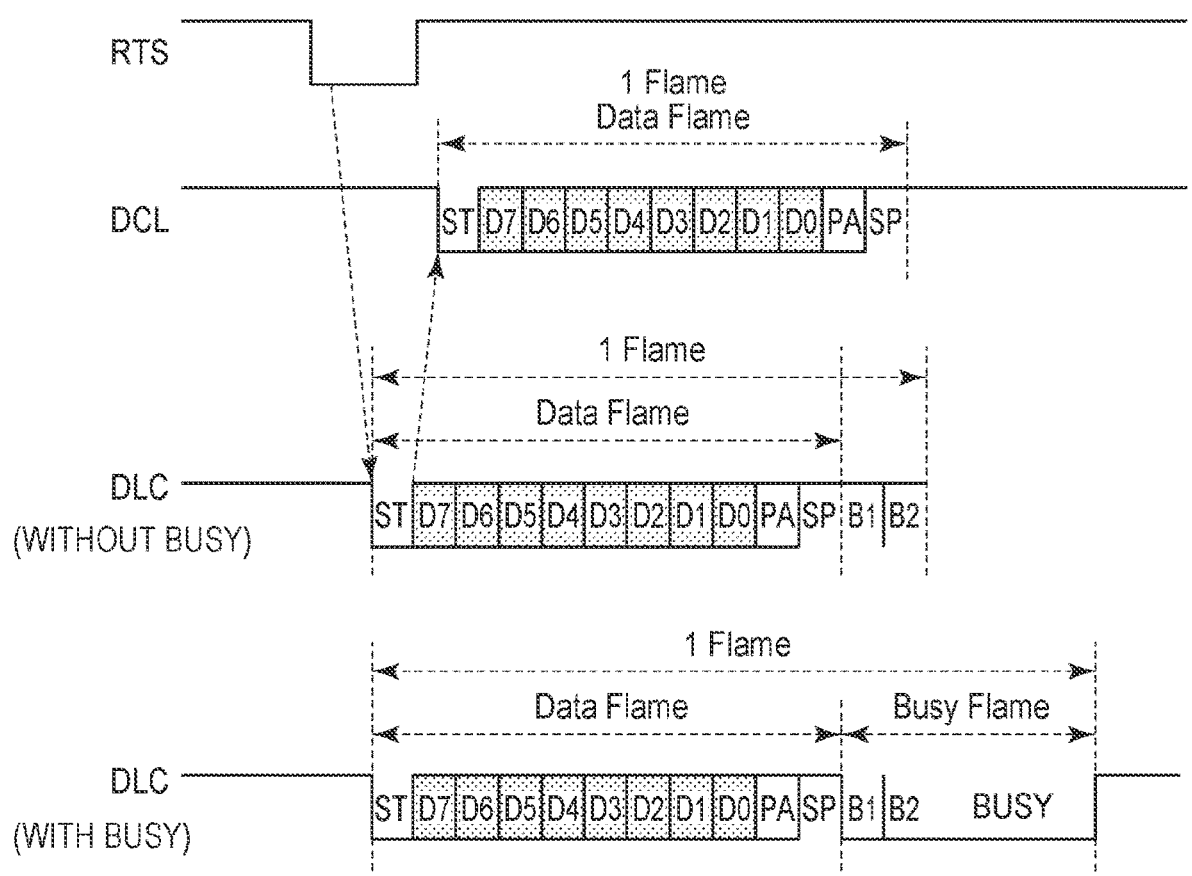
FIG. 20 is a schematic view showing signal waveforms in the communication mode M2.

Next, communication in the communication method B will be described. The communication mode M2 in which communication is performed by using the format F1 with the communication method B will also be described. FIG. 20 shows the waveforms of communication signals exchanged between the camera microcomputer 2205 and the lens microcomputer 2111 in the communication mode M2. As described above, in the format F1, a BUSY frame is selectively added to a lens data signal DLC.

In the communication method B, a transmission request channel is used to provide notification of, for example, a request to transmit lens data from the camera microcomputer 2205 that is a communication master to the lens microcomputer 2111 as a communication slave. Notification through the transmission request channel is performed by changing the level (voltage level) of a signal through the transmission request channel between High (first level) and Low (second level). In the following description, a signal supplied through the transmission request channel in the communication method B is referred to as a transmission request signal RTS.

A first data communication channel, as well as the communication method A, is used to transmit a lens data signal DLC including various data from the lens microcomputer 2111 to the camera microcomputer 2205. A second data communication channel also, as well as the communication method A, is used to transmit a camera data signal DCL including a control command, a transmission request command, and the like from the camera microcomputer 2205 to the lens microcomputer 2111.

In the communication method B, different from the communication method A, the camera microcomputer 2205 and the lens microcomputer 2111 do not transmit or receive data in synchronization with a common clock signal, and set a communication speed in advance and perform transmission and reception at a communication bit rate based on the setting. The communication bit rate indicates an amount of data that can be transferred in a second, and its unit is in bps (bits per second).

In the present embodiment, in the communication method B, as well as the communication method A, the camera microcomputer 2205 and the lens microcomputer 2111 perform communication with a full duplex communication method (full duplex method) in which the camera microcomputer 2205 and the lens microcomputer 2111 transmit and receive signals to and from each other.

FIG. 20 shows the signal waveforms of one frame that is a minimum communication unit. A breakdown of one-frame data format has a portion that partially varies between a camera data signal DCL and a lens data signal DLC.

Initially, a data format of the lens data signal DLC will be described. One frame of lens data signal DLC is composed of a first-half data frame and a subsequent BUSY frame. The signal level of the lens data signal DLC is maintained at High in a state in which no data transmission is being performed.

The lens microcomputer 2111 sets the voltage level of the lens data signal DLC to Low for a one-bit period in order to notifying the start of transmission of one frame of a lens data signal DLC to the camera microcomputer 2205. This one-bit period is referred to as a start bit ST, and a data frame begins with the start bit ST. Subsequently, the lens microcomputer 2111 transmits one-byte of lens data in an eight-bit period from the second bit, subsequent to the start bit ST, to the ninth bit.

A bit array of data begins with the highest bit data D7, followed by data D6, data D5, and so forth, and ends with the lowest bit data D0, as an MSB (most significant bit) first format. The lens microcomputer 2111 adds one bit of parity information (PA) to the tenth bit and sets the voltage level of a lens data signal DLC in a period of a stop bit SP indicating the end of one frame to High. Thus, a data frame period that begins with the start bit ST ends. Parity information does not need to be of one bit, and multiple-bit parity information may be added. Parity information is not indispensable, and a format in which no parity information is added may also be employed.

Subsequently, as represented by "DLC (with BUSY)" in the drawing, the lens microcomputer 2111 adds a BUSY frame after the stop bit SP. A BUSY frame, as in the case of the communication method A, represents a period of a communication standby request BUSY to be provide from the lens microcomputer 2111 to the camera microcomputer 2205. The lens microcomputer 2111 holds the signal level of the lens data signal DLC at Low until the communication standby request BUSY is cancelled.

On the other hand, there is a case where notification of a communication standby request BUSY from the lens microcomputer 2111 to the camera microcomputer 2205 is not needed. For this case, as represented by "DLC (without BUSY)" in the drawing, a data format in which one frame is composed without adding a BUSY frame (hereinafter, also referred to as BUSY notification) is also provided. In other words, as a data format of a lens data signal DLC, it is possible to select the one with BUSY notification or the one without BUSY notification in accordance with a status of processing in the lens microcomputer.

A method of identifying the presence or absence of BUSY notification performed by the camera microcomputer 2205 will be described. The signal waveform shown at "DLC (without BUSY)" in FIG. 20 and the signal waveform shown at "DLC (with BUSY)" in FIG. 20 include bit positions B1 and B2. The camera microcomputer 2205 selects the bit position of any one of B1 and B2 as a BUSY identification position P identifying the presence or absence of BUSY notification. In this way, the present embodiment employs a data format in which a BUSY identification position P is selected from between the bit positions B1 and B2. With this configuration, it is possible to deal with such a problem that a processing time until BUSY notification (Low in DLC) is fixed after transmitting a data frame of a lens data signal DLC varies depending on the processing ability of the lens microcomputer 2111.

Whether the BUSY identification position P is set at the bit position of B1 or the bit position of B2 is determined through communication between the camera microcomputer 2205 and the lens microcomputer 2111 before communication in the communication method B. Note that a BUSY identification position P does not need to be fixed to any one of the bit positions B1 and B2 and may be changed according to the processing ability of the camera microcomputer 2205 and the lens microcomputer 2111. A BUSY identification position P is not limited to B1 or B2 and may be set to a predetermined position behind a stop bit SP.

Here, the reason why a data format in which a BUSY frame added to a clock signal LCLK in the communication method A is added to a lens data signal DLC in the communication method B is adopted will be described.

In the communication method A, a clock signal LCLK that is output by the camera microcomputer 2205 that is a communication master and a BUSY signal that is output by the lens microcomputer 2111 that is a communication slave need to be exchanged through the same clock channel. For this reason, a collision between the output of the camera microcomputer 2205 and the output of the lens microcomputer 2111 is prevented by using time division method. In other words, a collision between the outputs is prevented by appropriately allocating an available output period in a clock channel to the camera microcomputer 2205 and the lens microcomputer 2111.

However, in the time division method, a collision between the outputs of the camera microcomputer 2205 and the lens microcomputer 2111 needs to be reliably prevented. Therefore, in a period from a point in time at which the camera microcomputer 2205 completes outputting an eight-pulse clock signal LCLK to a point in time at which the lens microcomputer 2111 is allowed to output a BUSY signal, a certain output prohibition period during which the outputs of both microcomputers 2205, 2111 are prohibited is inserted. The output prohibition period is a communication disabled period during which the camera microcomputer 2205 and the lens microcomputer 2111 are not able to communicate with each other, so it becomes a cause of reducing an effective communication speed.

To solve such a problem, the communication method B employs a data format in which a BUSY frame from the lens microcomputer 2111 is added to a lens data signal DLC through the first data communication channel that is a dedicated output channel for the lens microcomputer 2111.

Next, a data format of a camera data signal DCL will be described. The specifications of one frame of a data frame are the same as those of a lens data signal DLC. However, for a camera data signal DCL, different from a lens data signal DLC, addition of a BUSY frame is prohibited.

Next, a procedure of communication in the communication method B between the camera microcomputer 2205 and the lens microcomputer 2111 will be described. Initially, when an event to start communication with the lens microcomputer 2111 occurs, the camera microcomputer 2205 sets the voltage level of a transmission request signal RTS to Low (hereinafter, referred to as asserting a transmission request signal RTS) to provide notification of a communication request to the lens microcomputer 2111.

When the lens microcomputer 2111 detects a communication request as a result of a change of the voltage level of the transmission request signal RTS to Low, the lens microcomputer 2111 executes a process of generating a lens data signal DLC to be transmitted to the camera microcomputer 2205. Then, when preparations for transmitting the lens data signal DLC complete, the lens microcomputer 2111 starts transmitting one frame of the lens data signal DLC through the first data communication channel. Here, the lens microcomputer 2111 starts transmitting the lens data signal DLC within a set time set between the camera microcomputer 2205 and the lens microcomputer 2111 from a point in time at which the voltage level of the communication request signal RTS becomes Low.

In other words, in the communication method B, lens data to be transmitted just needs to be fixed in a period from a point in time at which the voltage level of the communication request signal RTS becomes Low to when transmission of the lens data signal DLC is started. There are no such strict constraints that lens data to be transmitted needs to be fixed before a first clock pulse is input as in the case of the communication method A, so it is possible to give some degrees of freedom to the timing to start transmitting a lens data signal DLC.

Subsequently, the camera microcomputer 2205 returns the voltage level of the transmission request signal RTS to High in response to detection of a start bit ST added to the head of a data frame of the lens data signal DLC received from the lens microcomputer 2111. Hereinafter, it is referred to as negating the transmission request signal RTS. With this configuration, a transmission request is cancelled, and transmitting a camera data signal DCL through the second communication channel is started. Any one of the negation of a transmission request signal RTS and the start of transmitting a camera data signal DCL may be made first, and both just need to be made before reception of a data frame of a lens data signal DLC completes.

After the lens microcomputer 2111 transmits the data frame of the lens data signal DLC, when the lens microcomputer 2111 needs to provide notification of a communication standby request BUSY to the camera microcomputer 2205, the lens microcomputer 2111 adds a BUSY frame to the lens data signal DLC. The camera microcomputer 2205 is monitoring the presence or absence of notification of a communication standby request BUSY. While notification of the communication standby request BUSY is being provided, the camera microcomputer 2205 is prohibited to assert the transmission request signal RTS for the next transmission request.

The lens microcomputer 2111 executes a necessary process in the period during which communication from the camera microcomputer 2205 is on standby in accordance with the communication standby request BUSY, and cancels the communication standby request BUSY after preparations for the next communication complete. On condition that the communication standby request BUSY is cancelled and transmission of the data frame of the camera data signal DCL is complete, the camera microcomputer 2205 is allowed to assert the transmission request signal RTS for the next transmission request.

In this way, in the present embodiment, in response to assertion of the transmission request signal RTS, triggered by the communication start event in the camera microcomputer 2205, the lens microcomputer 2111 starts transmitting the data frame of the lens data signal DLC to the camera microcomputer 2205. Then, the camera microcomputer 2205 starts transmitting the data frame of the camera data signal DCL to the lens microcomputer 2111 in response to detection of the start bit ST of the lens data signal DLC.

Here, the lens microcomputer 2111 adds a BUSY frame behind the data frame of the lens data signal DLC for a communication standby request BUSY as needed and then completes one-frame communication process by cancelling the communication standby request BUSY. Through the communication process, one byte of communication data is transmitted and received between the camera microcomputer 2205 and the lens microcomputer 2111.

Figure 21A:
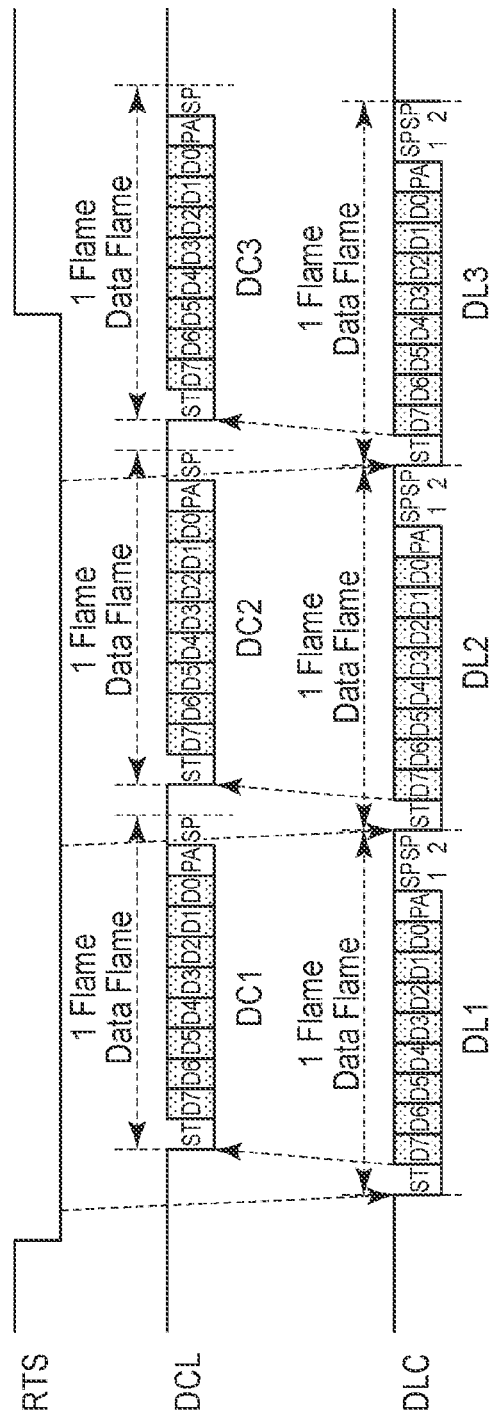
FIG. 21A is a schematic view showing signal waveforms in the communication mode M3.

Next, the communication mode M3 in which communication is performed in the format F2 by using the communication method B will be described. FIG. 21A shows the waveforms of communication signals exchanged between the camera microcomputer 2205 and the lens microcomputer 2111 in the communication mode M3. FIG. 21A shows the waveforms of communication signals when three frames of data are continuously transmitted. As described above, in the format F2, adding a communication standby request BUSY to a lens data signal DLC is prohibited.

In a data format of a lens data signal DLC in the communication mode M3, one frame is composed of only with a data frame, and no BUSY frame is present. Therefore, in the communication mode M3, it is not possible to provide notification of a communication standby request BUSY from the lens microcomputer 2111 to the camera microcomputer 2205.

Such a format F2 is used in applications to perform continuous communication with a reduced interval between frames when relatively large-volume data is transferred between the camera microcomputer 2205 and the lens microcomputer 2111. In other words, high-speed communication of mass data is possible by using the format F2.

Figure 21B:
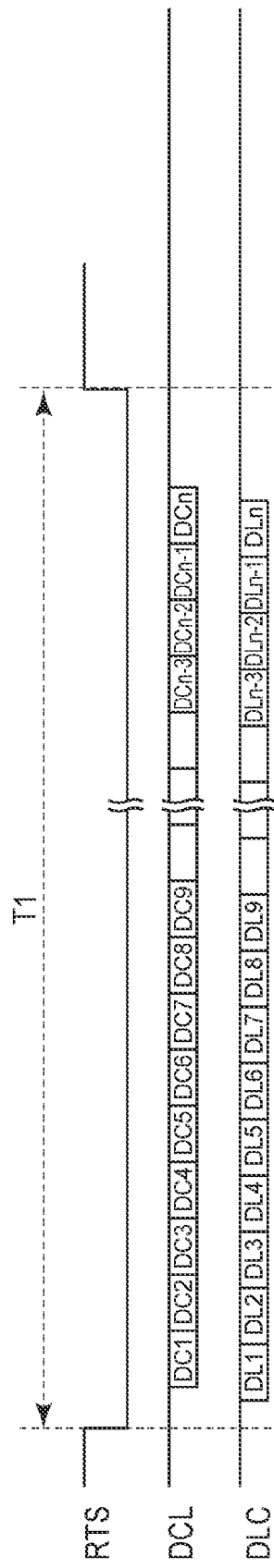
FIG. 21B is a schematic view showing signal waveforms in the communication mode M3.

Next, a communication control process between the camera microcomputer 2205 and the lens microcomputer 2111, which is the characteristic of the present embodiment, will be described. FIG. 21B shows the waveforms of communication signals in a case where the camera microcomputer 2205 and the lens microcomputer 2111 respectively continuously transmit and receive n frames of a camera data signal DCL and n frames of a lens data signal DLC. When an event to start communication with the lens microcomputer 2111 occurs, the camera microcomputer 2205 asserts a transmission request signal RTS. In the format F2, different from the format F1, the camera microcomputer 2205 does not need to negate a transmission request signal RTS frame by frame. Therefore, while it is possible to continuously transmit and receive data, the asserted state of the transmission request signal RTS is maintained.

When the lens microcomputer 2111 detects a communication request due to assertion of the transmission request signal RTS, the lens microcomputer 2111 executes a process of generating a lens data signal DLC to be transmitted to the camera microcomputer 2205. Then, when preparations for transmitting the lens data signal DLC complete, the lens microcomputer 2111 starts transmitting the first frame of the lens data signal DLC (DL1) through the first data communication channel.

After the lens microcomputer 2111 transmits the data frame of the first frame of the lens data signal DLC, the lens microcomputer 2111 checks a transmission request signal RTS again. At this time, when the transmission request signal RTS is in an asserted state, the lens microcomputer 2111 transmits the next second frame of the lens data signal DLC (DL2) to the camera microcomputer 2205 subsequently to the first frame of which transmission is complete. While the asserted state of the transmission request signal RTS is maintained in this way, the lens data signal DLC (DL1 to DLn) from the lens microcomputer 2111 is continuously transmitted to the camera microcomputer 2205. When transmission of a predetermined number n of frames completes, transmission of the lens data signal DLC is stopped.

In response to detection of a start bit ST of each frame of the lens data signal DCL from the lens microcomputer 2111, transmission of n frames of the camera data signal DCL (DC1 to DCn) from the camera microcomputer 2205 through the second communication channel is started.

FIG. 21C shows the waveforms of communication signals in the case where a temporary communication standby is instructed from the camera microcomputer 2205 or the lens microcomputer 2111 during communication of continuous transmission and reception of data, shown in FIG. 21B. Here, the lens microcomputer 2111 also starts transmitting a lens data signal DLC when a communication request signal RTS from the camera microcomputer 2205 is asserted, and the camera microcomputer 2205 starts transmitting a camera data signal DCL in response to detection of a start bit ST of the lens data signal DLC.

T2w1 denotes a communication standby period that is a period during which a communication standby is instructed from the camera microcomputer 2205, and the instruction is informed to the lens microcomputer 2111 from the camera microcomputer 2205 by temporarily negating the transmission request signal RTS. When the lens microcomputer 2111 detects that the transmission request signal RTS is negated, the lens microcomputer 2111 stops transmission after transmission of the frame of the lens data signal DLC in process of transmitting at the time of the detection (in the drawing, DL6; hereinafter, referred to as stop frame).

As a result of the stop of transmitting the lens data signal DLC, the camera microcomputer 2205 also stops transmission of the camera data signal DCL after transmitting a frame (DC6) corresponding to the stop frame among frames of the camera data signal DCL. Through such communication control, even when a communication standby instruction is issued during communication of continuous data transmission and reception, it is possible to manage a lens data signal DLC and a camera data signal DCL such that the number of transmitted frames of each of the lens data signal DLC and the camera data signal DCL is equal to each other.

When a communication standby request event disappears, the camera microcomputer 2205 is able to instruct the lens microcomputer 2111 to resume communication by asserting the transmission request signal RTS again. In response to a communication resumption instruction, the lens microcomputer 2111 resumes transmission of the lens data signal DLC from the next frame (DL7; hereinafter, referred to as resumption frame) subsequent to the stop frame. Then, in response to detection of the start bit ST of the resumption frame, the camera microcomputer 2205 resumes transmission of the camera data signal DCL from the frame (DC7) corresponding to the resumption frame.

On the other hand, T2w2 denotes a communication standby period that is a period during which a communication standby is instructed from the lens microcomputer 2111. In the drawing, after the end of the communication standby period T2w1, both the camera microcomputer 2205 and the lens microcomputer 2111 do not instruct a communication standby and continuously transmit and receive data in order of the above-described resumption frames DL7, DC7 and subsequent frames DL8, DC8 to DL9, DC9.

Then, when a communication standby request event occurs at the time when transmission of the frame DL9 in the lens microcomputer 2111 (reception of the frame DC9 in the camera microcomputer 2205) completes, the lens microcomputer 2111 provides notification of a communication standby instruction to the camera microcomputer 2205.

When the lens microcomputer 2111 does not transmit the lens data signal DLC while the transmission request signal RTS is in an asserted state, notification of a stop of communication is provided from the lens microcomputer 2111 to the camera microcomputer 2205.

The camera microcomputer 2205 keeps constant watch on a start bit ST of each frame of the lens data signal DCL and is arranged to stop transmitting the next frame of the camera data signal DCL when no start bit ST is detected. Even when the camera microcomputer 2205 asserts a transmission request signal RTS, if the camera microcomputer 2205 does not receive the lens data signal DLC (in the drawing, DL10) from the lens microcomputer 2111, the camera microcomputer 2205 stops communication without transmitting the camera data signal DCL (DC10). The camera microcomputer 2205 maintains the transmission request signal RTS in an asserted state during a communication standby period T2w2 resulting from an instruction issued from the lens microcomputer 2111.

After that, the communication standby request event disappears in the lens microcomputer 2111, and the lens microcomputer 2111 resumes transmission of the resumption frame DL10 of the lens data signal DLC. The camera microcomputer 2205 resumes transmission of the associated frame DC10 of the camera data signal DCL in response to detection of the start bit ST of the resumption frame DL10.

Figure 22:
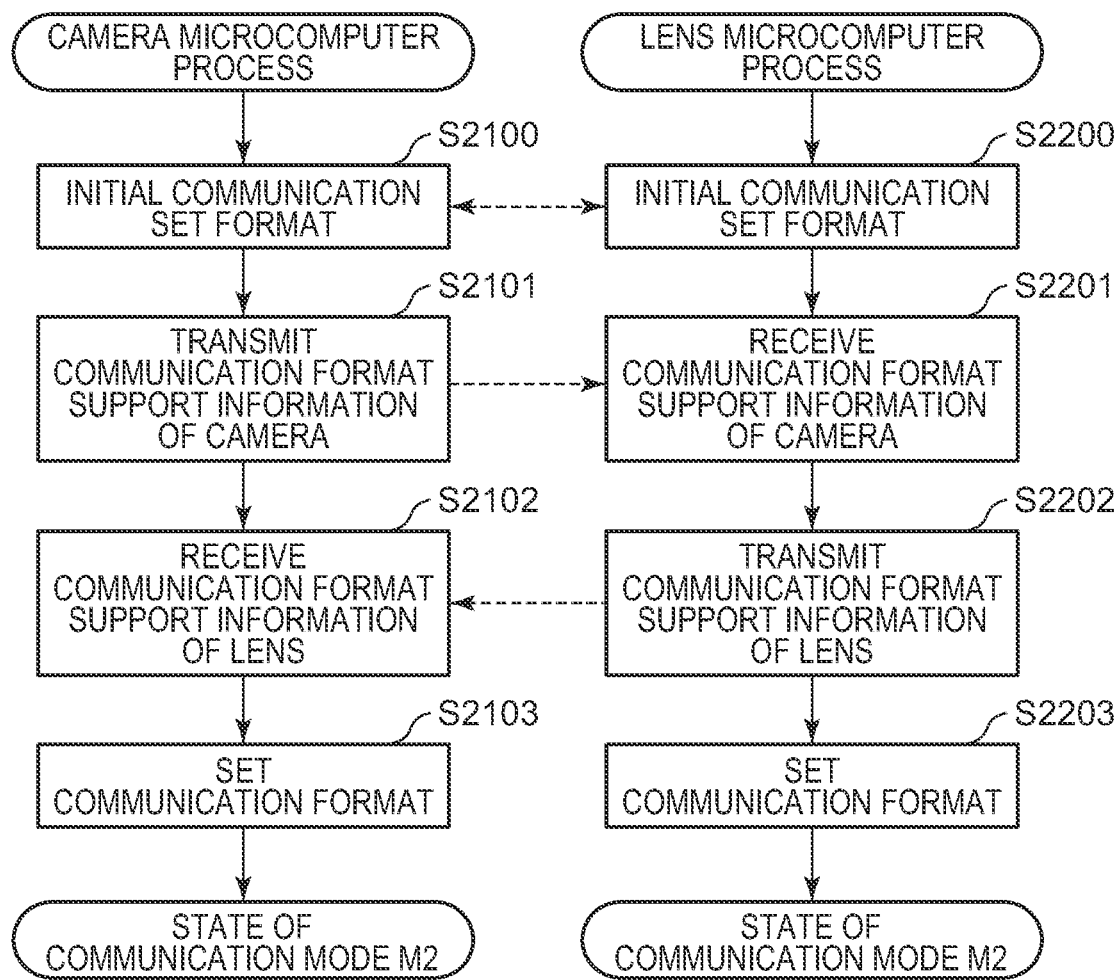
FIG. 22 is a flowchart illustrating the flow of determining a communication format in the accessory apparatus and the image capturing apparatus.
Figure 23:
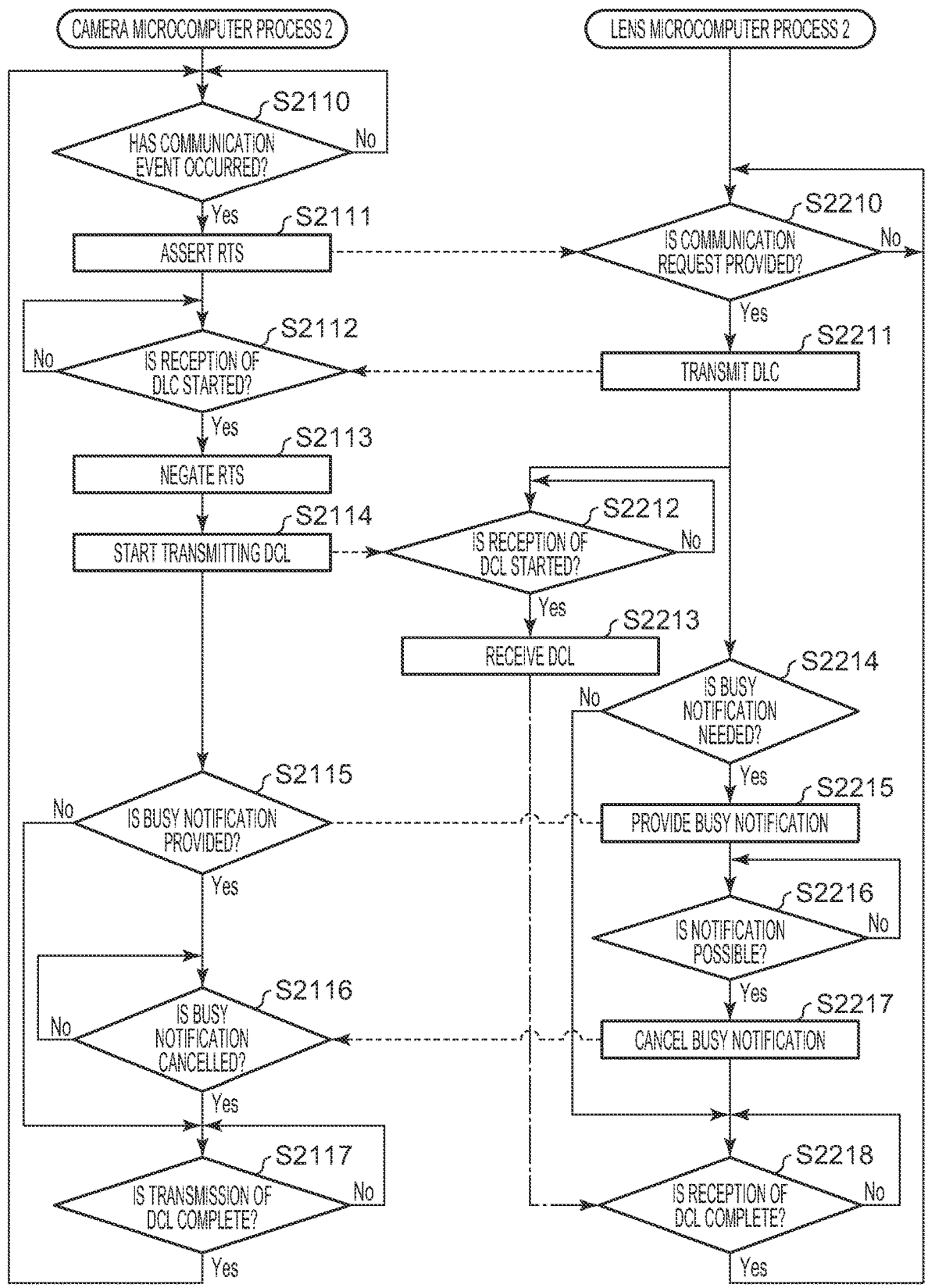
FIG. 23 is a flowchart illustrating a data communication flow in the communication mode M2.

Next, a procedure of determining a communication format, executed between the camera microcomputer 2205 and the lens microcomputer 2111, will be described with reference to FIG. 22. The camera microcomputer 2205 and the lens microcomputer 2111 execute communication control shown in the flowcharts of FIG. 22 and FIG. 23 in accordance with the communication control program as the computer program. In FIG. 22 and FIG. 23, "S" denotes step.

Initially, when the interchangeable lens 2100 is attached to the camera main body 2200, the camera microcomputer 2205 and the lens microcomputer 2111 each sets, in step S2100 and step S2200, the communication format to an initial communication format in which establishment of communication is ensured. Here, the initial communication format may be a combination of a communication method and a data format, described in the present embodiment, or may be another communication format. When an asynchronous communication format is selected as an initial communication format, it is desirable that a BUSY identification position P be set such that communication can be performed even with any combination of a camera and an interchangeable lens.

Subsequently, in step S2101, the camera microcomputer 2205 transmits, to the lens microcomputer 2111, camera identification information indicating communication formats supported by the camera main body 2200. In step S2202, the lens microcomputer 2111 transmits, to the camera microcomputer 2205, lens identification information indicating communication formats supported by the interchangeable lens 2100.

Here, "identification information" includes information indicating which of communication methods, the clock synchronous method or the asynchronous method, is supported and information indicating the available range of communication bit rate. Information indicating a BUSY identification position P is also included in the identification information.

The camera microcomputer 2205 receives lens identification information in step S2102. The lens microcomputer 2111 receives camera identification information in step S2201. Here, in the flowchart of FIG. 22, the lens identification information is transmitted after the camera identification information is transmitted. Alternatively, the camera identification information and the lens identification information may be transmitted at the same time. Alternatively, the camera identification information may be transmitted after the lens identification information is transmitted.

Subsequently, in step S2103 and step S2203, a communication format used in the subsequent communication is set. Specifically, the camera microcomputer 2205 and the lens microcomputer 2111 determine the fastest rate of the mutually available communication bit rates as the communication bit rate. In addition, of the mutually available BUSY identification positions, a position closest to a stop bit SP is set for the BUSY identification position.

Through the above communication control, the communication mode of each of the camera microcomputer 2205 and the lens microcomputer 2111 shifts into the state of M2.

<Data Communication Flow in Asynchronous Communication Method>

Next, a data communication flow in the asynchronous communication method will be described with reference to FIG. 23. FIG. 23 illustrates a data communication flow with a data format in which addition of a BUSY signal is allowed.

The camera microcomputer 2205 is keeping watch on whether there occurs a communication event to start communication with the lens microcomputer 2111. When a communication event occurs in step S2110, the process proceeds to step S2111. In step S2111, as described above, the camera microcomputer 2205 provides a communication request to the lens microcomputer 2111 by asserting a communication request signal RTS.

The lens microcomputer 2111 is keeping watch on whether the communication request signal RTS is asserted. When the lens microcomputer 2111 recognizes in step S2210 that the communication request signal RTS is asserted, the process proceeds to step S2211. In step S2211, the lens microcomputer 2111 transmits a lens data signal DLC to the camera microcomputer 2205 via the first data communication channel.

When the camera microcomputer 2205 receives the lens data signal DLC from the lens microcomputer 2111 (YES in step S2112), the process proceeds to step S2113, and the camera microcomputer 2205 negates the communication request signal RTS. Then, the process proceeds to step S2114, and the camera microcomputer 2205 transmits a camera data signal DCL to the lens microcomputer 2111 via the second data communication channel.

When the lens microcomputer 2111 detects the start of reception of the camera data signal DCL in step S2212, the process proceeds to step S2213, and the lens microcomputer 2111 executes a process of receiving the camera data signal DCL. In parallel with the process of step S2213, in step S2214, the lens microcomputer 2111 determines whether it is necessary to provide notification of a communication standby request BUSY to the camera microcomputer 2205. When it is not necessary to provide notification of a communication standby request BUSY, the process proceeds to step S2218, and the lens microcomputer 2111 waits until reception of the camera data signal DCL completes.

On the other hand, when the lens microcomputer 2111 needs to provide notification of a communication standby request BUSY to the camera microcomputer 2205, the process proceeds to step S2215, and the lens microcomputer 2111 adds a BUSY frame to the lens data signal DLC. The lens microcomputer 2111 executes a necessary process in the period during which notification of the communication standby request BUSY is being provided, and, after preparations for the next communication complete (Yes in step S2216), the lens microcomputer 2111 cancels the communication standby request (step S2217). After the communication standby request BUSY is cancelled, the process proceeds to step S2218, and the lens microcomputer 2111 waits until reception of the camera data signal DCL completes. When reception of the camera data signal DCL completes (Yes in step S2218), the process returns to step S2210, and the lens microcomputer 2111 continues to keep watch on whether the communication request signal RTS is asserted.

When the camera microcomputer 2205 receives notification of the communication standby request BUSY in step S2115, the camera microcomputer 2205 waits until the communication standby request BUSY is cancelled. When the communication standby request BUSY is cancelled (YES in step S2116), the process proceeds to step S2117, and the camera microcomputer 2205 determines whether transmission of the camera data signal DCL is complete. When the camera microcomputer 2205 is not receiving notification of a communication standby request BUSY in step S2115 as well, the process proceeds to step S2117, and the camera microcomputer 2205 determines whether transmission of the camera data signal DCL is complete. When the camera microcomputer 2205 determines in step S2117 that transmission of the camera data signal DCL is complete, the process returns to step S2110, and the camera microcomputer 2205 continues to keep watch on whether there occurs a communication event.

As described above, the present embodiment relates to communication control in communication of the asynchronous method (communication method B) using three channels. A communication standby request BUSY is transmitted from the lens microcomputer 2111 to the camera microcomputer 2205 via the first data communication channel that is the dedicated output channel for the lens microcomputer 2111. On the other hand, a transmission request signal RTS from the camera microcomputer 2205 is transmitted from the camera microcomputer 2205 to the lens microcomputer 2111 via a notification channel as the dedicated output channel for the camera microcomputer 2205.

In this way, a communication standby request BUSY from the lens microcomputer 2111 is transmitted and received via the dedicated output channel for the lens microcomputer 2111, and a transmission request signal RTS from the camera microcomputer 2205 is transmitted and received via the dedicated output channel for the camera microcomputer 2205. Thus, it is possible to shorten a communication invalid period between the camera microcomputer 2205 and the lens microcomputer 2111, so it is possible to increase the actual communication speed as a result.

For the timing to start communication, data transmission from the lens microcomputer 2111 to the camera microcomputer 2205 is started first. The camera microcomputer 2205 starts data transmission in response to detection of a start bit ST of a data frame transmitted from the lens microcomputer 2111. By setting the timing to start communication in this way, it is possible to give some degrees of freedoms to the timing at which the lens microcomputer 2111 having received a transmission request signal RTS starts transmitting data to the camera microcomputer 2205.

For example, it is possible to change the timing to start data transmission according to the information processing ability of the lens microcomputer 2111. Thus, without leading to a failure of communication, it is possible to improve communication speed between the camera main body 2200 and the interchangeable lens 2100.

<Problem Assumed in Present Embodiment>

Here, a problem assumed in the present embodiment will be described.

When an index of distance information is intended to be displayed without taking into consideration a difference in specifications of an interchangeable lens, such as a wide angle lens and a telephoto lens, or a difference in specifications, such as the number of pixels of a display member of a camera, a problem can occur in the following situations.

Figure 35A:
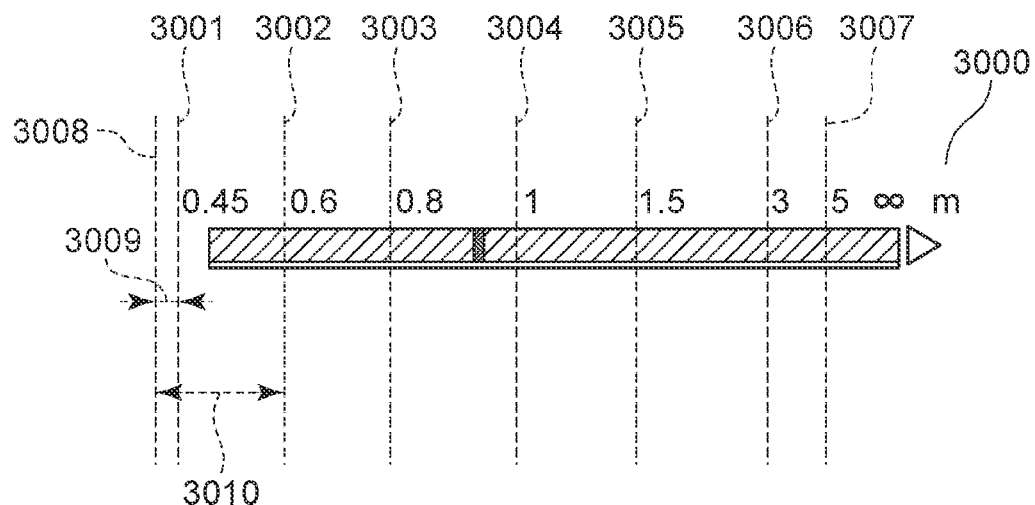
FIG. 35A is a view for explaining a problem.

FIG. 35A shows representative index positions on a distance bar, transmitted from the lens microcomputer 2111 to the camera microcomputer 2205. More specifically, it is the case where the display position of each index position is designated by the number of pixels. 3001 to 3007 respectively indicate start positions from which representative indices "0.45 m", "0.6 m", "0.8 m", "1 m", "1.5 m", "3 m", and "5 m" are displayed.

3008 is a display origin position, and the display start position "0.45 m" is designated like, for example, "30 pixels" as the number of pixels counted from the display origin 3008. Similarly, the display start position "0.6 m" is designated like, for example, "150 pixels" as the number of pixels counted from the display origin 3008.

In this method, the lens microcomputer 2111 of the interchangeable lens 2100 needs to hold in advance the number of pixels of the overall length of the display member of the camera that can be attached in order to effectively use the overall length of a distance bar.

Figure 35B:
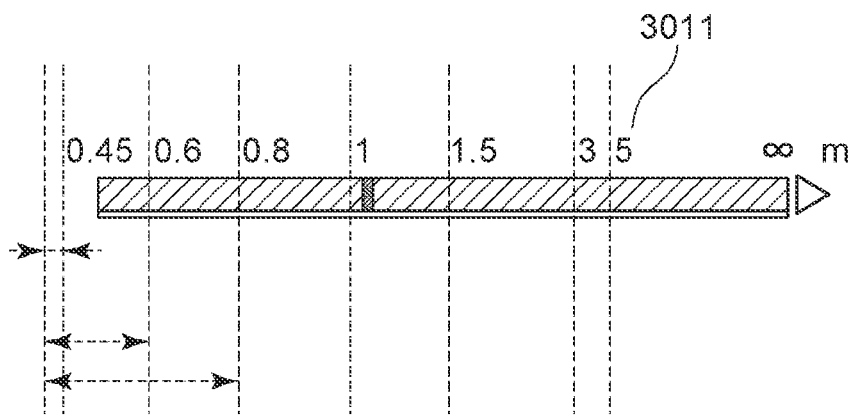
FIG. 35B is a view for explaining a problem.

When similar information exchange is performed at the time when the effective pixel count of the camera display member increases, index positions are displayed closer to each other as shown in FIG. 35B as compared to FIG. 35A. In this case, as indicated by 3011, the boundary between "3 m" and "5 m" becomes difficult to be recognized, and it may be recognized as "35 m".

To solve such a problem, a technique for transmitting specifications such as the effective pixel count of a display member of a camera to a lens and transmitting object distance information and representative index positions from the lens to the camera according to the effective pixel count of the display member of the camera is conceivable. However, it is not possible to learn in advance the effective pixel count of a camera that will be placed on sale after a lens product, so it is difficult to ensure compatibility. In addition, even when items to be displayed on the display section of a camera include a wide variety of information, such as object distance information, representative index values, macro magnification information, focus range information, and the like, it is necessary that the displayed contents do not influence drive control of focus, aperture, vibration control, and the like. In communication of information for display as well, when a delay occurs, a delay of display is caused, so usability decreases. Therefore, it is necessary to reduce a communication amount in information communication for display.

In the present embodiment, not only the lens microcomputer 2111 transmits appropriate information according to the specifications of a lens to the camera microcomputer 2205, but also, where necessary, the lens microcomputer 2111 transmits a normalized value to the camera microcomputer 2205. Thus, it is possible to appropriately display information for an interchangeable lens on the camera display section.

<Example of Display Screen on Object Distance Information of Distance Bar>

Next, an example of a display screen of distance bar information, displaying object distance information of the lens of the present embodiment on the camera display section 2206, will be described with reference to FIG. 24.

2801 indicates a live view display screen displayed on the camera display section 2206.

2802 is an icon indicating camera shooting mode information set from a menu of the camera, and, in this example, a shutter speed priority mode is set.

2803 indicates information display related to shooting, such as shutter speed, aperture value, exposure set value, and ISO speed, as various setting information in current shooting conditions.

2804 indicates an object at the time of taking a photograph. When in focus, the position information of the focus lens is communicated from the lens microcomputer 2111 to the camera microcomputer 2205 as object distance information.

2805 indicates a distance bar that represents an available shooting distance range from a close end to an infinite end of focus as the specifications of the interchangeable lens 2100.

2806 indicates representative index values of distance information for making the current object distance information be visually recognized easily, and the representative index values are represented as, for example, "0.45 m", "1.5 m", "5 m", and the like. Such an index related to an object distance is also referred to as first index. Optimal display quality is obtained by changing the display positions of the representative index values, the number of representative index values displayed, and the display interval of the representative index values, depending on the specifications of the interchangeable lens 2100 (such as a wide angle lens and a telephoto lens).

2807 indicates an infinite focus position icon indicating that the shooting distance is an infinite distance. The infinite focus position icon 2807 is also referred to as second index.

The interchangeable lens 2100 is generally designed such that a focus lens position at which a distant view comes into focus is not set to the infinity-side end of a physically movable range of the focus lens and a play is provided beyond the infinity-side end. The quantity of the play varies depending on the optical design of the interchangeable lens 2100. The play is expressed as over infinity in the present embodiment. A range to the right of the display position of the infinite distance icon up to the right end of the bar 2805 represents over infinity. Furthermore, the amount of over infinity varies depending on the model of the interchangeable lens 2100 as described above, the display position of the infinite distance icon is changed according to the model of the interchangeable lens 2100 attached.

2808 indicates the system of units of currently displayed object distance information. For example, "m" denotes meter, and "ft" denotes foot.

2809 indicates current position information of the focus lens, that is, object distance information in focus. In FIG. 24, the current position of the focus lens is present near the index position of "1 m", so it is visually recognized that the shooting distance is about 1 m.

2810 indicates a range in which focus drive is restricted in the case where the focus limit switch 141 of the interchangeable lens 2100 is enabled. The example represented by 2810 indicates an example when the focus limit switch is switched to "0.8 m to ∞" and represents that the range "close end to 0.8 m" is not used in autofocus. Generally, some of the interchangeable lenses 2100 are equipped with a focus limiter SW with which the shooting distance range of autofocus can be switched. However, a limited range varies depending on the model of the interchangeable lens 2100, so the focus limit range indicated by 2810 is allowed to be switched in accordance with the focus limit range acquired from the lens microcomputer 2111 depending on the model of a lens attached and a switch status.

2811 and 2812 denote icons indicating the drive directions of the focus lens 2104. When the focus is driven in the infinite direction, 2811 is shown, and 2812 is hidden. When the focus is driven in the close direction, 2811 is hidden, and 2812 is shown.

Depending on an interchangeable lens, a focus lens position can be stored in a lens microcomputer of the interchangeable lens in advance by a user. For example, a user is able to operate a focus ring by a certain position of the focus ring, corresponding to a desired focus lens position, and store information corresponding to the focus lens position. Then, when, for example, an operating member provided for the interchangeable lens is operated, it is possible to re-drive the focus lens to the stored focus lens position. The status of the re-drive may be shown on the display screen 2801. For example, a user may be informed of re-drive by displaying the icon 2811 or the icon 2812 to indicate that the focus lens is being driven. Also, for example, an icon (not shown) different from the icon 2811 or the icon 2812 may be displayed. Here, the information to be stored in the lens microcomputer may be any information corresponding to a preset focus lens position, and, for example, the position of the focus ring may be stored.

2813 denotes a position at which the representative index position "0.6 m" is placed on the distance bar. This position information is acquired by communication from the lens microcomputer 2111 and is represented as a placement position when the left end (that is, closest end) of the distance bar is an origin where the overall length of the distance bar is 100. When, for example, the representative index position "0.6 m" is intended to be placed at a position 10% from the left end for the overall length of the distance bar, information such that the index "0.6 m" is placed at a normalized position "10" is acquired from the lens microcomputer 2111. For the sake of convenience of description, the arrow is not displayed on the actual live view screen 2801 although shown in the drawing. Hereinafter, the same applies to the arrows 2814 and 2815, and the arrows 2814 and 2815 are not displayed on the live view screen.

2814, as well as 2813, denotes position information on the distance bar, normalized relative to the overall length of the distance bar 2805 that can be displayed by the camera display section 2206 for a current object distance position.

2815, as well as 2813, denotes position information on the distance bar, normalized relative to the overall length of the distance bar 2805 that can be displayed by the camera display section 2206 for a focus limit switch position.

<Example of Display Screen on Macro Magnification Information and Depth-of-Field Information of Distance Bar>

Figure 24:
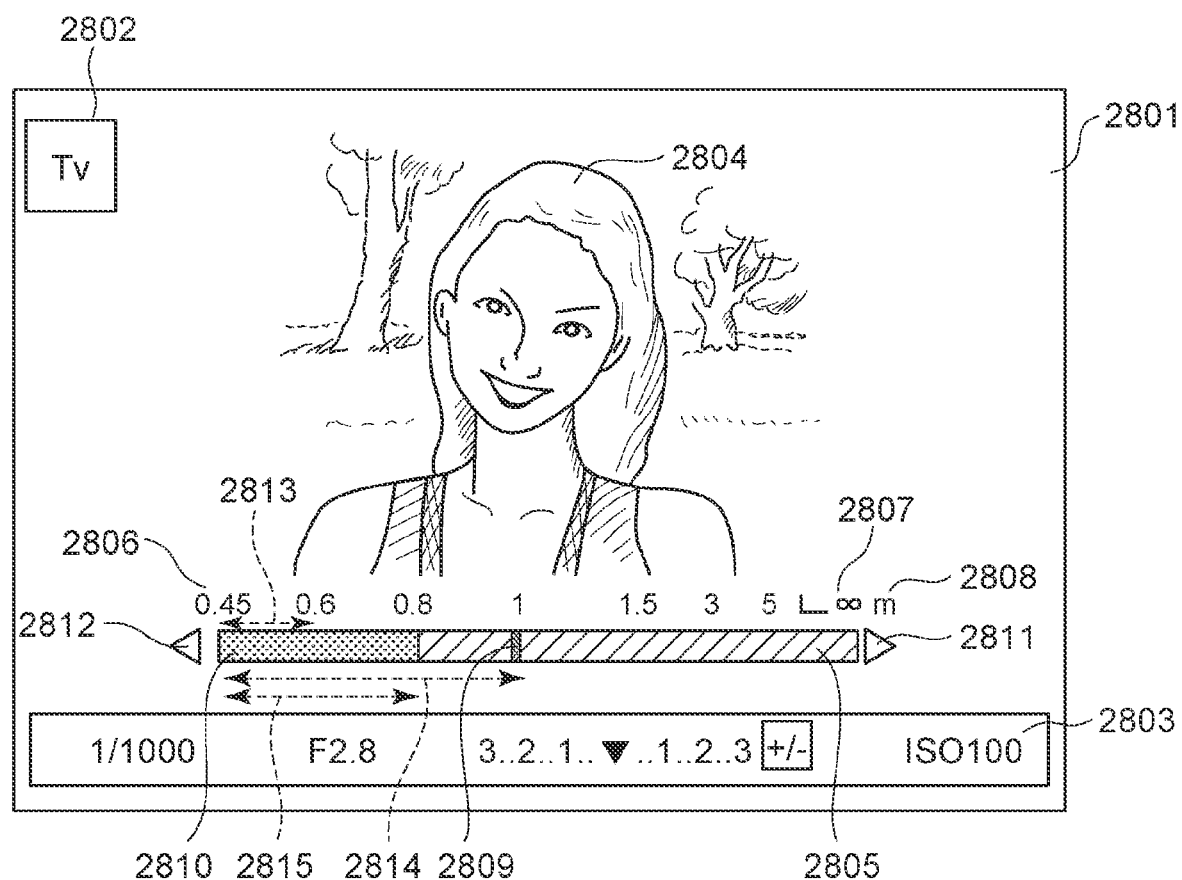
FIG. 24 is a schematic screen view illustrating shooting distance bar information displayed on the image capturing apparatus.

FIG. 24 shows an example in which object distance information is displayed. Next, FIG. 25 shows an example of screen displayed in the case where, for example, macro magnification information or depth-of-field information other than the object distance information.

2901 shows a state where macro magnification information is displayed in addition to the object distance information. For the magnification information, as well as the distance information, representative index values and representative index positions are appropriately placed so as to be visually recognized easily by a user according to the specifications of the interchangeable lens 2100. For example, 2902 denotes a macro magnification position of 1.2 times, and is placed at a position of "3" in accordance with position information normalized as a position at which "1.2×" is displayed on the distance bar as display information acquired from the interchangeable lens 2100. In addition, "0.7×" is placed at a position of "30" as a normalized position. The camera microcomputer 2205 acquires such information from the lens microcomputer 2111 and displays the information on the display section 2206.

2903 shows an example in which the depth-of-field information indicating a range in focus is displayed in addition to current object distance information. A depth of field varies depending on an aperture state. A depth of field increases with a reduction in aperture. A depth of field depends on acceptable circle-of-confusion information, which is a blur amount that is a criterion as to whether in focus, and aperture diameter, so the camera microcomputer 2205 acquires the depth-of-field information from current aperture diameter information acquired from the lens microcomputer 2111, and computes a depth. For example, a range in focus in the case where the aperture is set to F8, F22, or the like is computed. An index 2809 is current object distance information. An index 2904 is an index position indicating a depth-of-field range in the case where the aperture value is set to F8.0, and is displayed on the distance bar so as to be a depth-of-field position at a setting of F8.0 like 2905. Then, the range of 2906 is a depth-of-field range at a setting of F8.0. Similarly, an index 2907 is an index position indicating a depth-of-field range in the case where the aperture value is set to F22, and is displayed on the distance bar so as to be a depth-of-field position at a setting of F22 like 2908. Then, the range of 2909 is a depth-of-field range at a setting of F22.

<Startup Process>

Next, a process for transferring display information described in FIG. 24 and FIG. 25 from the interchangeable lens 2100 to the camera main body 2200 and displaying the display information will be described by using the flowcharts of a camera startup process of FIG. 26, a steady operation process of FIG. 27A, and a display update process of FIG. 27B. Initially, processes of both the camera microcomputer 2205 and the lens microcomputer 2111 for the camera startup process will be described below with reference to FIG. 26.

In S2001 and S2021, a communication process (initial communication) of negotiation between the camera main body 2200 and the interchangeable lens 2100 is executed. For negotiation communication, what function the camera main body 2200 supports is transmitted to the interchangeable lens 2100, and, on the other hand, function information of the interchangeable lens 2100 is transmitted to the camera main body 2200. More specifically, examples of such information include whether the interchangeable lens 2100 has an image stabilization function and whether the communication mode M2 and the communication mode M3 described with reference to FIG. 20 and FIG. 21 are supported.

In S2002, it is determined whether the camera microcomputer 2205 is capable of performing communication in the communication mode M2 with the currently attached interchangeable lens 2100 as a result of the communication process of S2001 and S2021. In the present embodiment, when it is not possible to perform communication in the communication mode M2, a process of displaying object distance information on the camera is not performed and, therefore, communication mode is shifted into a steady state. This is because the effective rate of communication is higher in the communication mode M2 than in the communication mode M1 and, therefore, there is an allowance in a communication band when the communication mode M2 is selected. However, even when the communication mode M2 is not supported and the communication mode M1 is selected, the process of displaying object distance information on the camera may be executed by a technique of, for example, reducing communication frequency according to an allowance in a communication band. When it is determined through the determination process that the communication mode M2 can be performed, a process of switching to the communication mode M2 is executed in S2003 and S2022. The switching process is executed by using the method described above with reference to FIG. 22.

A process in which the camera main body 2200 acquires information for displaying object distance information from the interchangeable lens 2100 through communication will be described in the subsequent process. For description of terms, information to be determined at the time when the interchangeable lens 2100 is attached to the camera main body 2200 (for example, focal lengths at the telephoto end and the wide-angle end, representative index positions of object distance information (described later), and the like) is referred to as static display information. The static display information is information that does not change with the states of the camera main body 2200 and the interchangeable lens 2100, such as operation of the camera and the lens and shooting modes. On the other hand, display information that dynamically changes with the operation of the camera main body 2200, for example, the position of focus, is referred to as dynamic display information. The dynamic display information is information that changes with the states of the camera main body 2200 and the interchangeable lens 2100, such as operation of the camera and the lens and shooting modes. The static display information is also referred to as first information. The dynamic display information is also referred to as second information.

In S2004, a request for the data size of static display information needed to display object distance information is provided to the interchangeable lens 2100. Here, static display information needed to display object distance information will be described.

Static display information for displaying object distance information on the camera display section 2206 includes information corresponding to the presence or absence of the operating members in the interchangeable lens 2100 and information related to display of indices. The static display information of the present embodiment is specifically, for example, parameters like the following 1 to 12.

Information Corresponding to the Presence or Absence of Operating Members

1. Presence or absence of a selector switch to a macro shooting state
2. Presence of absence of a focus limit switch Information Related to Display of Indices 3. The number of representative index positions in meter
4. Numeric values of representative indices (for the number of representative index positions) in meter
5. Normalized placement position information of representative indices on the distance bar (for the number of representative index positions) in meter
6. The number of representative index positions in foot
7. Numeric values of representative indices (for the number of representative index positions) in foot
8. Normalized placement position information of representative indices on the distance bar (for the number of representative index positions) in foot
9. The number of representative index positions in macro magnification
10. Numeric values of representative indices (for the number of representative index positions) in macro magnification
11. Normalized placement position information of representative indices on the distance bar (for the number of representative index positions) in macro magnification
12. Normalized placement position information of "∞" mark on the distance bar The above-described static display information will be described by using the example of screen displayed in FIG. 24.

Initially, the "information corresponding to the presence or absence of operating members" will be described. This information is information used to indicate that functions corresponding to operating members are provided, so this information may be substituted by other information as long as the information corresponds to the presence or absence of functions related to display. In other words, for example, the information "1. Presence or absence of a selector switch to a macro shooting state" just needs to be information indicating that it is possible to switch to a macro shooting state. The information "2. Presence of absence of a focus limit switch" just needs to be information indicating that a function of limiting a range in which a focus lens is moved is provided.

For the information "1. Presence or absence of a selector switch to a macro shooting state", some interchangeable lens products switch to a macro shooting mode by, for example, operating a switch (not shown) on a lens barrel while bringing a zoom ring to the end as operation of the lens barrel. This item indicates whether the interchangeable lens 2100 has such a selector switch to a macro shooting state. In this proposal, a shooting magnification is displayed on the camera display section 2206 at the time of macro shooting, so it is possible to switch the contents of display through operation of the switch. When the switch is not provided, communication control may be configured not to acquire display information at the time of macro shooting as static display information.

For the information "2. Presence or absence of a focus limit switch", some interchangeable lens products include a lens barrel having a focus limit switch that limits a distance range in which the focus is adjustable. In this proposal, a limited state by a focus limit switch is displayed on the camera display section 2206. When the switch is not provided, communication control may be configured not to acquire display information for index positions of a focus limit switch as static display information.

In the example of FIG. 24, the seven representative index positions "0.45 m", "0.6 m", "0.8 m", "1 m", "1.5 m", "3 m", and "5 m" are placed, so the parameter "3. The number of representative index positions in meter" is "7".

As will be described later in FIG. 26, the information of the items 1 to 12 is acquired at once at the time of attaching a lens. At this time, if the number of representative index values is set as a fixed value, the contents of communication need to have a blank when the number of representative index values is not the maximum number. On the other hand, when the number of representative index positions is included in the contents of communication as described above, a camera having received the information extracts information of the items 1 to 12 by analyzing the order of the reception data in accordance with the number of representative index positions, and does not need to perform communication that becomes a useless blank. More specifically, when the parameter "3. The number of representative index positions in meter" is "7", reception data is received in the following order.

First byte: Presence or absence of a selector switch to a macro shooting state
Second byte: Presence or absence of a focus limit switch
Third byte: The number of representative index positions in meter
Fourth to tenth bytes: Numeric values of representative indices in meter (where one index value is expressed by one byte)
Eleventh to seventeenth bytes: Normalized placement position information of representative indices on the distance bar in meter (where one index value is represented by one byte)

In this way, when the number of representative index positions is included in the contents of communication, it is possible to communicate data without any gap.

"4. Numeric values of representative indices (for the number of representative index positions) in meter" are "0.45", "0.6", "0.8", "1", "1.5", "3", and "5".

Then, for "5. Normalized placement position information of representative indices on the distance bar (for the number of representative index positions) in meter", values normalized relative to a predetermined range (length) of the distance bar (which is an example of a display range) to be displayed on the display section 2206 are communicated. The lens microcomputer 2111 has information indicating where the representative index positions are placed on the distance bar. For example, for information indicating whether the representative index position "0.6 m" is placed on the distance bar, a value normalized where the overall length of the distance bar is 100 is communicated. The predetermined range (length) that is a criterion may be prepared in advance by the camera microcomputer 2205 and the lens microcomputer 2111 or may be acquired through communication. The information carries values indicating that "0.45 m" is placed at a position "3" in normalized value from the close end, and "0.6 m" is placed at a position "15" in normalized value from the close end. The value "15" is a parameter indicating the length of 2813 shown in FIG. 24.

This display position information may be determined from the viewpoint of the specifications of the interchangeable lens 2100 and design. When, for example, the available shooting distance (shortest shooting distance) of the interchangeable lens 2100 is "0.45 m" and an index "5 m" is intended to be displayed before "∞" mark on the infinity side, position information of index values can be determined such that the index values are contained within a normalized value 100 in consideration of not only "0.45 m" to "5 m" but also how much a display space on the close side to "0.45 m" and from "5 m" to "∞ mark" is intended to be provided as a design.

For values in foot and values in macro magnification as well, similarly, normalized values are communicated.

Focusing on 3, 4, and 5, "3. The number of representative index positions in meter" is information corresponding to the number of indices. In addition, "4. Numeric values of representative indices (for the number of representative index positions) in meter" are information corresponding to numeric values to be displayed in correspondence with indices in number indicated by the information corresponding to the number of indices. In addition, "5. Normalized placement position information of representative indices on the distance bar (for the number of representative index positions) in meter" is information corresponding to positions where pieces of information corresponding to the above-described numeric values are displayed. In this way, a set includes information corresponding to the number of indices, information corresponding to numeric values to be displayed in correspondence with the indices in number indicated by the information corresponding to the number of indices, and information corresponding to positions where the pieces of information corresponding to the numeric values are displayed.

For 6, 7, and 8 as well, information of the above set in foot that has a system of unit different from meter is provided.

For 9, 10, and 11 as well, information of the above set in macro magnification that has a system of unit different from meter or foot is provided.

In this way, for different information depending on a system of unit, information is provided for each system of unit.

For "12. Normalized placement position information of "∞" mark" on the distance bar, that is, the placement position of "∞" mark in FIG. 24, the placement position on the distance bar is the same in any of meter, foot, and macro magnification. Therefore, one common value may be used as a parameter.

The above-described parameters are not dynamically changed, so communication is performed at the time of startup of the camera main body 2200 to which the interchangeable lens 2100 is attached (which may be the timing at which the interchangeable lens 2100 is attached in a state where the camera is in operation). In S2004, an inquiry about the data size of communication data of the static display information is provided to the interchangeable lens 2100. This is because the number of representative indices varies according to the specifications of the interchangeable lens and a communication size is to be determined in advance to perform communication of all the pieces of static display information in the communication mode M3 of which the effective communication rate is relatively high.

In S2023, the lens microcomputer 2111 generates static display information to be displayed on the display section 2206 of the camera main body 2200 and transmits the data size to the camera microcomputer 2205 as a reply.

In S2005 and S2024, for the purpose of acquiring the above-described pieces of static display information at once at high speed, the communication mode is switched to the communication mode M3 of which the effective communication rate is the highest, described with reference to FIG. 21. The communication mode M3 switches the data communication direction of the communication terminals, so the direction of an internal buffer is switched in turns such that no collision of data communication occurs. Therefore, a process of switching the communication mode is needed. The switching process takes a certain processing time; however, a communication time may be reduced when a communication amount is large to some extent. Paradoxically, when the communication mode M3 is used in the case where the communication amount is small, a process of switching the communication mode becomes an overhead, with the result that a communication processing time extends. Since current static display information has a large data size to some extent, it is possible to reduce communication time by using the communication mode M3.

In S2006, the camera microcomputer 2205 communicates a request command to acquire the above-described static display information. The lens microcomputer 2111 having received the communication command executes in S2025 a process of normalizing the static display information, generated in S2023, to be displayed on the camera display section 2206. The normalizing process may be executed in, for example, a time during which, after the camera microcomputer 2205 asserts an RTS signal in FIG. 21, before DLC data is transmitted. Alternatively, the normalizing process may be executed at the same time with the data generation process of S2023.

In S2026, data obtained by performing the process of normalizing the above-described static display information is communicated to the camera microcomputer 2205 through the DLC communication channel, and the camera microcomputer 2205 receives the data in S2007.

In S2008 and S2027, the camera microcomputer 2205 and the lens microcomputer 2111 return to the communication mode M2. This is because, in the processes of S2006, S2007, S2025, and S2026, the camera microcomputer 2205 completes communication of mass data (for example, the above-described items 1. to 13.) needed to display static lens information that do not dynamically change.

In S2009, the camera microcomputer 2205 transfers the above-described normalized static display information to a block (not shown) that controls the camera display section 2206.

In S2010, it is determined whether display of distance information is enabled in settings of a camera menu. When the display setting is disabled, it is not necessary to display distance information until the menu is reset to "enable display setting", so the camera microcomputer 2205 shifts into a steady state. When the display setting is enabled in the menu, the camera microcomputer 2205 proceeds to a process of communicating and displaying dynamically changed object distance information in S2011 and the subsequent steps.

Here, dynamic display information needed to display object distance information will be described.

The dynamic display information is information needed to change the display state according to the states and the like of the operating members of the camera main body 2200 or the interchangeable lens 2100. In the present embodiment, the dynamic display information includes, for example, parameters as follows.

Information Related to Whether to Display
1. Whether object distance information is shown or hidden Information Corresponding to Positions
2. Normalized position information of a current object distance on the distance bar
3. Normalized position information of a focus limit on the infinite end side on the distance bar
4. Normalized position information of a focus limit on the close end side on the distance bar
5. Normalized position information of a macro range on the distance bar Initially, "Information related to whether to display" will be described. For example, notification of the information "1. Whether object distance information is shown or hidden" is provided from the lens microcomputer 2111 to the camera microcomputer 2205 when this display function is intended to be hidden. When it is intended to avoid showing strange display to a user in the case where there occurs an irregular state, for example, the drive of the focus lens of the interchangeable lens 2100 is out of synchronization, "hidden" is communicated from the lens microcomputer 2111 to the camera microcomputer 2205. As another embodiment, not "hidden" but "update from the last display status is stopped" may be used. The "information related to whether to display" may be configured to further include "whether to show or hide information related to the drive status of the focus lens". By communicating this information, it is possible to display the icons 2811, 2812 representing the drive directions of the focus lens 2104. At this time, where necessary, information related to the drive direction of the focus lens may be transmitted together from the lens microcomputer 2111 to the camera microcomputer 2205. Alternatively, "whether to show or hide information related to the drive status of the focus lens in the infinity direction" and "whether to show or hide information related to the drive status of the focus lens in the close direction" may be transmitted as different pieces of information. In the case where the above-described re-drive is being performed, when an additional icon is configured to be displayed, "whether to show or hide the icon related to re-drive" may be transmitted from the lens microcomputer 2111 to the camera microcomputer 2205.

Next, the "information corresponding to positions" will be described. "2. Normalized position information of a current object distance on the distance bar" is a parameter indicating a display position normalized relative to the overall length of the distance bar in FIG. 24, and corresponds to 2814. The lens microcomputer 2111 is capable of acquiring the absolute position information of a focus pulse from output information of the focus position detection sensor 140 and calculates a current focus pulse position as a normalized value from position information from the close side to infinity side of a pulse encoder.

"3. Normalized position information of a focus limit on the infinite end side on the distance bar" is a parameter indicating a display position normalized relative to the overall length of the distance bar in FIG. 24, and corresponds to 2815.

In S2011, the camera microcomputer 2205 communicates a request command to the lens microcomputer 2111 to acquire the above-described dynamically changed display information.

In S2028, the lens microcomputer 2111 generates the above-described dynamically changed display information, executes a normalizing process, and transmits the display information back to the camera microcomputer 2205 as a communication result in S2029. The camera microcomputer 2205 receives this transmitted result in S2012.

In S2013, as information for initial display of object distance information, the dynamically changed display information acquired in S2012 is transferred to the camera display section 2206.

Here, the reason why the static display information is communicated in the communication mode M3 and the dynamic display information is communicated in the communication mode M2 will be described.

Communication and display processes at startup are implemented by the above-described process, and an initial display state as in the case of the example shown in FIG. 24 is implemented.

<Steady Operation Process>

Next, a display update process for object distance information when the camera is in a steady state will be described by using the flowcharts of FIG. 27A and FIG. 27B.

FIG. 27A illustrates flowcharts for explaining the processes of the camera main body 2200 and the interchangeable lens 2100 related to display of object distance information. This process is executed by a program recorded in the camera microcomputer 2205. A process of displaying the information will be described in processes of both a lens communication processing section that communicates with the interchangeable lens 2100 and a camera display processing section that executes a display process.

Initially, the process of the camera display processing section will be described.

Figure 26:
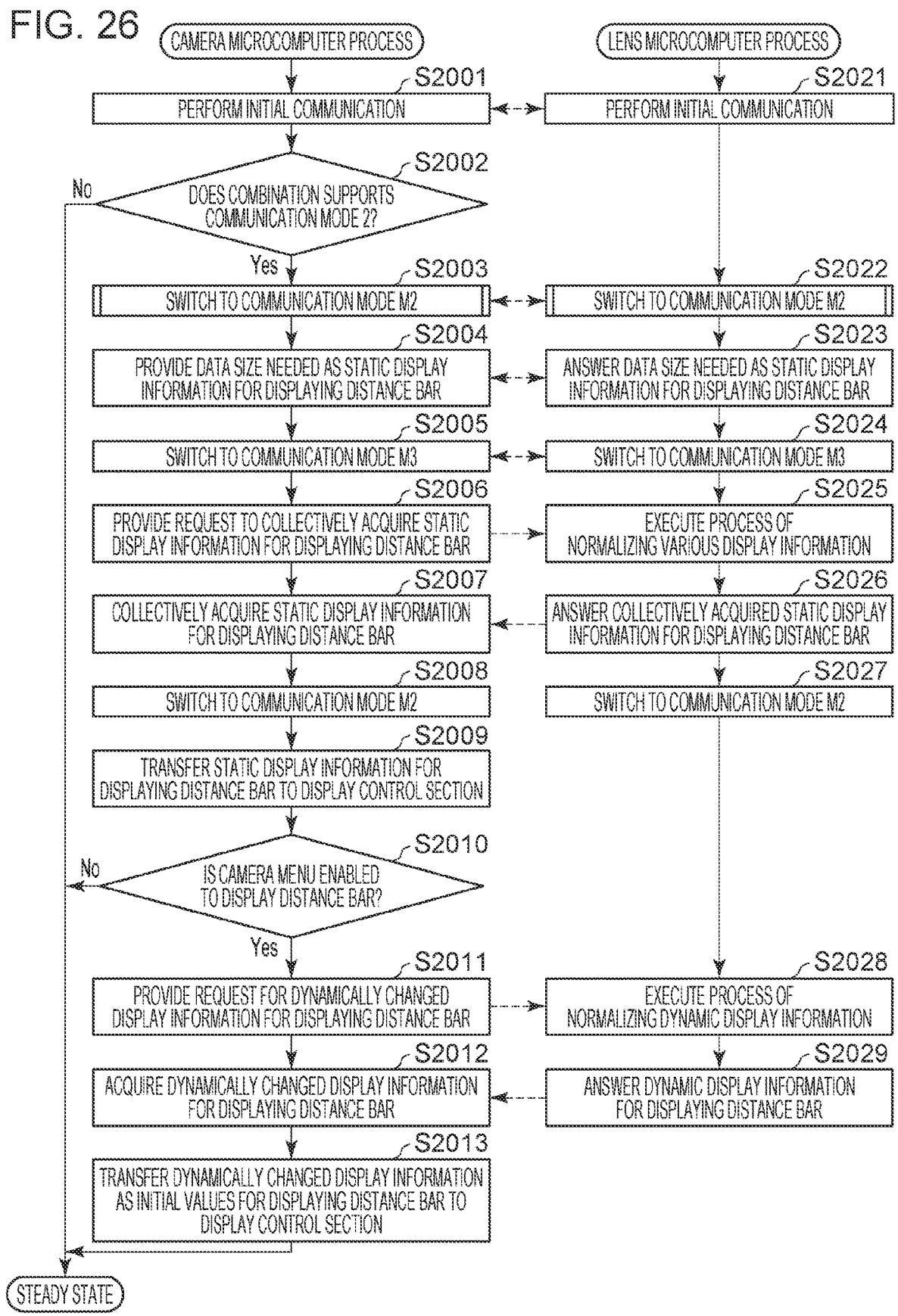
FIG. 26 is a flowchart illustrating a process associated with a startup operation of the image capturing apparatus and the accessory apparatus.
Figure 27B:
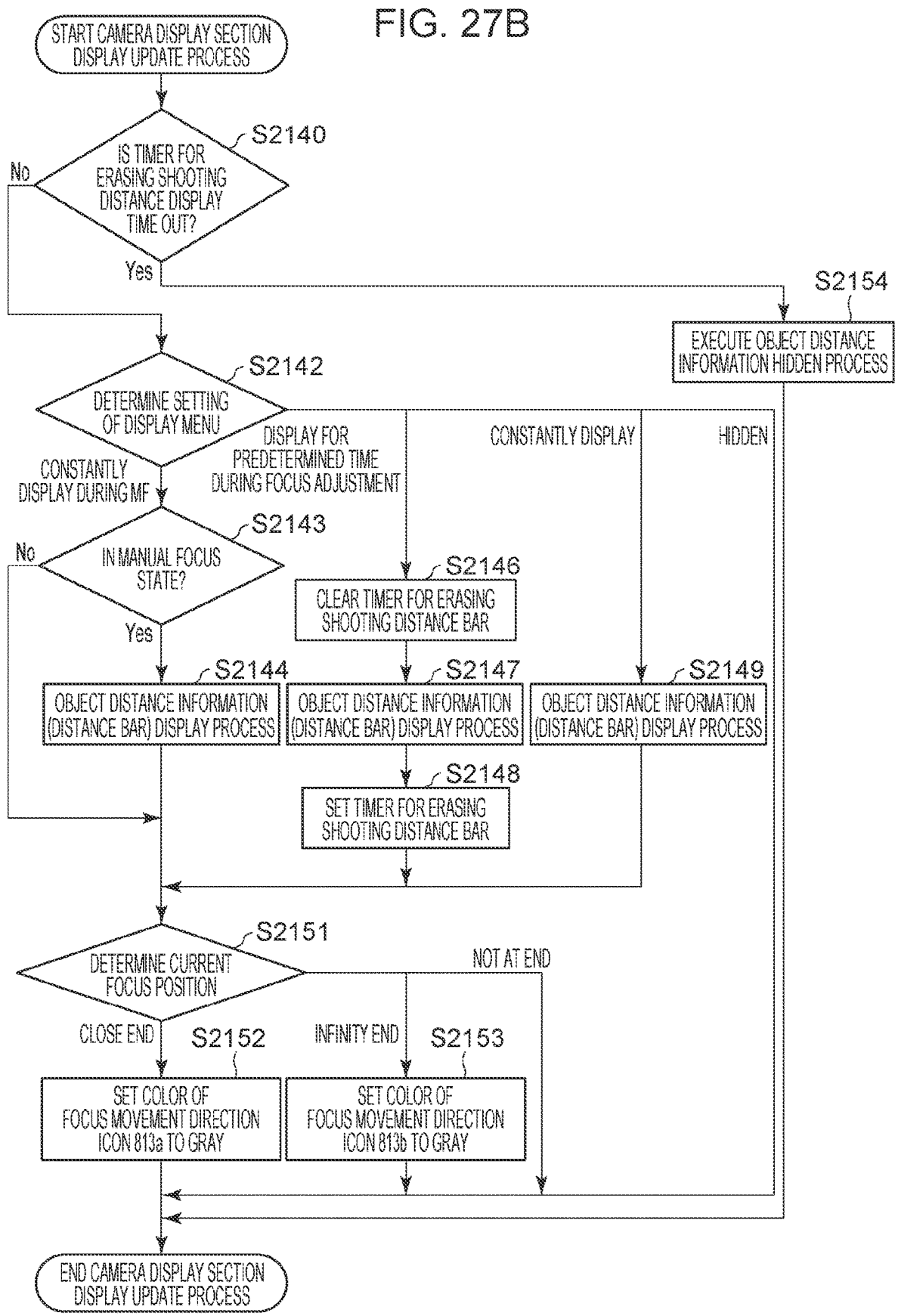
FIG. 27B is a flowchart illustrating a process of updating a screen by a camera display section 2206.

In S2301 and S2121, as described in the startup process of FIG. 26, static display information and dynamic display information as an initial value of display from the interchangeable lens are transferred from the lens communication processing section to the camera display processing section.

In S2302, the camera display processing section determines whether the menu status of the camera is "set to show" or "set to hide" object distance information. In the case of "set to hide", the display process is not executed, so the process waits until the menu setting is changed. In the case of "set to show", the process proceeds to S2303.

In S2303, the static display information and the dynamic display information as initial values, acquired from the lens communication control section in S2301, are displayed on the display section 2206. The representative index values 2806 and current object distance position 2809 of the display information are relative positions where the overall length of the shooting distance bar is 100. More specifically, when the display position of the representative index value "0.8" of the shooting distance is "20", the representative index value "0.8" is displayed at the position of 100 pix relative to the overall length 500 pix of the shooting distance bar.

In S2304, display settings are checked again for whether to update display of the dynamic display information as a subsequent process. After a display update process of S2307 (described later) is executed, it is determined in this step whether to continue the display update process.

In S2305, it is determined whether notification to clear the static and dynamic display information is provided from the lens communication control section. When notification to clear display is provided, the display state of the display section 2206 is cleared in S2306, and the process waits until transfer of static display information from the lens communication control section is performed again in S2308. When no notification to clear display is provided, the process proceeds to the display update process of S2307. The process will be described with reference to the sub-routine of FIG. 27B (described later).

Next, the process of the communication control section 2110 of the interchangeable lens 2100 will be described.

In S2121, the static display information and the dynamic display information as initial values are transferred to the camera display section.

In S2122, it is determined whether the interchangeable lens 2100 is detached. When the interchangeable lens 2100 is detached, notification to clear the static and dynamic display information is transferred to the camera display section. This is because it is necessary to hide display on the camera display section 2206 at the time of detaching the lens and then, when another interchangeable lens 2100 is attached, perform display according to the specifications of the attached interchangeable lens 2100.

In S2124, the process waits until the camera microcomputer 2205 identifies the lens attached state through the communication interface circuit 2208.

In S2125, an initial communication process between the camera microcomputer 2205 and the lens microcomputer 2111, described with reference to FIG. 26, is executed. Static display information and dynamic display information as an initial value corresponding to the specifications of the interchangeable lens 2100 are acquired through the process, and a process for display is executed again from S2121.

The process proceeds to S2126 when the lens is continuously attached in S2122, and it is determined whether it is necessary to update the object distance information of the interchangeable lens 2100. When, for example, the distance bar showing an object distance is hidden during displaying a menu, the determination is negative, and the process proceeds to S2128. When it is determined that update of display is necessary, the process proceeds to S2127, and a process of acquiring dynamic display information from the interchangeable lens 2100 and transmitting the dynamic display information to the camera display section is performed. When update of display is not necessary, the process proceeds to S2128, and a communication process with the interchangeable lens 2100 is not executed.

Here, the communication process in S2127 and S2128 will be described with reference to the timing chart of the communication process of FIG. 28.

Figure 28:
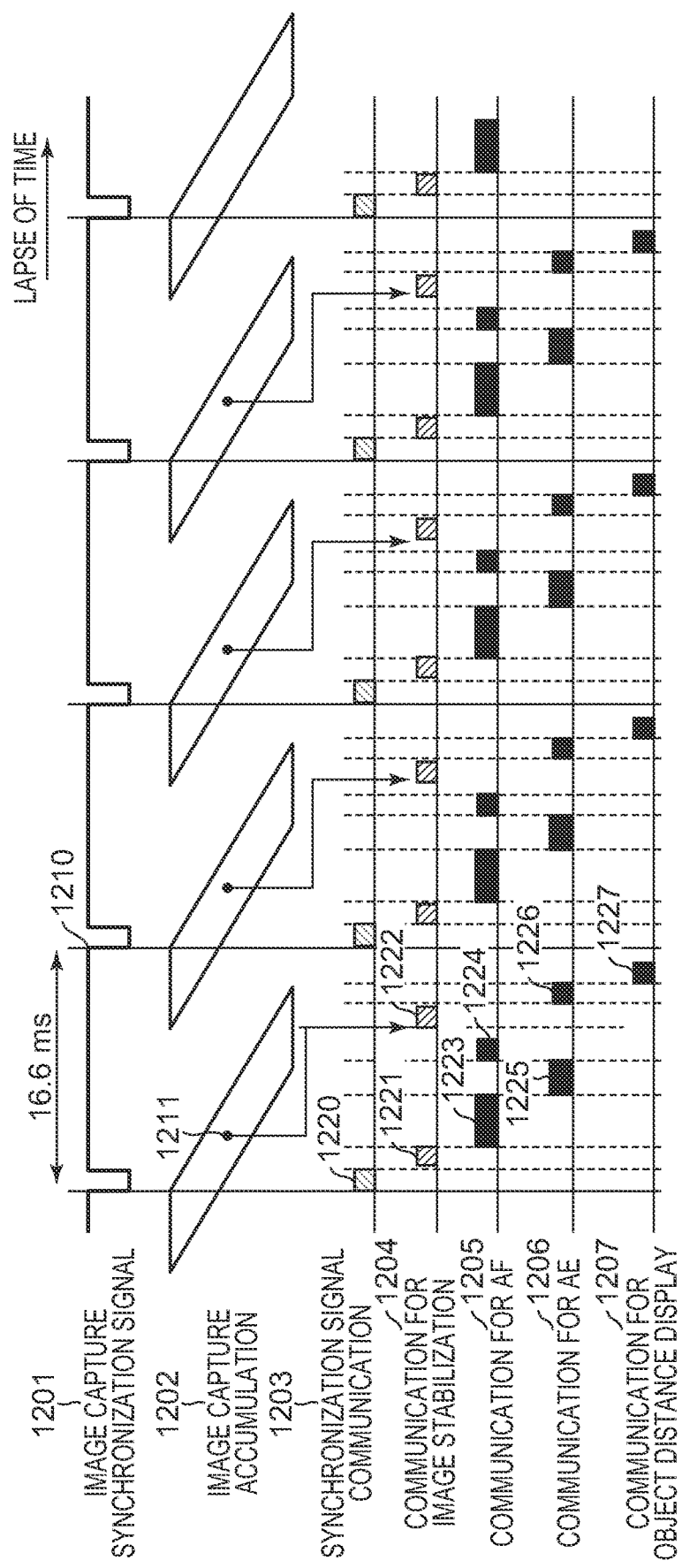
FIG. 28 is a timing chart illustrating a communication status in a steady state of the image capturing apparatus and the accessory apparatus.

FIG. 28 is a timing chart of the lens communication process executed between the camera microcomputer 2205 and the lens microcomputer 2111, in which the abscissa axis represents time lapse direction, and the ordinate axis represents communication items. Here, communication control during live view is illustrated as an example; however, it may be applied during finder shooting.

1201 denotes an image capture synchronization signal and indicates the timing to start accumulation control of an image sensor of 1202. The image capture synchronization signal is generated at a cycle corresponding to a frame rate. In, for example, 60 fps control, the image capture synchronization signal is input to the camera microcomputer 2205 as a vertical synchronization signal of 1210 at a cycle of 16.6 ms. 1211 indicates the barycentric timing of accumulation control of the image sensor.

1203 denotes synchronization signal communication for sharing exposure timing between the camera main body 2200 and the interchangeable lens 2100, and performs communication by using the vertical synchronization signal of 1210 as a trigger. Processes indicated by diagonal lines among the processes shown in FIG. 28 indicates communication processes on which timing constraints are placed. When the synchronization signal communication process 1220 delays, it causes a time lag of recognition of exposure timing between the camera microcomputer 2205 and the lens microcomputer 2111, so communication needs to be performed under predetermined timing constraints. Communication for displaying object distance information, implemented in the present embodiment, needs to be performed so as not to influence such a communication process on which timing constraints are placed.

1204 denotes a communication process for vibration control function, in which the camera microcomputer 2205 and the lens microcomputer 2111 operate in cooperation with each other, and an example in which two communications 1221, 1222 are performed in, for example, one frame is shown. Timing constraints that communication of 1222 is performed within a predetermined timing from the barycentric timing 1211 of accumulation control of the image capturing sensor as a starting point are occurring.

1205 denotes a communication process for AF control. For example, 1223 is communication to acquire parameters for correcting an out-of-focus amount and current state information of the focus lens from the interchangeable lens 2100. For example, 1224 is communication to provide a request from the camera microcomputer 2205 to the lens microcomputer 2111 to drive the focus ring for focusing.

1206 is a communication process for AE control, and, for example, 1225 is communication to acquire current optical information of an aperture diameter value and the like to be used for exposure control from the interchangeable lens 2100. 1226 is communication to provide a request from the camera microcomputer 2205 to the lens microcomputer 2111 to drive the diaphragm.

1207 is a data communication process for displaying an object distance and is communication to acquire the above-described dynamically changed display information from the interchangeable lens 2100. It is ideal that all the communication processes are executed within one frame as shown in FIG. 28; however, when there is no allowance in a communication band, scheduling to, for example, perform data communication for AE every two frames is performed. In the present embodiment, an example in which dynamic display information is periodically communicated is described; however, the configuration is not limited as long as, when dynamic display information changes, display based on the change can be performed. For example, the lens microcomputer 2111 detects a change of dynamic display information, and the lens microcomputer 2111 provides notification to the camera microcomputer 2205 in response to the detection that the change is detected. Thus, dynamic display information may be communicated only when necessary.

Next, the display update process of the camera display section in S2307 will be described with reference to FIG. 27B.

In S2140, it is determined whether it is in a time-out situation in cases where the display state of object distance display is hidden by a timer. This mode will be described later in S2146. When display is maintained as a determination result as to whether to maintain display in accordance whether it is time out, the process proceeds to S2142; whereas, when it is determined to hide the display, the process proceeds to S2154.

In S2142, a setting status of a display menu as to how information display is performed is determined. In the present embodiment, a display pattern of shooting distance information can be set through a menu from among "constant display during MF", "display for a predetermined time during focus adjustment", "constant display", and "hidden". When the display setting of the menu is "constant display during MF", the process proceeds to S2143. When the display setting of the menu is "display for a predetermined time during focus adjustment", the process proceeds to S2146. When the display setting of the menu is "constant display", the process proceeds to S2149. When the display setting of the menu is "hidden", the process proceeds to S2145.

In S2143, the camera microcomputer 2205 determines the status of the lens focus switch on the lens barrel, provided as notification from the interchangeable lens 2100, as the state of any one of autofocus (AF) and manual focus (MF). As another embodiment, when the AF state and the MF state are switched by a camera menu, the set state of the menu may be checked. In the case of AF, the process proceeds to S2151; whereas, in the case of MF, the process proceeds to S2144.

In S2144, the camera microcomputer 2205 executes a display update process of object distance information (distance bar information) on the display section 2206 in accordance with the latest dynamic display information.

In S2146, the camera microcomputer 2205 clears a timer for erasing object distance bar display.

S2147 is a similar process to S2144.

In S2148, the camera microcomputer 2205 sets a timer for erasing object distance information to hide the distance bar for object distance information after a predetermined time.

The process proceeds to S2149 when the menu setting of S2142 is allocated to "constant display", and the details of the process are similar to the process of S2144.

In S2151, when the display setting of the menu is a setting other than "hidden", a determination is performed to provide notification to a user that the focus is set at the close end or the infinity end.

More specifically, "Normalized position information of the current object distance on the distance bar" included in the dynamic display information is evaluated. When the position information indicates a close end position, the process proceeds to S2152. When the position information indicates an infinity end position, the process proceeds to S2153. When the position information is neither the close end nor the infinity end, the process proceeds to S2145.

In S2152, the camera microcomputer 2205 sets the color of a focus movement direction icon 2812a to gray. Thus, a user recognizes that the focus does not change even when the focus ring is turned to the close side further during manual focus operation.

In S2153, the camera microcomputer 2205 sets the color of a focus movement direction icon 2812b to gray. Thus, a user recognizes that the focus does not change even when the focus ring is turned to the ∞ side during manual focus operation.

The process proceeds to S2154 when it is determined in S2140 that the display state of object distance information is hidden by the timer, and display of various object distance information described in FIG. 24 is hidden.

With the communication method between the image capturing apparatus and the accessory apparatus and the display process of the image capturing apparatus as described above, information related to object distance information to be displayed on the image capturing apparatus is transferred to the image capturing apparatus through communication as numeric values normalized from positions to be displayed. Thus, even when an accessory apparatus with different specifications is attached to any image capturing apparatus, it is possible to cause the image capturing apparatus to perform optimal display.

Data related to scale display for displaying object distance information is obtained at the time when the accessory apparatus is attached, and then, in a steady state, only dynamically changed object distance information of the accessory apparatus is acquired, with the result that communication load is minimized Thus, the influence on various control such as AF, AE, and vibration control is reduced, and communication for displaying an object is able to be acquired at high frequency like, for example, every vertical signal timing. Therefore, it is possible to perform various drive control and implement display of object distance information without a delay of display.

Fifth Embodiment

The fourth embodiment describes a case where object distance information detected by the lens microcomputer 2111 is displayed on the display section 2206 of the camera main body 2200 and, in addition, a case where macro magnification information and depth-of-field information are displayed. The present embodiment describes a case where the camera microcomputer 2205 acquires, through communication, camera shake state information detected by the lens microcomputer from the shake sensor of the vibration gyro, and displays the camera shake state information on the display section 2206.

Various configurations, startup process, and communication process in a steady state of the camera main body 2200 and the interchangeable lens 2100 are similar to those of the fourth embodiment, so the description is omitted.

For display of camera shake information implemented in the present embodiment, items to be communicated as static display information and dynamic display information described in the fourth embodiment and control related to display are different, so the description will be made in terms of this point.

In the present embodiment, in addition to the static display information described in the fourth embodiment, the lens microcomputer 2111 transmits the following information to the camera microcomputer 2205 as static display information for displaying a camera shake status.

1. Whether Vibration Gyro is Installed in Interchangeable Lens 2100

In other words, the camera microcomputer 2205 transmits, to the lens microcomputer 2111, information indicating that a function of detecting a camera shake status is provided as information corresponding to the presence or absence of a function.

Then, in the present embodiment, information acquired as dynamic display information is switched according to a target to be displayed. When the target to be displayed is a camera shake status, the lens microcomputer 2111 transmits the following information to the camera microcomputer 2205 as dynamic display information.

1. Vibration detection value of vibration gyro in pitch direction
2. Vibration detection value of vibration gyro in yaw direction In other words, the lens microcomputer 2111 transmits, to the camera microcomputer 2205, a detection value detected as a result of detection of a camera shake status. On the other hand, when the target to be displayed is not a camera shake status, the lens microcomputer 2111 transmits, to the camera microcomputer 2205, the static display information described in the fourth embodiment.

Figure 29:
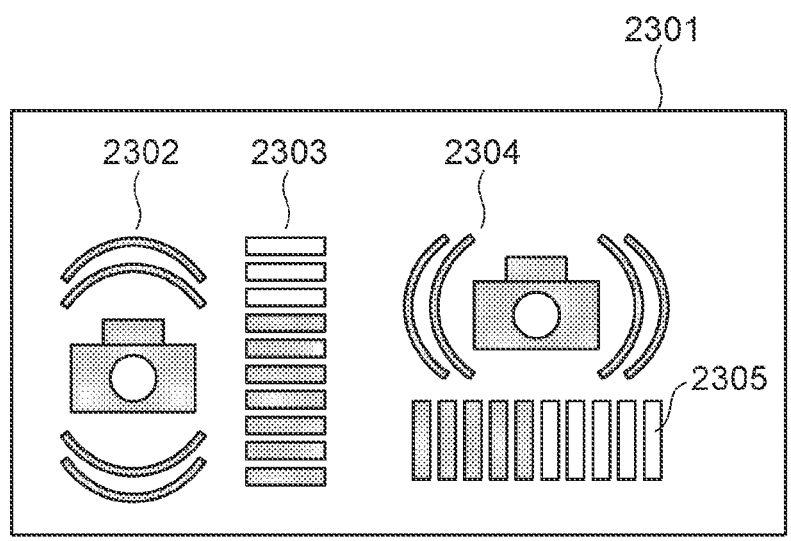
FIG. 29 is a view illustrating an example of a screen displaying a camera shake status in a fifth embodiment.

Initially, the contents of display of the camera shake status will be described with reference to FIG. 29.

2301 indicates an example in which a detection status of current camera shake amount. In the information display, the camera microcomputer 2205 acquires, through the communication, camera shake state information detected by the shake sensor of the vibration gyro of the interchangeable lens 2100, and displays the camera shake state information on the display section 2206. 2302 denotes a vibration status in the pitch direction and indicates a vibration level by a gauge of 2303. Similarly, 2304 denotes a vibration status in the yaw direction and indicates a vibration level by 1305.

Next, a control flow for display will be described.

Figure 30:
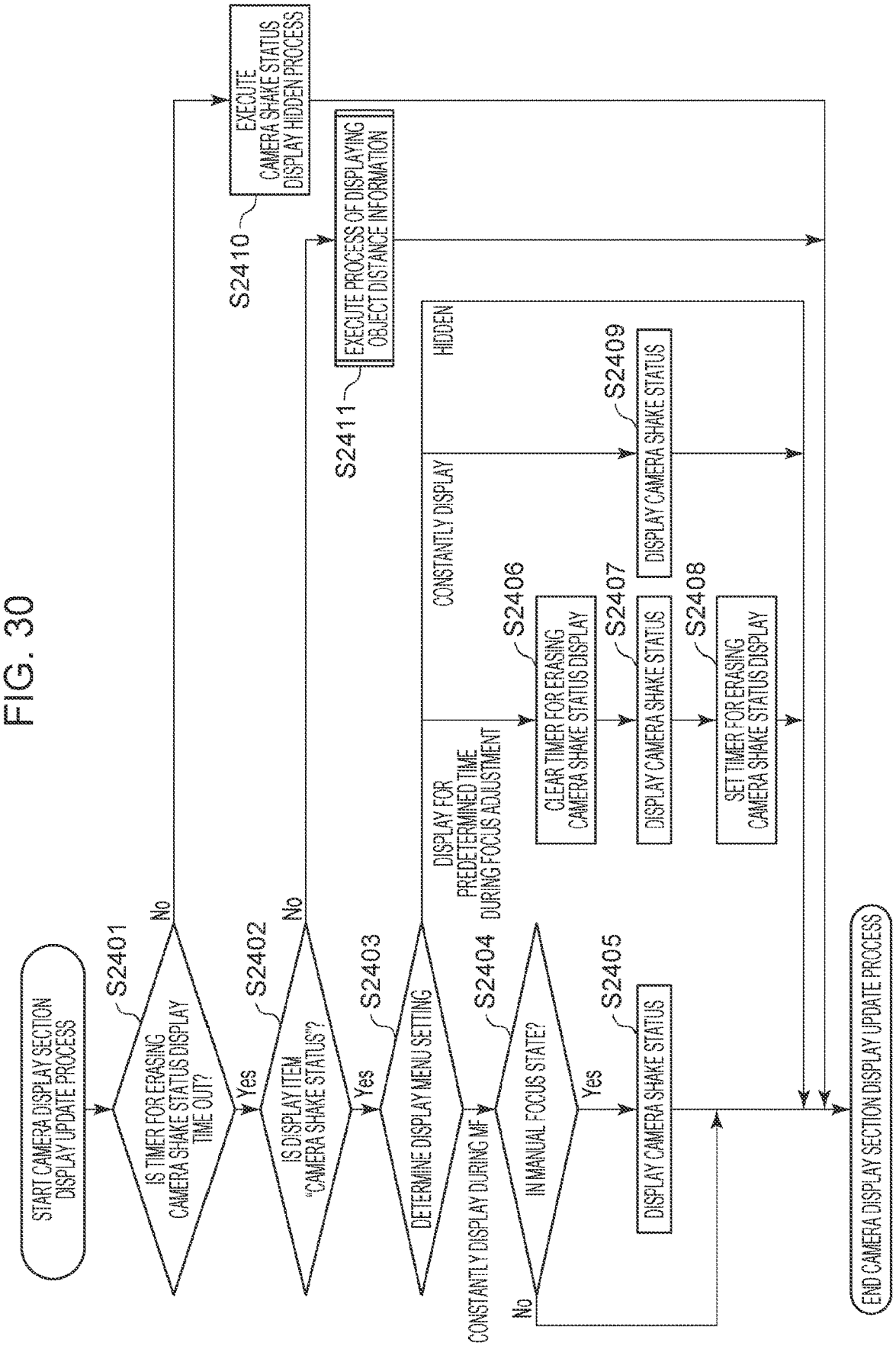
FIG. 30 is a flowchart illustrating a display process for displaying a camera shake status in the fifth embodiment.

The flow at startup, described with reference to FIG. 26, steps, other than S2127, in the communication process with the interchangeable lens 2100 and steps, other than S2307, in the flow of the camera display section, described with reference to FIG. 27, are similar to those of the fourth embodiment, so the description is omitted. A sub-routine process of the display update process S2307 of the camera display section will be described with reference to FIG. 30.

When the sub-routine of S2307 is started, it is determined in S2401 whether it is time out in a case where a camera shake status display state is hidden by a timer. This mode will be described later in S2406.

In S2402, it is determined whether a target to be displayed on the display section is "camera shake status" in the menu setting of the camera. When the display menu of "camera shake status" is set, the set status of the display menu as to how information display is performed is further determined in S2403. As in the case of the fourth embodiment, the set status of the display menu can be set through a menu from among "constant display during MF", "display for a predetermined time during focus adjustment", "constant display", and "hidden".

When the display setting of the menu is "constant display during MF", the process proceeds to S2404. When the display setting of the menu is "display for a predetermined time during focus adjustment", the process proceeds to S2406. When the display setting of the menu is "constant display", the process proceeds to S2409. When the display setting of the menu is "hidden", the sub-routine ends.

In S2404, the camera microcomputer 2205 determines the status of the lens focus switch on the lens barrel, provided as notification from the interchangeable lens 2100, as the state of any one of AF and ME As another embodiment, when the AF state and the MF state are switched by a camera menu, the set state of the menu may be checked. In the case of AF, the sub-routine ends. In the case of MF, the camera shake status is displayed in S2405.

In S2406, the camera microcomputer 2205 clears a timer for erasing a camera shake status.

S2407 is a similar process to S2405.

In S2408, the camera microcomputer 2205 sets a timer for erasing a camera shake status to hide the camera shake status after a predetermined time.

The process proceeds to S2409 when the menu setting of S2403 is allocated to "constant display", and the details of the process are similar to the process of S2405.

When the camera shake status display timer is time out in S2401, the camera shake status display is hidden in S2410.

When the display item is not "camera shake status" in S2402, the process in S2411 proceeds to the process of displaying object distance information, described in the fourth embodiment.

Figure 31:
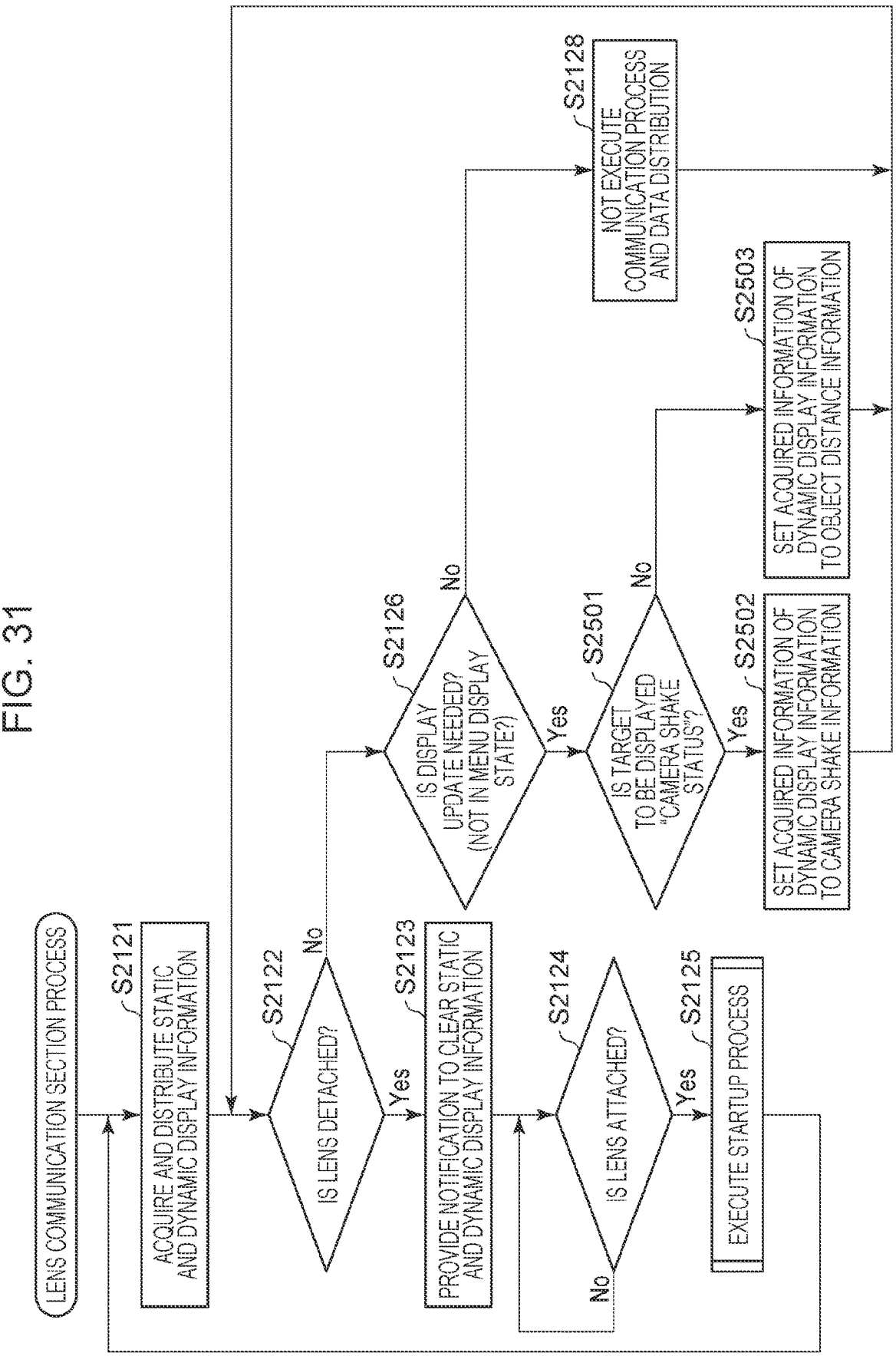
FIG. 31 is a flowchart illustrating a lens communication process for displaying a camera shake status in the fifth embodiment.

Next, the lens communication process in the present embodiment will be described with reference to FIG. 31. However, as described above, the lens communication process other than S2127 is similar to that of the fourth embodiment.

When it is determined in S2126 that it is in a camera state that needs display update, the process proceeds to S2501.

In S2501, it is determined whether a target to be displayed in the menu of the camera is "camera shake status". When the target to be displayed is "camera shake status", the dynamic display information acquired from the lens microcomputer 2111 is set to the following values needed to display "camera shake status" in S2502.
  1. Vibration detection value of vibration gyro in pitch direction
  2. Vibration detection value of vibration gyro in yaw direction When the target to be displayed is not "camera shake status" but "object distance information", the following information needed to display object distance information, described in the fourth embodiment, is set to be acquired from the lens microcomputer 2111 in S2503.
  1. Whether object distance information is shown or hidden
  2. Normalized position information of a current object distance on the distance bar
  3. Normalized position information of an infinity-end focus limit on the distance bar
  4. Normalized position information of a close-end focus limit on the distance bar
  5. Normalized position information of a macro range on the distance bar More specifically, a communication command for acquiring "camera shake status" and a communication command for acquiring "object distance information" each are prescribed and used according to a camera menu.

As described above, in the present embodiment, data related to scale display for displaying object distance information different for each specifications of the accessory apparatus and information needed to display a camera shake status are obtained at the time when the accessory apparatus is attached. In a steady state thereafter, dynamically changed object distance information of the accessory apparatus and information of a camera shake status are exclusively acquired. Thus, in a steady operation, only dynamically changed parameters needed for display is communicated, so it is possible to avoid delayed acquisition of display information from the accessory apparatus by reducing the amount of use of a communication band to minimize system load.

Sixth Embodiment

The fourth embodiment describes a case where object distance information detected by the lens microcomputer 2111 is displayed on the display section 2206 of the camera main body 2200 and, in addition, a case where macro magnification information and depth-of-field information are displayed. The present embodiment describes a case where, when the interchangeable lens 2100 is a zoom lens, the camera microcomputer 2205 acquires, through communication, information of a zoom position, and displays the information on the display section 2206.

Various configurations, startup process, and communication process in a steady state of the camera main body 2200 and the interchangeable lens 2100 are similar to those of the fourth embodiment, so the description is omitted. However, to display a zoom position, an additional item to be acquired arises as static display information.

In other words, in addition to the items described in the fourth embodiment, the lens microcomputer 2111 also transmits the following items to the camera microcomputer 2205.
  13. The number of representative index positions at the time of displaying a zoom position on the bar
  14. Numeric values of representative indices (for the number of representative index positions) at the time of displaying a zoom position on the bar
  15. Normalized placement position information of representative indices on the zoom bar (for the number of representative positions) at the time of displaying a zoom position on the bar In this way, static display information of the present embodiment includes "information related to display of indices" for a zoom position as well. In other words, the static display information of the present embodiment includes a set of information corresponding to the number of indices, information corresponding to numeric static display information to be displayed in correspondence with the indices in number indicated by the information corresponding to the number of indices, and information corresponding to positions where the pieces of information corresponding to the numeric values are displayed.

Then, in the present embodiment, information acquired as dynamic display information is switched according to a target to be displayed. When the target to be displayed is "zoom position", the lens microcomputer 2111 transmits the following information to the camera microcomputer 2205 as dynamic display information.

Normalized Position Information of Placement of a Current Zoom Position on the Zoom Bar at the Time of Displaying the Current Zoom Position on the Bar In other words, the lens microcomputer 2111 transmits information corresponding to a current position of the zoom lens to the camera microcomputer 2205 as "information corresponding to a position". On the other hand, when the target to be displayed is not a "zoom position", the lens microcomputer 2111 transmits, to the camera microcomputer 2205, the static display information described in the fourth embodiment.

Figure 32:
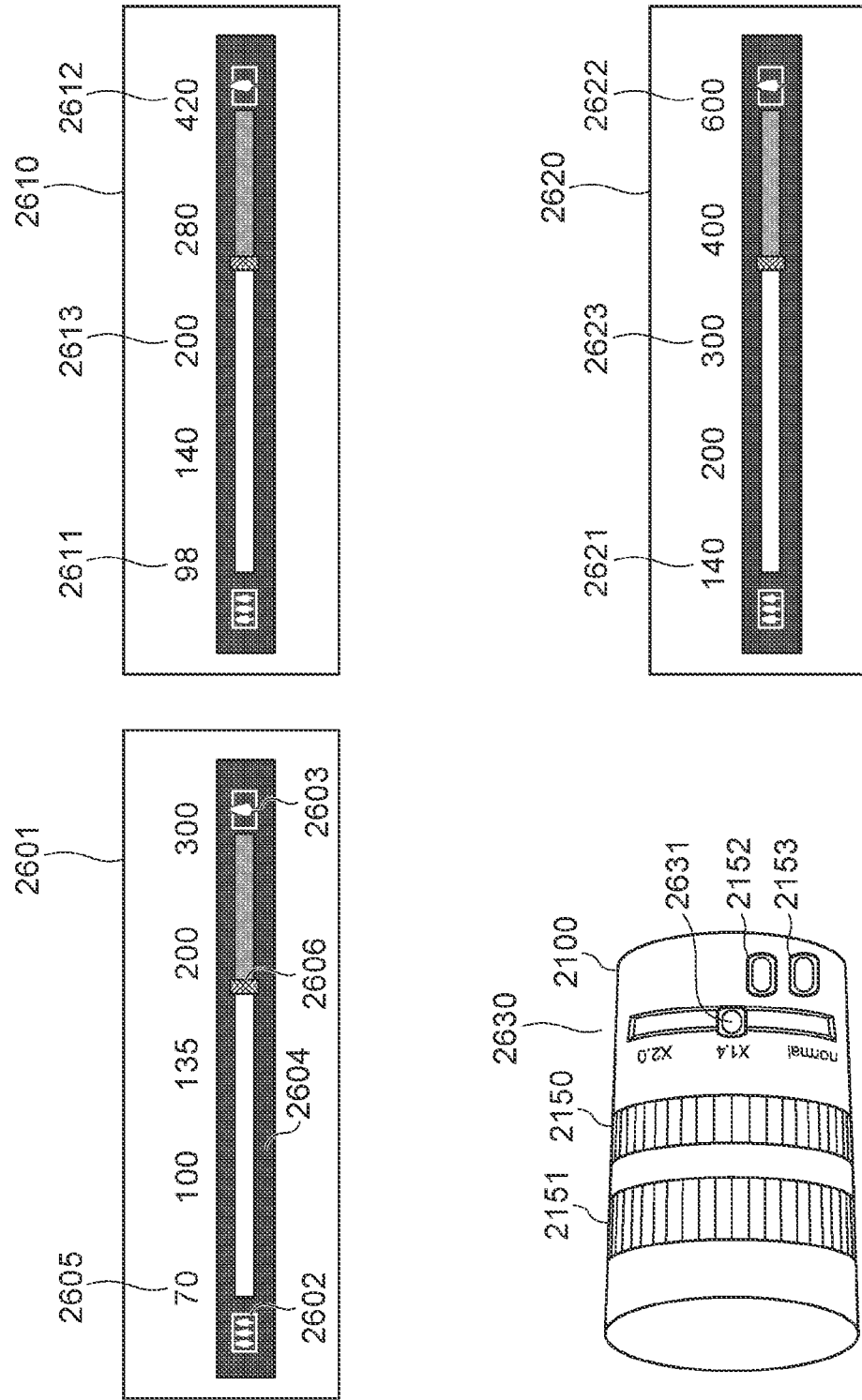
FIG. 32 is a view illustrating examples of a screen displaying zoom position information and various operating members of an interchangeable lens 2100 in a sixth embodiment.

Initially, the contents of display at the time of displaying a zoom position on the bar will be described with reference to FIG. 32.

2601 indicates an example in which a current zoom position is displayed. 2602 indicates a wide-side zoom direction, 2603 indicates a tele-side zoom direction, and all the range from a tele end to a wide end is displayed by bar indicated by 2604. 2605 represents focal length information as representative index values of a zoom position as in the case of display of object distance information, and this example of screen displayed shows a case of a lens with the specifications in which the focal length can be zoomed from 70 mm to 300 mm. What numeric values are displayed as these representative index values and which positions the numeric values are displayed are as in the case of object distance information of the fourth embodiment, and display is implemented by acquiring position information normalized relative to the zoom bar overall length from the interchangeable lens 2100. Information is, for example, such that "70 mm" is displayed at a position "3" relative to the zoom bar overall length and "135 mm" is displayed at a position "50" relative to the zoom bar overall length. 2606 indicates a current zoom position and is acquired from the lens microcomputer 2111 as normalized zoom position information, and the camera microcomputer 2205 displays the normalized zoom position information on the display section 2206.

<Control Flow for Display>

Next, a control flow for display will be described.

Figure 33:
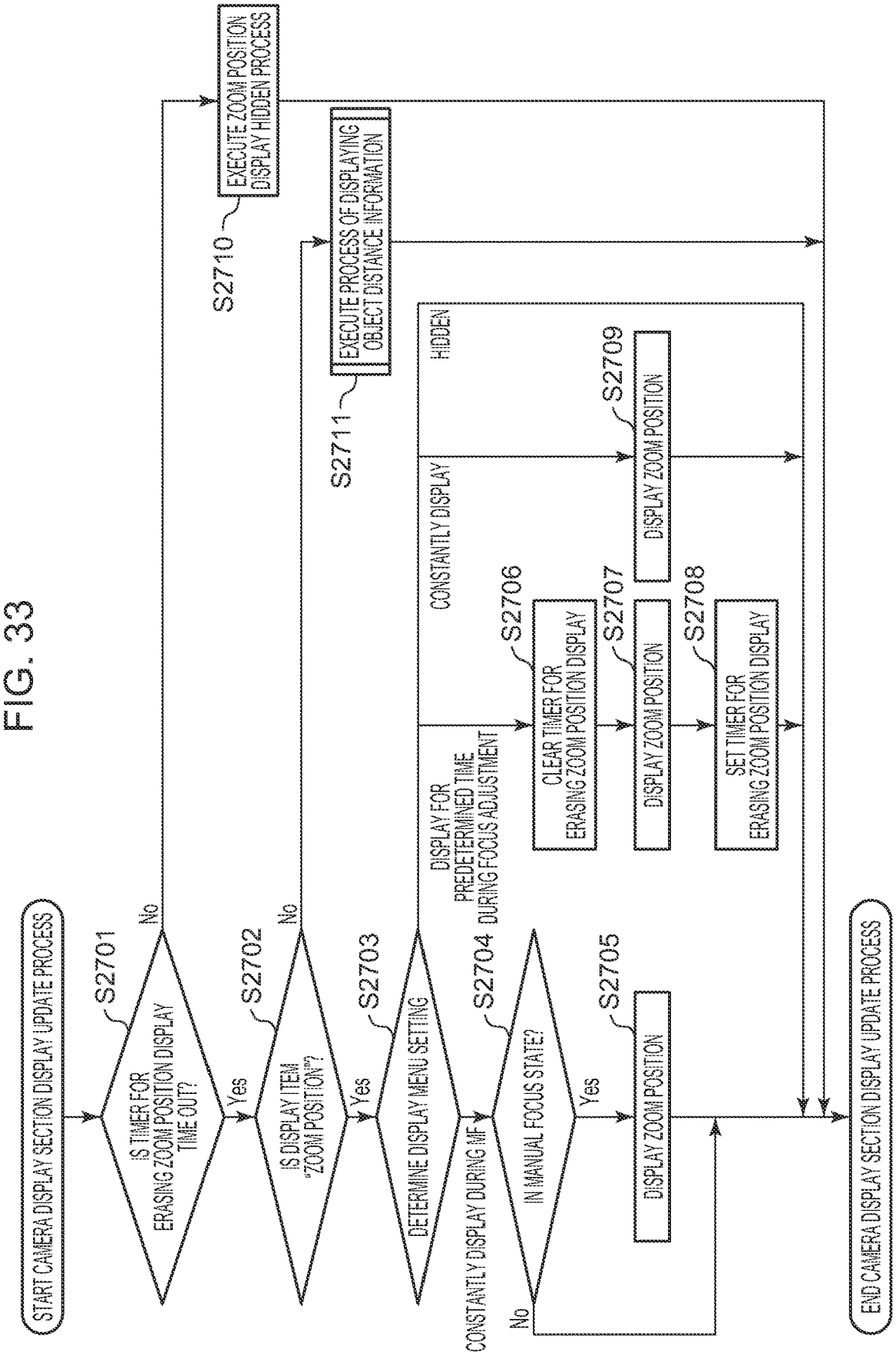
FIG. 33 is a flowchart illustrating a display process for displaying the zoom position information in the sixth embodiment.

The flow at startup, described with reference to FIG. 26, steps in the communication process with the interchangeable lens 2100 and steps, other than S2307, in the flow of the camera display section, described with reference to FIG. 27, are similar to those of the fourth embodiment, so the description is omitted. A sub-routine process of the display update process S2307 of the camera display section will be described with reference to FIG. 33.

When the sub-routine of S2307 is started, it is determined in S2701 whether it is time out in a case where a zoom position display state is hidden by a timer. This mode will be described later in S2706.

In S2702, it is determined whether a target to be displayed on the display section is "zoom position" in the menu setting of the camera. When the display menu of "zoom position" is set, the set status of the display menu as to how information display is performed is further determined in S2703. As in the case of the fourth embodiment, the set status of the display menu can be set through a menu from among "constant display during MF", "display for a predetermined time during focus adjustment", "constant display", and "hidden".

When the display setting of the menu is "constant display during MF", the process proceeds to S2704. When the display setting of the menu is "display for a predetermined time during focus adjustment", the process proceeds to S2706. When the display setting of the menu is "constant display", the process proceeds to S2709. When the display setting of the menu is "hidden", the sub-routine ends.

In S2704, the camera microcomputer 2205 determines whether the status of the lens focus switch on the lens barrel, provided as notification from the interchangeable lens 2100, as the state of any one of AF and MF. As another embodiment, when the AF state and the MF state are switched by a camera menu, the set state of the menu may be checked. In the case of AF, the sub-routine ends. In the case of MF, the zoom position information is displayed in S2705.

In S2706, the camera microcomputer 2205 clears a timer for erasing zoom position information.

S2707 is a similar process to S2705.

In S2708, the camera microcomputer 2205 sets a timer for erasing zoom position information to hide the zoom position information after a predetermined time.

The process proceeds to S2709 when the menu setting of S2703 is allocated to "constant display", and the details of the process are similar to the process of S2705.

When the zoom position information display timer is time out in S2701, the zoom position information display is hidden in S2710.

When the display item is not "zoom position" in S2702, the process in S2711 proceeds to the process of displaying object distance information, described in the fourth embodiment.

Figure 34:
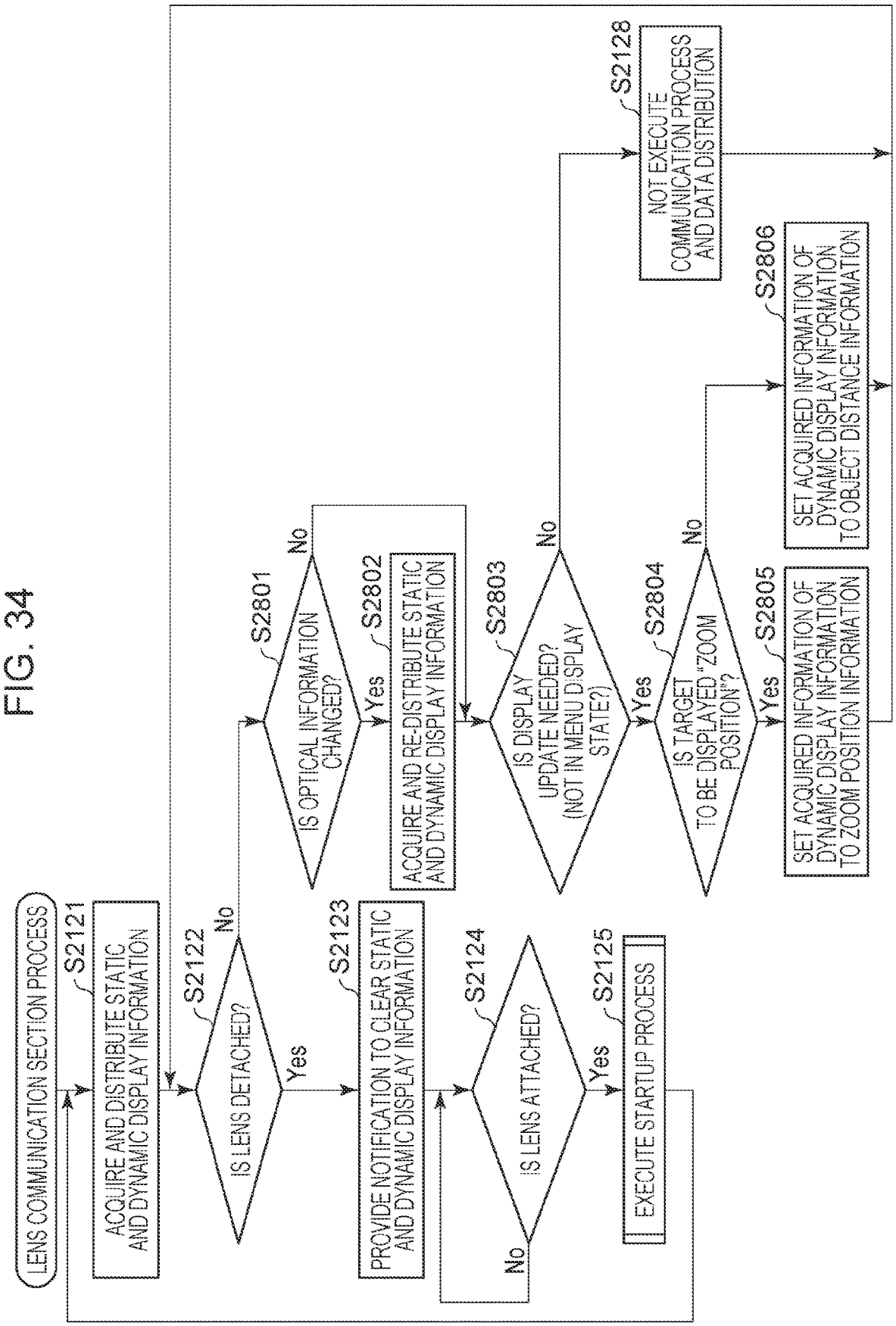
FIG. 34 is a flowchart illustrating a lens communication process for displaying zoom position information in the sixth embodiment.

Next, the lens communication process in the present embodiment will be described with reference to FIG. 34. However, as described above, the process from S2121 to S2125 is similar to that of the fourth embodiment.

When the interchangeable lens 2100 is continuously attached to the camera main body 2200 in S2122, the process proceeds to S2801.

In S2801, it is determined whether the optical information of the mounted lens is changed. When an intermediate accessory is mounted between the interchangeable lens 2100 and the camera main body 2200, the optical information of the lens may change. For example, in some models, an extender is built in the interchangeable lens 2100. When the built-in extender is enabled, the optical information of the interchangeable lens such as focal length is changed. For example, the appearance of an example of a product mode of the interchangeable lens 2100 is shown by 2630. Various operating members 2150 to 2153 in the drawing are similar to those of the fourth embodiment. An operating member 1631 is an operating member with which the extender built in the interchangeable lens 2100 is switched. A selector switch is enabled to select from among three states, that is, "no extender", "1.4× extender enabled", and "2.0× extender enabled".

When the optical information changes due to, for example, a change in the attached state of the extender or the like as described above, information already acquired for static display at the time of attaching the lens or at startup in a lens attached state also needs to be updated.

Therefore, when it is determined in S2801 that the optical information is changed, static display information and dynamic display information as initial values are acquired from the interchangeable lens 2100 and distributed to the display section again in S2802.

When it is determined in S2803 that it is in a camera state that needs display update, the process proceeds to S2804.

In S2804, it is determined whether a target to be displayed in the menu of the camera is "zoom position". When the target to be displayed is "zoom position", the dynamic display information acquired from the lens microcomputer 2111 is set to normalized placement position information of a current zoom position on a zoom bar at the time of displaying the current zoom position on the bar, needed to display "zoom position" in S2805. When the target to be displayed is not "zoom position" but "object distance information", the following information needed to display object distance information, described in the fourth embodiment, is set to be acquired from the lens microcomputer 2111 in S2806.

1. Whether object distance information is shown or hidden
2. Normalized position information of a current object distance on the distance bar
3. Normalized position information of an infinity-end focus limit on the distance bar
4. Normalized position information of a close-end focus limit on the distance bar
5. Normalized position information of a macro range on the distance bar More specifically, a communication command for acquiring "zoom position information" and a communication command for acquiring "object distance information" each are prescribed and used according to a camera menu.

The contents of display in, for example, the case where a built-in 1.4× extender is attached in S2801 and the case where a 2.0× extender is attached in S2801 will be described with reference to FIG. 32.

2610 indicates an example in which a current zoom position is displayed in the case where the 1.4× extender is enabled. 2611 is a wide-side focal length and displays 98 mm obtained by multiplying 1.4 by 70 mm that is the wide end focal length with no extender.

2612 is a tele-side focal length and displays 420 mm obtained by multiplying 1.4 by 300 mm that is the tele-side focal length with no extender. Here, a fractional figure 98 mm is displayed on the assumption that representative index values are displayed at the wide end and tele end of zoom; however, for a portion where 135 mm is displayed in the case of no extender, a fractional figure 189 mm is obtained when multiplied by 1.4, so display becomes complicated. Therefore, the interchangeable lens 2100 intentionally generates information together with position information normalized as static display information so as to display a position "200 mm".

With the communication method between the image capturing apparatus and the accessory apparatus and the display process of the image capturing apparatus as described above, information related to zoom position information to be displayed on the image capturing apparatus is transferred to the image capturing apparatus through communication as numeric values normalized from positions to be displayed. Thus, even when an accessory apparatus with different specifications is attached to any image capturing apparatus, it is possible to cause the image capturing apparatus to perform optimal display.

In the present embodiment, data related to scale display for displaying zoom position information is performed at the time when the accessory apparatus is mounted, and then, in a steady state, only dynamically changed object distance information of the accessory apparatus is acquired. In addition to this, communication load is minimized by selectively executing a communication process depending on whether the target to be displayed is object distance information or zoom position information. Thus, the influence on various control such as AF, AE, and vibration control is reduced, and communication for displaying an object is able to be acquired at high frequency like, for example, every vertical signal timing, so it is possible to perform various drive control and implement display of object distance information without a delay of display. When optical information is changed during operation as well, information needed for scale display is acquired again and displayed, and optimal display of indices is performed in a changed optical state when the optical information is changed, so it is possible to implement visually recognizable display.

Other Embodiments

The operations described with reference to the flowcharts in the above-described embodiments may be changed in the order of steps executed as needed so that similar purposes can be achieved.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above-described embodiments are typical examples, and various modifications and alterations of the embodiments are applicable at the time of implementing the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus to which an accessory apparatus is attachable, the image capturing apparatus comprising:
   a communication control section implemented by at least one processor and configured to control communication with the accessory apparatus by a first communication method or a second communication method, and to control reception of accessory attribute information,
   wherein the second communication method is capable of performing communication at a speed that is higher than a speed at which the first communication method is capable of performing communication,
   wherein the accessory attribute information includes information indicating function that can be performed by the accessory apparatus,
   wherein the communication control section is configured to control communication to receive first accessory attribute information of the accessory attribute information by using the first communication method, then to switch from the first communication method to the second communication method, and to control communication to receive second accessory attribute information of the accessory attribute information by using the second communication method, and
   wherein the second accessory attribute information contains predetermined information indicating function that can be performed by the second communication method which is not included in the first accessory attribute information.

2. The image capturing apparatus according to claim 1, further comprising a determination unit implemented by the at least one processor and configured to determine in accordance with the first accessory attribute information whether to perform communication of the second accessory attribute information.

3. The image capturing apparatus according to claim 1, wherein information different from the first accessory attribute information and contained in the second accessory attribute information includes information as to whether a function implemented by communication using the second communication method is supported.

4. The image capturing apparatus according to claim 1, wherein the accessory apparatus is a lens unit.

5. The image capturing apparatus according to claim 1,
   wherein the first communication method is a communication method in which, at a timing corresponding to transmission, through a first communication channel, of a clock signal of which a signal level switches alternately between a first signal level and a second signal level different from the first signal level, transmission of data through a third communication channel and reception of data through a second communication channel are performed, and wherein the second communication method is a communication method in which, in response to reception of data through the second communication channel in response to switching of the signal level of the first communication channel from the first signal level to the second signal level, data is transmitted through the third communication channel.

6. The image capturing apparatus according to claim 5, wherein the first accessory attribute information has support information indicating whether the accessory apparatus supports communication of the second accessory attribute information, and wherein, when the support information indicates that the accessory apparatus supports the communication of the second accessory attribute information, the communication control section is configured to transmit a request to switch from the first communication method to the second communication method through the third communication channel by using the first communication method, to switch the communication method from the first communication method to the second communication method, and to receive the second accessory attribute information through the second communication channel by using the second communication method in response to transmission of a request for the second accessory attribute information through the third communication channel by using the second communication method.

7. The image capturing apparatus according to claim 6, wherein, when the support information indicates that the accessory apparatus does not support the communication of the second accessory attribute information, the communication control section is configured not to transmit data corresponding to a request for the second accessory attribute information through the third communication channel.

8. The image capturing apparatus according to claim 5, wherein, when a signal level at a predetermined bit, received in association with data received through the second communication channel in the second communication method, is a third signal level, the communication control section is configured to control communication by using any one of a first communication format with which first control that does not switch the signal level of the first communication channel from the first signal level to the second signal level while the signal level of the second communication channel is maintained at the third signal level is executed, and a second communication format with which the first control is not executed, and wherein the communication control section is configured to control reception of the second accessory attribute information through the second communication channel with the second communication format.

9. An accessory apparatus to which an image capturing apparatus is attachable, the accessory apparatus comprising:
a communication control section implemented by at least one processor and configured to control communication with the image capturing apparatus by a first communication method or a second communication method, and to control transmission of accessory attribute information, wherein the second communication method is capable of performing communication at a speed that is higher than a speed at which the first communication method is capable of performing communication, wherein the accessory attribute information includes information indicating function that can be performed by the accessory apparatus, wherein the communication control section is configured to control communication to transmit first accessory attribute information of the accessory attribute information by using the first communication method, then to switch from the first communication method to the second communication method, and to control communication to transmit second accessory attribute information of the accessory attribute information by using the second communication method, and wherein the second accessory attribute information contains predetermined information indicating function that can be performed by the second communication method which is not included in the first accessory attribute information.

10. The accessory apparatus according to claim 9, wherein information different from the first accessory attribute information and contained in the second accessory attribute information includes information as to whether a function implemented by communication using the second communication method is supported.

11. The accessory apparatus according to claim 9, wherein the accessory apparatus is a lens unit.

12. The accessory apparatus according to claim 9, wherein the first communication method is a communication method in which, at a timing corresponding to reception, through a first communication channel, of a clock signal of which a signal level switches alternately between a first signal level and a second signal level different from the first signal level, reception of data through a third communication channel and transmission of data through a second communication channel are performed, and wherein the second communication method is a communication method in which, in response to transmission of the data through the second communication channel in response to switching of the signal level of the first communication channel from the first signal level to the second signal level, the data is received through the third communication channel.

13. The accessory apparatus according to claim 12, wherein the first accessory attribute information has support information indicating whether the accessory apparatus supports communication of the second accessory attribute information, and wherein, when the support information indicates that the accessory apparatus supports the communication of the second accessory attribute information, the communication control section is configured to switch the communication method from the first communication method to the second communication method in response to reception of a request to switch from the first communication method to the second communication method through the third communication channel by using the first communication method, and to transmit the second accessory attribute information through the second communication channel by using the second communication method in response to reception of a request for the second accessory attribute information through the third communication channel by using the second communication method.

14. The accessory apparatus according to claim 13, wherein, when the support information indicates that the accessory apparatus does not support the communication of the second accessory attribute information, the communication control section is configured not to perform transmission of the second accessory attribute information through the second communication channel.

15. The accessory apparatus according to claim 9,
wherein the communication control section is configured to control communication in the second communication method with any one of a first communication format with which data and a predetermined bit associated with the data are transmitted through a second communication channel and a second communication format different from the first communication format, and
wherein the communication control section is configured to control transmission of the second accessory attribute information through the second communication channel with the second communication format.

16. The accessory apparatus according to claim 15,
wherein, when the predetermined bit is added with the first communication format, the communication control section is configured to control communication such that a signal level of a first communication channel is not switched by the image capturing apparatus from a first signal level to a second signal level, and
wherein the communication control section is configured to control transmission of data through the second communication channel without adding the predetermined bit to the data with the second communication format.

17. A control method for an image capturing apparatus to which an accessory apparatus is attachable, wherein the image capturing apparatus includes a communication control section implemented by at least one processor and configured to control communication with the accessory apparatus by a first communication method or a second communication method, and to control reception of accessory attribute information, wherein the second communication method is capable of performing communication at a speed that is higher than a speed at which the first communication method is capable of performing communication, and wherein the accessory attribute information includes information indicating function that can be performed by the accessory apparatus, the control method comprising:
controlling, via the communication control section, communication to receive first accessory attribute information of the accessory attribute information by using the first communication method, then to switch from the first communication method to the second communication method, and to control communication to receive second accessory attribute information of the accessory attribute information by using the second communication method,
wherein the second accessory attribute information contains predetermined information indicating function that can be performed by the second communication method which is not included in the first accessory attribute information.

18. A control method for an accessory apparatus to which an image capturing apparatus is attachable, wherein the accessory apparatus includes a communication control section implemented by at least one processor and configured to control communication with the image capturing apparatus by a first communication method or a second communication method, and to control transmission of accessory attribute information, wherein the second communication method is capable of performing communication at a speed that is higher than a speed at which the first communication method is capable of performing communication, and wherein the accessory attribute information includes information indicating function that can be performed by the accessory apparatus, the control method comprising:
controlling, via the communication control section, communication to transmit first accessory attribute information of the accessory attribute information by using the first communication method, then to switch from the first communication method to the second communication method, and to control communication to transmit second accessory attribute information of the accessory attribute information by using the second communication method,
wherein the second accessory attribute information contains predetermined information indicating function that can be performed by the second communication method which is not included in the first accessory attribute information.

* * * * *